United States Patent
Zhang et al.

(10) Patent No.: US 7,787,556 B2
(45) Date of Patent: Aug. 31, 2010

(54) METHOD AND APPARATUS FOR SIGNAL DETECTION AND MATRIX DECOMPOSITION

(75) Inventors: Yi Zhang, Shenzhen (CN); Hufei Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 218 days.

(21) Appl. No.: 12/140,089

(22) Filed: Jun. 16, 2008

(65) Prior Publication Data

US 2008/0317172 A1 Dec. 25, 2008

Related U.S. Application Data

(63) Continuation of application No. PCT/CN2006/003475, filed on Dec. 18, 2006.

(30) Foreign Application Priority Data

Dec. 16, 2005  (CN)  .................. 2005 1 0134796
Mar. 20, 2006  (CN)  .................. 2006 1 0065505

(51) Int. Cl.
  *H04B 7/02* (2006.01)
(52) U.S. Cl. .................... 375/267; 375/347
(58) Field of Classification Search ............ 375/299, 375/267, 347, 349
  See application file for complete search history.

(56) References Cited

U.S. PATENT DOCUMENTS 5,333,191 A * 7/1994 McCarthy .............. 379/386
6,600,796 B1 7/2003 Hassibi
2003/0101031 A1 * 5/2003 Denk ..................... 703/2
2004/0034837 A1 * 2/2004 Lowther et al. ......... 716/1
2005/0249303 A1 * 11/2005 Takano .................. 375/267
2005/0271016 A1 * 12/2005 Kim et al. .............. 370/332
2006/0109891 A1 * 5/2006 Guo et al. .............. 375/147
2009/0049363 A1 * 2/2009 Hocevar ................. 714/758

FOREIGN PATENT DOCUMENTS

| CN | 1633051 A | 6/2005 |
|---|---|---|
| CN | 1725666 A | 1/2006 |

OTHER PUBLICATIONS

A.S. Morris and S. Khemaissia, A Fast New Algorithm for a Robot Neurocontroller Using Inverse QR Decomposition, Sep. 1-4, 1998, pp. 751-756, Conference Publication No. 455, UKACC International Conference on Control 1998.
State Intellectual Property Office of the People's Republic of China, Written Opinion of the International Searching Authority in International Patent Application No. PCT/CN2006/003475 (Mar. 29, 2007).
Benesty et al., "A Fast Recursive Algorithm for Optimum Sequential Signal Detection in a BLAST System," IEEE Transactions on Signal Processing, vol. 51, No. 7, pp. 1722-1730 (Jul. 2003).

* cited by examiner

*Primary Examiner*—Emmanuel Bayard
(74) *Attorney, Agent, or Firm*—Leydig, Voit & Mayer, Ltd.

(57) ABSTRACT

A method for computing a factor matrix of an inversion of a matrix, wherein the method comprises the steps of: computing a factor matrix of an inversion of a sub-matrix of a matrix, and recursively obtaining the factor matrix of the inversion of the matrix by using the matrix and the computed factor matrix of the inversion of the sub-matrix of the matrix; and an apparatus for computing the factor matrix of the inversion of a matrix, which can reduce the computational complexity in the signal detection and matrix decomposition and can be implemented with hardware easily.

29 Claims, 10 Drawing Sheets

METHOD AND APPARATUS FOR SIGNAL DETECTION AND MATRIX DECOMPOSITION

CROSS REFERENCE TO RELATED APPLICATIONS

This application is a continuation of International Patent Application No. PCT/CN2006/003475, filed Dec. 18, 2006, which claims priority to Chinese Patent Application No. 200510134796.0, filed Dec. 16, 2005 and Chinese Patent Application No. 200610065505.1, filed Mar. 20, 2006, all of which are hereby incorporated by reference in their entirety.

FIELD OF THE INVENTION

The present invention relates to a multiple-antenna digital wireless communication technology, and more particularly, to a method and apparatus for signal detection in a digital wireless system with multiple antennas and a method and apparatus for computing a factor matrix of an inversion of a matrix.

BACKGROUND

According to Information Theory, substantial improvements in transmission bit rate can be achieved by using multiple-antenna arrays at the transmitting end, the receiving end or both in a communication system.

A wireless communication system having space-time architecture and using multiple-antenna arrays at both the transmitting and receiving ends is shown in FIG. 1. The system operates under the Rayleigh scattering environment, and each element of the channel matrix is, to a reasonable approximation, assumed to be statistically independent. In the system of FIG. 1, a data sequence is divided into M uncorrelated subsequences of symbols, with each sub-sequence transmitted by one of the M transmitting antennas. The M sub-sequences are received by N receiving antennas at the receiving end after passing through a channel with a channel matrix H. The transmitted signals $s_1, \ldots, s_M$ are respectively transmitted from M distinct antenna elements a-1, ..., a-M, and the corresponding received signals $x_1, \ldots, x_N$ are respectively received from N distinct antenna elements b-1, ..., b-N. In this system, the number of transmitting antenna elements M is at least 2, and the number of receiving antenna elements N is at least M. The channel matrix H is an N×M matrix in which the element in the $i^{th}$ row and $j^{th}$ column represents the coupling, through the propagation channel, between the $i^{th}$ receiving antenna element and the $j^{th}$ transmitting antenna element. The received signals $x_1, \ldots, x_N$ are processed in a digital signal processor to produce recovered transmitted signals $\hat{s}_1, \ldots, \hat{s}_m$. Also shown in FIG. 1 are the components c-1, c-2, ..., c-N for summation, which represent noise signals $w_1, w_2, \ldots, w_N$ inevitably included in the received signals, there noise signals are added to the signals received by the receiving antenna elements b-1, b-2, ..., b-N, respectively.

In the above-described system, signals transmitted from the multiple antennas at the transmitting end are detected one by one at the receiving end according to an optimal ordering. In detecting the transmitted signals one by one, a nulling vector is applied to each transmitted signal under detection to cancel the interference from other transmitted signals to be detected, thereby obtaining an estimate of the signal under detection.

A system shown in FIG. 1 is employed in a U.S. Pat. No. 6,600,796, in which, Minimum Mean-Square Error (MMSE) estimate ŝ of the transmitted signals s is obtained by using the pseudoinversion of an augmented matrix that includes H as a sub-matrix. Accordingly, $$\hat{s} = \begin{bmatrix} H \\ \sqrt{\alpha} I_M \end{bmatrix}^+ \begin{bmatrix} x \\ 0 \end{bmatrix},$$

wherein "+" denotes matrix pseudoinversion. The $i^{th}$ row of the first N columns of the pseudoinverse matrix $$\begin{bmatrix} H \\ \sqrt{\alpha} I_M \end{bmatrix}^+$$

is the MMSE nulling vector of the $i^{th}$ detected transmitted signal.

In this U.S. patent, the nulling vector is derived from matrices of $P^{1/2}$ and $Q_\alpha$, wherein $P^{1/2}(P^{1/2})^H = P$. P is the estimate error covariance matrix $e = s - \hat{s}$, which is obtained by normalizing the variance of the additive Gaussian white noise to 1, and $P = E\{(s-\hat{s})(s-\hat{s})^H\} = (\alpha I + H^H H)^{-1}$, $P^{1/2}$ is the square root matrix of the estimate error covariance matrix, where in $^H$ denotes the conjugate transposition of a matrix and α is a constant based on the Signal to Noise Ratio (SNR) of the transmitted signals.

The flowchart of the procedure for detecting the transmitted signals disclosed in the above U.S. patent is shown in FIG. 2, wherein the procedure comprises the following steps:

At step 201: the initial values of the matrices $P^{1/2}$ and $Q_\alpha$ are derived by iteration using the pseudoinverse matrix related to the channel matrix H. The following sub-steps 201-1~201-3 are further included in this step:

201-1: $P^{1/2}$ is initialized by setting $$P_0^{1/2} = \frac{1}{\sqrt{\alpha}} I,$$

where I is an M×M identity matrix and α is the constant based on the SNR of the transmitted signals, and $Q_\alpha$ is initialized by setting $Q_0 = 0_{(N \times M)}$, where $0_{(N \times M)}$ is an N×M matrix whose entries are all zeroes. The iteration order is designated with i whose initial value is set to be 1, and N iterations will be performed in total.

201-2: a matrix $X_i$ of dimension (N+M+1)×(M+1) is defined for the $i^{th}$ iteration ($1 \leq i \leq N$) based on $P_{i-1}^{1/2}$, $Q_{i-1}$ and the channel matrix H:

$$X_i = \begin{bmatrix} 1 & H_i P_{i-1}^{1/2} \\ 0 & P_{i-1}^{1/2} \\ -e_i & Q_{i-1} \end{bmatrix},$$

wherein, $0_M$ is a column vector whose M entries are all zeroes, $e_i$ is the $i^{th}$ unit column vector of dimension N, and $H_i$ is the $i^{th}$ row of the channel matrix H.

The matrix $X_i$ is block lower triangularized with a unitary transformation, that is, all the entries of the first row except for the entry at the first column are zeroes after the transformation, thereby obtaining a matrix $$Y_i, Y_i = \begin{bmatrix} \times & 0_M^T \\ \times & P_i^{1/2} \\ \times & Q_i \end{bmatrix},$$

wherein, the last M entries of the first row of $Y_i$ are all zeroes. The matrices $P_i^{1/2}$ and $Q_i$ derived from the $i^{th}$ iteration is included in the matrix $Y_i$ after transformation.

201-3: i is incremented by 1 and it is determined whether i is equal to N. If i is equal to N, the initial values of $P^{1/2}$ and $Q_\alpha$ after N iterations are obtained; otherwise, the process returns back to sub-step 201-2 and the next iteration is performed.

The initial $P^{1/2}$ derived by the above iteration is not a diagonal matrix.

The order of the signals to be detected is denoted by J, which is set to be equal to M. Then the process proceeds to the following procedure for detecting the transmitted signals.

At step 202: the next transmitted signal to be detected is identified via the matrix $P^{1/2}$. The one with the maximum receiving SNR of the transmitted signals to be detected is the next transmitted signal to be detected. The row vector with the minimum-length of the matrix $P^{1/2}$ corresponds to the optimal transmitted signal to be detected, which has the maximum receiving SNR.

At step 203: the nulling vector for the next transmitted signal to be detected, which is identified at step 202, is computed using $P^{1/2}$ and $Q_\alpha$. The following are sub-steps 203-1~203-3 of this step:

203-1: the row with the minimum-length of the matrix $P^{1/2}$ identified in step 202 is permuted with the last row, and the indices of the signal vectors are renumbered. At the same time, the column corresponding to the optimal transmitted signal to be detected selected at step 202 is permuted with the last column.

203-2: the matrix $P^{1/2}$ is block upper triangularized with a unitary transformation $\Sigma$. All the entries except for the last one in the last row of the unitary transformed $P^{1/2}$ are all zeroes. $Q_\alpha$ is updated to $Q_\alpha \Sigma$ after being applied the unitary transformation $\Sigma$.

203-3: the nulling vector for the transmitted signal to be detected is obtained, which is the product of the last entry of the last row of the matrix $P^{1/2}$ by the last row of the conjugate transposition $Q_\alpha^H$ of $Q_\alpha$.

At step 204: the estimate of the transmitted signal to be detected is derived from the product of the corresponding nulling vectors with the vectors $\vec{x}_J$ of the received signal, and $\hat{s}_J$ is obtained through quantifying the estimate.

At step 205: $P^{1/2}$ is substituted by a sub-matrix of $P^{1/2}$ and $Q_\alpha$ is substituted by a sub-matrix of $Q_\alpha$. The effect of the transmitted signal that are already detected is cancelled from the received signals, thus giving $\vec{x}_{(J-1)} = \vec{x}_J - h_J \hat{s}_J$. Then the order of the transmitted signal to be detected is decreased by 1, that is, J is reduced by 1.

At step 206: it is determined whether the last transmitted signal is detected, i.e., whether J is equal to zero. If J is equal to zero, then the procedure is finished; otherwise, it returns back to step 202 and detects the next signal according to the above procedure.

It is described in "An Improved Square-root Algorithm for BLAST" published at IEEE Signal Processing Letters Vol. 11, No. 9, 2004 that the nulling vectors can be obtained through the MMSE filter related to the channel matrix H. Specifically, in this method, only the initial value of $P^{1/2}$ is computed. The nulling vector for each signal detection is obtained from the product of one entry and one vector of the updated $P^{1/2}$ and the channel matrix H with original or reduced size. That nulling vector is computed using the following equation: $G_M = P_M^{1/2}[(P_M^{(M-1)/2})^H (p_M^{1/2})^H]H^H$, wherein the meaning of $P^{1/2}$ and its initialization are the same as that described in U.S. Pat. No. 6,600,796.

Based on the above description, it can be seen that, in the related art, the signal detection method in the digital wireless communication system with multiple-antenna described in the U.S. patent and IEEE paper suffers the following disadvantages:

(1) In the U.S. patent and IEEE paper, the initial value of $P^{1/2}$ for the M transmitted signals to be detected is recursively computed by using a matrix of dimension M×M. The intermediate result for each recursion is a matrix of dimension M×M, thus the computational load for computing the initial value of $P^{1/2}$ is heavy.

(2) In the US patent and IEEE paper, the entries of the initial matrix of $P^{1/2}$ used to compute the nulling vector are non-zeroes, thus the computational load during signal detection is heavy.

(3) In the U.S. patent and IEEE paper, $P^{1/2}$ is block upper triangularized for each recursion during the signal detection and a sub-matrix of the block upper triangularized $P^{1/2}$ is used to detect the next signal. Since the sub-matrix is not a block upper triangularized matrix, the nulling vectors required in the signal detection can only be obtained after performing block upper triangularization on the sub-matrix. Therefore, the computational load during signal detection is heavy.

(4) In the IEEE paper, the nulling vectors are computed using $G_M = P_M^{1/2}[(P_M^{(M-1)/2})^H (p_M^{1/2})^H]H^H$ during signal detection. The estimate of the detected signals is obtained from the product of the nulling vectors with the vector for the received signals. After that, the interference of the detected signals is cancelled from the received signals by updating the vector for the received signals using $\vec{x}_{(J-1)} = \vec{x}_J - h_J \hat{s}_J$. Then the updated vector for the received signals is used for the detection of the next signal. In the above procedure, the computation of $G_M = P_M^{1/2}[(P_M^{(M-1)/2})^H (p_M^{1/2})^H]H^H$ for obtaining the nulling vectors is of heavy computational load.

SUMMARY

In view of this, an embodiment of the invention provides a method for signal detection in a digital wireless communication system with multiple-antenna, which realizes signal detection with reduced computational load.

An embodiment of the invention provides an apparatus for signal detection in a digital wireless communication system with multiple-antenna, which realizes signal detection with reduced computational load.

An embodiment of the invention provides a method for computing a factor matrix of an inverse matrix of a matrix, which realizes matrix decomposition with reduced computational load.

An embodiment of the invention provides an apparatus for computing a factor matrix of an inversion of a matrix, which realizes matrix decomposition with reduced computational load.

An embodiment of present invention provides a method for signal detection in a digital wireless communication system with multiple antennas, wherein at least two transmitted signals are detected in a Multiple Input Multiple Output (MIMO) system, the transmitted signals are transmitted from distinct transmitting antennas at a transmitting end and arrive at a receiving end after passing through a channel, wherein the method comprises the steps of: receiving the transmitted signals from at least two receiving antennas at the receiving end, and acquiring a channel matrix H composed of channel coefficients between the transmitting and receiving antennas; computing a factor matrix of an estimate error covariance matrix for a part of all the transmitted signals by using the channel matrix H, and recursively obtaining a factor matrix of an estimate error covariance matrix for a number of transmitted signals by using the channel matrix H and the factor matrix of the estimate error covariance matrix for the part of transmitted signals, wherein the number of transmitted signals include the part of transmitted signals and are of a greater number than the part of transmitted signals; and detecting the number of transmitted signals, which include the part of transmitted signals and are of a greater number than the part of transmitted signals, by using the obtained factor matrix.

An embodiment of present invention provides an apparatus for signal detection in a digital wireless communication system with multiple antennas, wherein the apparatus comprises: a signal receiving unit, a channel matrix acquiring unit, a recursion unit for obtaining a factor matrix of an estimate error covariance matrix and a signal detection unit; the signal receiving unit is configured to receive transmitted signals transmitted from a transmitting end, and send the transmitted signals to the channel matrix acquiring unit and signal detection unit; the channel matrix acquiring unit is configured to acquire a channel matrix and send the channel matrix to the recursion unit for obtaining a factor matrix of an estimate error covariance matrix; the recursion unit for obtaining a factor matrix of an estimate error covariance matrix is configured to compute a factor matrix of an estimate error covariance matrix for a part of all the transmitted signals by using the channel matrix; recursively obtain a factor matrix of an estimate error covariance matrix for a number of transmitted signals by using the channel matrix and the factor matrix of the estimate error covariance matrix for the part of transmitted signals, wherein the number of transmitted signals include the part of transmitted signals and are of a greater number than the part of transmitted signals; and send the obtained factor matrix to the signal detection unit; the signal detection unit is configure to detect the number of transmitted signals that include the part of transmitted signals and are of a greater number than the part of transmitted signals, by using the obtained factor matrix.

An embodiment of present invention provides a method for computing a factor matrix of an inversion of a matrix, wherein the method comprises the steps of: computing a factor matrix of an inversion of a sub-matrix of the matrix; recursively obtaining the factor matrix of the inversion of the matrix by using the matrix and the computed factor matrix of the inversion of the sub-matrix of the matrix.

An embodiment of present invention provides an apparatus for computing factor matrix of an inversion of a matrix, wherein the apparatus comprises: a matrix input unit, a first unit and a second unit; the matrix input unit is configured to receive and record the matrix; the first unit is configured to compute factor matrix of an inversion of a sub-matrix of the matrix; the second unit is configured to recursively obtain the factor matrix of the inversion of the matrix by using the matrix and the computed factor matrix of the inversion of the sub-matrix of the matrix and output the factor matrix.

In the method and apparatus for signal detection according to the present invention, the initial value of $P^{1/2}$ needed for calculating the nulling vector is obtained by recursively computing $P^{1/2}$ for all the transmitted signals from $P^{1/2}$ for a part of the transmitted signals. Thereby, the computational load in computing the initial value of $P^{1/2}$ is reduced and the method is more suitable to be realized with hardware. According to the present invention, $P^{1/2}$ is a full triangular matrix during the recursion, or may be made full triangular by permuting the rows and columns thereof. Consequently, the initial value of $P^{1/2}$ is full triangular or may be made full triangular by permuting the rows and columns, which therefore reduces the computational load during the signal detection. Furthermore, according to present invention, before detecting the signals, the received signals were first pre-match filtered, and the nulling factor is computed merely from $P^{1/2}$, which also reduces the computational load. According to the present invention, many intermediate results may be used during the signal detection, which further reduces the computational load. In the present invention, first, the $LDL^T$ factor matrices of the estimate error covariance matrix for all the transmitted signals are recursively obtained by using the $LDL^T$ factor matrices of the estimate error covariance matrix for a part of all the transmitted signals, then the initial value of $P^{1/2}$ which is required for computing the nulling vector is computed. As a result, the errors and delay caused by the square root operations may be eliminated.

In the following, the improvements over prior art in terms of computational speed will now be discussed, with respect to the number of multiplications used during the signal detection.

(1) Comparison between the present invention and prior art on the number of computations needed for computing the initial value of $P^{1/2}$.

First, the number of computations needed for computing the initial value of $P^{1/2}$ will be analyzed for the present invention.

It takes $$\frac{1}{2}M^2N$$

multiplications to compute matrix R by using H.

During the procedure of recursively computing $P^{1/2}$, when computing $$\beta_{m-1}^{(t_m)} = \sqrt{\frac{1}{\lambda_1^{(t_m)} - \left(\left(P_{(t_{m-1})}^{(m-1)/2}\right)^H Y_{m-1}^{(t_m)}\right)^H \left(\left(P_{(t_{m-1})}^{(m-1)/2}\right)^H Y_{m-1}^{(t_m)}\right)}} \text{ and}$$

$$v_{m-1}^{(t_m)} = -\beta_{m-1}^{(t_m)} P_{(t_{m-1})}^{(m-1)/2} \left(P_{(t_{m-1})}^{(m-1)/2}\right)^H Y_{m-1}^{(t_m)},$$

the intermediate results may be fully employed by letting $\eta_{m-1} = (P_{(t_{m-1})}^{(m-1)/2})^H Y_{m-1}^{(t_m)}$, thus avoiding repeated computation. Accordingly, the number of computations for the above equations will be the number of computations used for computing $$\beta_{m-1}^{(t_m)} = \sqrt{\frac{1}{\lambda_1^{(t_m)} - \eta_{m-1}^H \eta_{m-1}}} \text{ and}$$

$$v_{m-1}^{(t_m)} = -\beta_{m-1}^{(t_m)} P_{(t_{m-1})}^{(m-1)/2} \eta_{m-1} \cdot \frac{m(m+1)}{2}$$

multiplications are needed for computing $\eta_{m-1} = (P_{(t_{m-1})}^{(m-1)/2})^H Y_{m-1}^{(t_m)}$ once, m multiplications for computing $$\beta_{m-1}^{(t_m)} = \sqrt{\frac{1}{\lambda_1^{(t_m)} - \eta_{m-1}^H \eta_{m-1}}}, \text{ and } \frac{m(m+1)}{2} + m$$

multiplications for computing $v_{m-1}^{(t_m)} = -\beta_{m-1}^{(t_m)} P_{(t_{m-1})}^{(m-1)/2} \eta_{m-1}$, thus $$\sum_{m=1}^{M-1} \frac{m(m+1)}{2} + m + \frac{m(m+1)}{2} + m \approx \sum_{m=1}^{M-1} m^2 \approx \frac{1}{3} M^3$$

multiplications are needed in total.

Therefore, it takes $$\frac{1}{2} M^2 N + \frac{1}{3} M^3$$

multiplications to compute $P^{1/2}$.

Similar number of computations is need to recursively compute the initial value of $P^{1/2}$ by using $LDL^T$ factor matrices L and D.

Next, the number of computations required for the solution of the prior art IEEE paper will be evaluated.

$N(M^2+2(M+1)^2) = 3NM^2 + O(MN)$ complex computations are needed to compute the initial value of $P^{1/2}$.

During the iteration for signal detection, for each iteration, a transmitted signal with optimal receiving SNR is selected for detection, and the nulling vector is also computed. The dominant computations come from the steps of computing $P^{m/2}\Sigma$ and $p_m^{1/2} \cdot [(P_m^{(m-1)/2})^H (p_m^{1/2})^H] \cdot (H^{(m)})^H$. $2m^2$ complex multiplications are needed for each iteration of $P^{m/2}\Sigma$, and $m(N+1)+1$ complex multiplications are needed for computing the nulling vector. Thus, the M iterations for signal detection require $$\sum_{m=1}^{M} (2m^2 + m(N+1) +) = \frac{2}{3} M^3 + \frac{1}{2} M^2 N + O(M^2 + MN)$$

complex multiplications in total.

By accumulating the multiplications of the above two steps, it totally needs $$\frac{2}{3} M^3 + \frac{7}{2} M^2 N + O(M^2 + MN)$$

complex multiplications. Given that $$M = N, \frac{25}{6} M^3 + O(M^2)$$

complex multiplications are needed in total.

In summary, the present invention takes $$\frac{1}{2} M^2 N + \frac{1}{3} M^3$$

multiplications to compute $P^{1/2}$, while the solution proposed in the IEEE paper needs $3NM^2$ multiplications. When M=N, the number of complications required by the present invention is $$\frac{5}{6} M^3$$

multiplications, and that of the solution proposed in the IEEE paper is $3M^3$ multiplications. Thereby, the present invention gains an improvement of 28% over prior art in terms of the computations needed for the above step.

Totally, $$\frac{25}{6} M^3$$

multiplications are necessary for the solution proposed in the IEEE paper. Assuming that the other steps are exactly the same as the solution of the IEEE paper, the method of the present invention takes $$\frac{25}{6} M^3 - \left(3M^3 - \frac{5}{6} M^3\right) = 2M^3$$

multiplications. Thus, the speed of the present invention is improved by $$\frac{\left(\frac{25}{6} M^3\right)}{(2M^3)} = 2.08$$

times over the solution proposed in the IEEE paper.

(2) The initial $P^{1/2} = P^{M/2}$ of the present invention is a full triangular matrix.

During the iteration of signal detection, if the orthogonal transform based on Givens Rotation $\Sigma$ provided by the present invention is used, matrix $P^{m/2}$ that can be made full upper triangular by means of row permutation may be considered as a full upper triangular matrix. Thus, matrix $P^{(m-1)/2}$ derived from $$P^{m/2}\Sigma = \begin{bmatrix} P^{(m-1)/2} & \bar{P}_m^{(m-1)/2} \\ 0_{m-1}^T & p_m^{1/2} \end{bmatrix}$$

is also a full upper triangular matrix. As a result, all the matrices $P^{m/2}$ (m=M, M−1, . . . , 2, 1) are full upper triangular matrix. In computing $P^{m/2}\Sigma$, it is well-known that half of the elements of the matrix are zeros if $P^{m/2}$ is full upper triangular, which means roughly half of the computations may be avoided. By using the orthogonal transform based on fewer number of Givens Rotation provided in the present invention, the number of computations may be further decreased.

During the iteration of signal detection, if the orthogonal transform based on Householder provided by the present invention is used, the matrix for the next iteration which is obtained by orthogonal transform is block upper triangular, not always full triangular. Still there are many zero elements in the matrix, thus, it can be approximately considered to reduce the number of computations by half.

For computing $P^{m/2}\Sigma$, the solution of the IEEE paper needs $2m^2$ multiplications, while the present invention only needs $m^2$ multiplications. Totally, in the solution of the IEEE paper $$\sum_{m=1}^{M} 2m^2 = \frac{2}{3}M^3$$

multiplications are necessary to compute $P^{m/2}\Sigma$, while only $$\sum_{m=1}^{M} m^2 = \frac{1}{3}M^3$$

multiplications are needed for the present invention.

According to the solution of the IEEE paper, $m(N+1)+1$ complex multiplications are needed for computing the nulling vector in each iteration. The nulling vector used in the present invention is $G_m = p_m^{1/2} \cdot [(\vec{P}_m^{(m-1)/2})^H (p_m^{1/2})^H]$, which needs only m multiplications. Thus, $$\sum_{m=1}^{M} (m(N+1)+1) \approx \frac{1}{2}M^2 N$$

multiplications are required to calculate the nulling vector according to the solution of the IEEE paper, while for the present invention it takes only $$\sum_{m=1}^{M} m \approx \frac{1}{2}M^2$$

multiplications, thus saving up to $$\frac{1}{2}M^2 N$$

multiplications.

Thus, the speed of the present invention is improved by $$\frac{\left(\frac{25}{6}M^3\right)}{\left(2M^3 - \left(\frac{2}{3}M^3 - \frac{1}{3}M^3\right) - \frac{1}{2}M^3\right)} = 3.57$$

times over the solution of the IEEE paper.

(3) In the present invention, each $P^{m/2}$ (m=M, M−1, . . . , 2, 1) corresponding to each step of an ordering $t_M, t_{M-1}, \ldots, t_m, \ldots, t_2, t_1$ for detecting the signals from the M transmitted antennas at the receiving end is also obtained when computing the initial $P^{1/2} = P^{M/2}$. If the real optimal ordering is the same as or highly similar to this ordering, the obtained each $P^{m/2}$ may be used repeatedly, saving the step of obtaining $P^{m/2}\Sigma$ by the orthogonal transform $\Sigma$. Generally, the slow fading channel under which the V-BLAST operates may be approximately regarded as stable. In such a channel, though the nulling vector may vary accordingly as the channel matrix for each data frame changes, the optimal detection ordering for detecting the data frames changes insignificantly or does not change at all. In this case, it does not need to compute $P^{m/2}\Sigma$, which saves $$\frac{1}{3}M^3$$

multiplications. Thus, the computational speed of the present invention is improved by $$\frac{\left(\frac{25}{6}M^3\right)}{\left(2M^3 - \frac{2}{3}M^3 - \frac{1}{2}M^3\right)} = 5.00$$

times over the solution of the IEEE paper.

In summary, the computational speed of the present invention is improved by 3.57 to 5.00 times over the solution of the IEEE paper. An improvement of (nearly) up to five times can be achieved when the predetermined detection ordering $t_M, t_{M-1}, \ldots, t_m, \ldots, t_2, t_1$ for detecting the signals from the M transmitting antennas at the receiving end is the same or very similar to the real optimal detection ordering.

Comparing with the Cholesky decomposition, the matrix decomposition method and apparatus according to the present invention obtain the factors directly by using a small number of computations, without computing the inversion of the matrix. Thus the computation accuracy is improved and the effect of the intermediate results may be reduced.

BRIEF DESCRIPTION OF THE DRAWING(S)

DETAILED DESCRIPTION

In order to make objects, technical solutions and advantages of the disclosure more apparent, a further detailed description of the disclosure is given below with respect to preferred embodiments.

Figure 1:
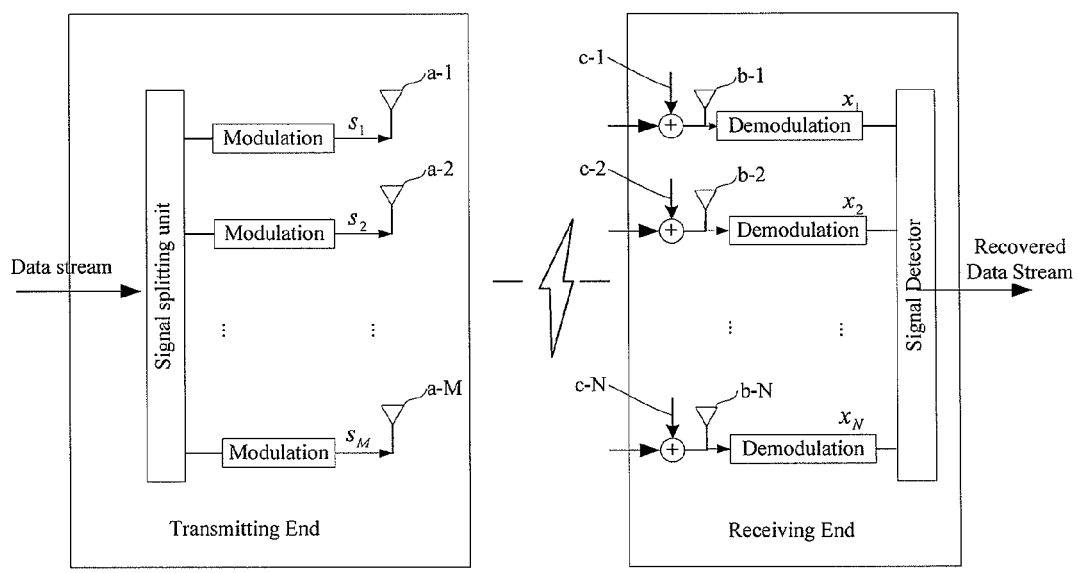
FIG. 1 is a block diagram of a digital wireless communication system with multiple antennas.
Figure 2:
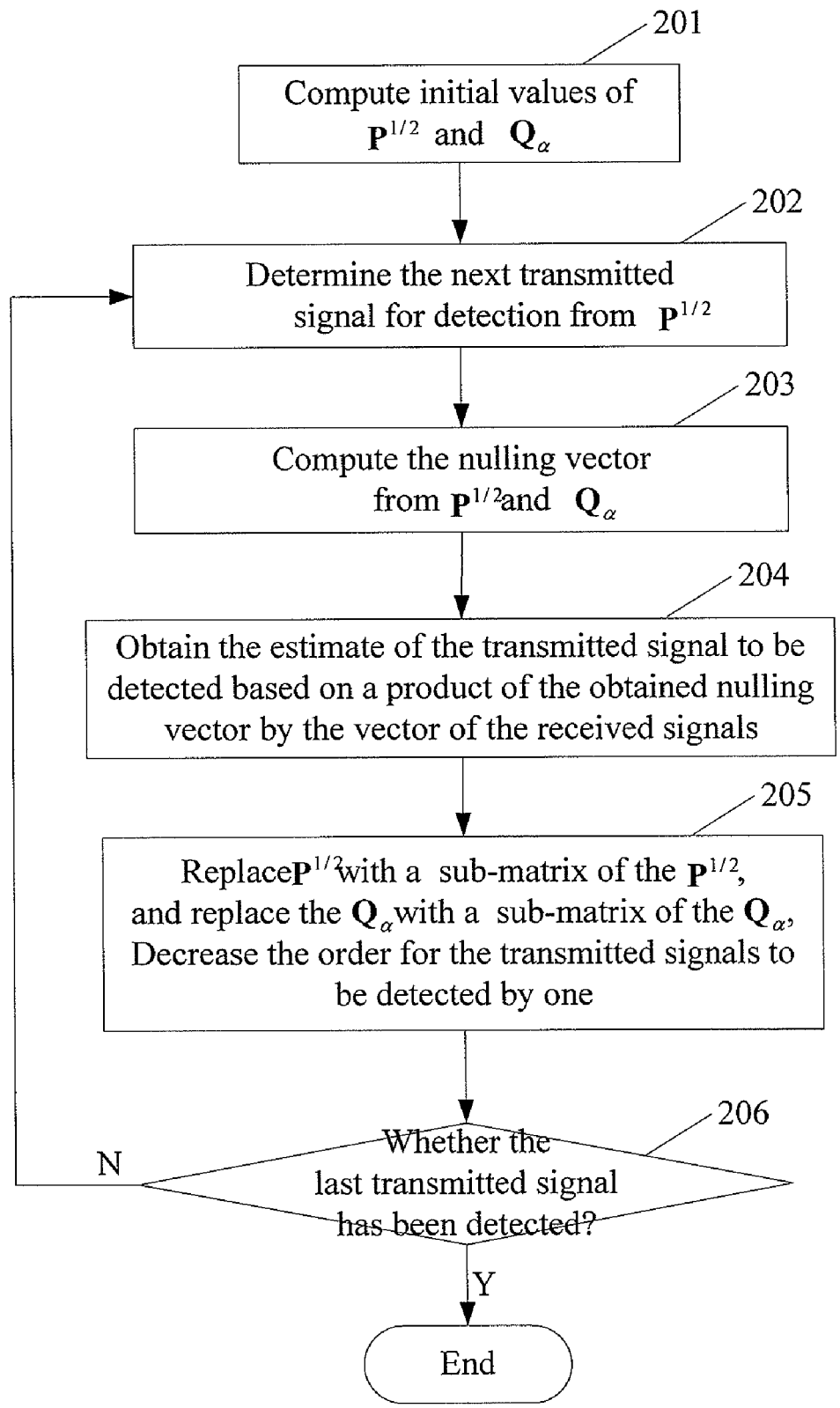
FIG. 2 is a flow chart of a conventional procedure for detecting the received signals.

A digital wireless communication system with multiple antennas utilized in the present invention is shown in FIG. 1. The transmitted signals $s_1, \ldots, s_M$ are respectively transmitted from M distinct antenna elements a-1, . . . , a-M, and the corresponding received signals $x_1, \ldots, x_N$ are respectively received from N distinct antenna elements b-1, . . . , b-N. Each of the transmitted signals $s_1, \ldots, s_M$ is encoded with a predetermined symbol constellation, thus estimates of the transmitted signals $\hat{s}_1, \ldots, \hat{s}_M$ obtained at the receiving end through detecting the received signals $x_1, \ldots, x_N$ fall into the symbol constellation. It is well known that slicing of an estimate of a transmitted signal refers to a procedure in which the estimate of the transmitted signal is assigned to a symbol of the symbol constellation at the receiving end.

The channel matrix H is a matrix of dimension N×M, which is represented as:

$$H = \begin{bmatrix} h_{11} & h_{12} & \ldots & h_{1M} \\ h_{21} & h_{22} & \ldots & h_{2M} \\ \vdots & \vdots & \ddots & \vdots \\ h_{N1} & h_{N2} & \ldots & h_{NM} \end{bmatrix}$$

$$= [h_{:1}, h_{:2}, \ldots, h_{:M}]$$

$$= \begin{bmatrix} h_{1:}^H \\ h_{2:}^H \\ \vdots \\ h_{N:}^H \end{bmatrix}.$$

The channel matrix H is an N×M complex matrix, which is assumed to be a constant over a period of K symbols. The lengths of the vectors $h_{n:}$ (n=1, 2, . . . , N) and $h_{:m}$ (m=1, 2, . . . , M) are M and N respectively. Here, channel vectors $h_{:1}$ to $h_{:M}$ included in the channel matrix H denote the effect of the channel on each of the M transmitted signals respectively. Specifically, the channel vector $h_{:m}$ (m=1, 2, . . . , M) comprises channel matrix entries $h_{1m}$ to $h_{Nm}$, which denotes the effect of the channel on the transmitted signal $s_m$ at each of the receiving antenna elements b-1 to b-N.

In the system shown in FIG. 1, the relationship between the vector of the transmitted signals and the vector of the received signals satisfies the equation $$x(k) = \sum_{m=1}^{M} h_{:m} s_m(k) + w(k) = Hs(k) + w,$$

wherein, K is the sample time and k=1, 2, . . . , K. The above identified relationship may be expressed as $$\vec{x} = \sum_{m=1}^{M} h_{:m} s_m + \vec{w} = H\vec{s} + \vec{w}$$

in a vector form. The effect of each of the transmitted signals on the vector $\vec{x}$ of the received signals is shown in the expanded form $\vec{x} = s_1 \cdot h_{:1} + s_2 \cdot h_{:2} + \ldots + s_m \cdot h_{:m} + \ldots + s_M \cdot h_{:M} + \vec{w}$.

Wherein, $\vec{x} = [x_1, x_2, \ldots, x_N]^T$ is a received signal vector of dimension N, $\vec{s} = [s_1, s_2, \ldots, s_M]^T$ is a transmitted signal vector of dimension M, $\vec{w} = [w_1, w_2, \ldots, w_N]^T$ is a complex vector of additive Gaussian white noise with a mean of zero and a variance of $R_{ww} = E\{\vec{w} \cdot \vec{w}^H\} = \sigma_w^2 I_{N \times N}$. Wherein, $T$ and $H$ denote the transposition and conjugate transposition of a vector or matrix respectively, $I_{N \times N}$ denotes an N×N identity matrix. Here, it is assumed that the additive noise $\vec{w}$ is statistically independent in both spatial domain and temporal domain. It is further assumed that the transmitted signals $s_1, s_2, \ldots, s_M$ are uncorrelated, which means that the correlation matrix of vector $\vec{s}$ of the transmitted signals is diagonal, that is $R_{ss} = E\{\vec{s} \cdot \vec{s}^H\} = \sigma_s^2 I_{M \times M}$.

In the system shown in FIG. 1, a vector composed of the M transmitted signals $s_1, \ldots, s_M$ may first be multiplied with one or more matrices to obtain a resultant vector, and each entry of the resultant vector is then transmitted from respective transmitting antennas. Virtual Antenna technology is proposed in 3GPP TR 25.876 V1.7.1, in which multiple virtual antenna ports are described. In this technology, the transmitted signals $s_1, \ldots, s_M$ are first sent to corresponding virtual antenna ports respectively, a vector $\vec{s}' = U \cdot T \cdot \vec{s}$ then obtained by multiplying the vector of the transmitted signals with a matrix T and a matrix U in turn. Each entry of the vector $\vec{s}' = U \cdot T \cdot \vec{s}$ is then sent to the respective physical antenna port. In this case, an equivalent matrix representing the relationship between a plurality of transmitted signals and a plurality of received signals is expressed as $\tilde{H} = H \cdot U \cdot T$. Thereby, the vector of the received signals is now expressed as $\vec{x} = H \cdot U \cdot T \cdot \vec{s} + \vec{w} = \tilde{H} \vec{s} + \vec{w}$. Therefore, the relationship $\vec{x} = \tilde{H} \vec{s} + \vec{w}$ between the vector of transmitted signals and the vector of the received signals in the case of using the virtual antenna technology is exactly the same as the relationship $\vec{x} = \tilde{H} \vec{s} + \vec{w}$ between the vector of transmitted signals and the vector of the received signals in the case of feeding the M transmitting signals directly to the M transmitted antennas.

In an embodiment of the present invention, a method for signal detection is described in detail with reference to a scenario of feeding the M transmitting signals directly to the M transmitted antennas. As for the signal detection method for the virtual antenna technology, it simply substitutes the equivalent channel matrix $\tilde{H}$ for the channel matrix H.

The Minimum Mean-Square Error (MMSE) estimate of the transmitted signal is $\vec{\hat{s}} = (H^H \cdot H + \alpha I_{M \times M})^{-1} H^H \vec{x}$, wherein, the symbol $^{-1}$ denotes the inversion of a matrix, and $\alpha$ is a constant related to the SNR of the transmitted signals, $$\alpha = \frac{\sigma_w^2}{\sigma_s^2}.$$

In an embodiment of the present invention, the estimate error covariance matrix of $e=s-\hat{s}$ is calculated by normalizing the variance of the additive Gaussian white noise to 1, that is $E\{(\vec{s}-\vec{\hat{s}})(\vec{s}-\vec{\hat{s}})^H\}=(H^H \cdot H+\alpha I_{M\times M})^{-1}$. Here, the estimate error covariance matrix is designated with P, and a relationship $R=(H^H \cdot H+\alpha I_{M\times M})$ is defined, thus $P=R^{-1}$. The square root matrix of the estimate error covariance matrix P is designated with $P^{1/2}$, thus $P=P^{1/2}(P^{1/2})^H$. As a result, the MMSE estimate of the transmitted signals can be expressed as $\vec{\hat{s}}=P^{1/2}(P^{1/2})^H H^H \vec{x}$.

The method of the present invention can also be realized by multiplying the estimate error covariance matrix by a non-zero constant. In the case of multiplying the estimate error covariance matrix by a non-zero constant, the equation for computing the nulling factor also needs to multiply a number related to the constant, in the step of detecting signals using the nulling factor.

Interference cancellation technology is used in the signal detection method according to the present invention. The principle of the interference cancellation is shown as follows: first, a selected one of the M transmitted signals $s_1, \ldots, s_M$ is detected; second, the effect of the transmitted signals that are already detected is at least partially canceled from the vector of the received signals by using the estimate of the transmitted signal that are already detected. In this step, the problem of the next signal detection is thus reduced to a problem of detecting M−1 transmitted signals, so that the performance of the next detection may be improved. In the next step, i.e., detecting the M−1 transmitted signals, the above interference cancellation method is applied again, and in this way, the procedure may be iterated for M−1 times until the last transmitted signal to be detected is detected.

Assuming the ordering of detecting the totally M transmitted signals transmitted via M distinct transmitting antennas at the receiving end is represented by the sequence numbers of the transmitted signals $t_M, t_{M-1}, \ldots, t_m, \ldots, t_2, t_1$, the procedure of the interference cancellation may be illustrated as follows:

Firstly, the initial values are set. That is, the initial value of m is set to M, the initial vector of the received signals is set to $\vec{x}_M$, the initial channel matrix is $H^{(M)}=H$, and the initial vector of the transmitted signals to be detected is $\vec{s}_M = \vec{s}$.

Next, the transmitted signals are detected in turn with the interference being canceled by using the above iterative method. Specifically, the $t_m$th transmitted signal is detected to obtain its estimate $\hat{s}_{t_m}$, then the effect of the $t_m$th transmitted signal is at least partially cancelled from the vector of the received signals by using $\hat{s}_{t_m}$. Assuming that the effect of the $t_m$th transmitted signal on the vector of the received signals is fully eliminated, the problem of the next signal detection would reduce to:

$$\vec{x}_{m-1} = \sum_{i=1}^{m-1} h_{:t_i} s_{t_i} + \vec{w} = H^{(m-1)}\vec{s}_{m-1} + \vec{w},$$

where $H^{(m-1)}$ denotes a reduced channel matrix obtained by deleting from the channel matrix $H^{(m)}$ the column corresponding to the $t_m$th transmitted signal, and $\vec{s}_{m-1}$ denotes a vector obtained by deleting the $t_m$th transmitted signal that are already detected from the vector $\vec{s}_m$ of the transmitted signals. m is decremented by 1 and the iteration continues until all of the M transmitted signals are detected.

It can be seen from the above description that, for a problem of detecting m−1 transmitted signals $t_{m-1}, \ldots, t_2, t_1$, the relationship between the vector of the received signals and the vector of the transmitted signals is $$\vec{x}_{m-1} = \sum_{i=1}^{m-1} h_{:t_i} s_{t_i} + \vec{w} = H^{(m-1)}\vec{s}_{m-1} + \vec{w}$$

and the channel matrix corresponding to the m−1 transmitted signals $t_{m-1}, t_2, t_1$, is $H^{(m-1)}$. In the case of detecting the m−1 transmitted signals $t_{m-1}, \ldots, t_2, t_1$, the following matrices may be derived from the channel matrix $H^{(m-1)}$ by using the same method as that of deriving the following matrices using the initial channel matrix H. Specifically, the estimate error covariance matrix is $P^{(m-1)}=((H^{(m-1)})^H \cdot H^{(m-1)}+\alpha I_{(m-1)\times(m-1)})^{-1}$, the inversion of the estimate error covariance matrix is $R^{(m-1)}=(H^{(m-1)})^H \cdot H^{(m-1)}+\alpha I_{(m-1)\times(m-1)}$, the square root matrix of the estimate error covariance matrix $P^{(m-1)}$ is $P^{(m-1)/2}$, thus $P^{(m-1)}=P^{(m-1)/2}(P^{(m-1)/2})^H$.

The signal detection procedure of the present invention for the digital wireless communication system with multiple antennas comprises the recursion for computing the initial value of $P^{1/2}$ and the iteration for signal detection, which will be described in the following respectively.

Recursion for computing the initial value of $P^{1/2}$: is specifically a recursive procedure for computing the initial value of the square root matrix $P^{1/2}$ of the estimate error covariance matrix corresponding to the M transmitted signals to be detected. The initial value of $P^{1/2}$ is obtained by a recursive procedure starting from fewer transmitted signals to be detected and working down to more transmitted signals to be detected. The general concept is shown as follows. Firstly, the ordering for detecting the M transmitted signals at the receiving end is set, designated as $t_M, t_{M-1}, \ldots, t_m, \ldots, t_2, t_1$. If $P^{(m-1)/2}$ represents the square root matrix of the estimate error covariance matrix in the case of detecting m−1 (m=2, 3, ..., M) transmitted signals $t_{m-1}, t_2, t_1$, the square root matrix of the estimate error covariance matrix $P^{(m)/2}$ in the case of detecting m transmitted signals $t_m, \ldots, t_2, t_1$ may be recursively obtained from $P^{(m-1)/2}$. Thus, the square root matrix $P^{(1)/2}$ of the estimate error covariance matrix is computed for one transmitted antenna, and $P^{(M)/2}$ is derived from $P^{(1)/2}$ by means of executing M−1 recursions. That is to say, the initial value of the square root matrix $P^{1/2}$ of the estimate error covariance matrix corresponding to the M transmitted signals to be detected is obtained.

Iteration for signal detection: is an iterative procedure for detecting the M transmitted signals to be detected. Detection of the transmitted signals is done by a recursive procedure starting from more transmitted signals to be detected and working down to fewer transmitted signals to be detected, thus arriving at an optimal ordering and detecting the M transmitted signals to be detected in turn according to the optimal ordering. The general concept is shown as follows. It selects one of the M transmitted signals to be detected according to a standard and detects the select signal by using the recursively obtained initial value of the square root matrix $P^{1/2}=P^{(M)/2}$ of the estimate error covariance matrix corresponding to the M transmitted signals to be detected. The effect of the transmitted signal that is detected is then cancelled from the vector of the received signals by using the interference cancellation technology, and the matrix $P^{(M-1)/2}$ corresponding to M−1 transmitted signals to be detected is recursively obtained from the matrix $P^{(M)/2}$. In this way, the M transmitted signals may be detected in turn according to the optimal ordering after M−1 recursions.

According to an embodiment of the present invention, when signals are detected, pre-match filtering may be first performed on the vector $\vec{x}$ of the received signals to obtain the pre-match filtering result $z=H^H\cdot \vec{x}$. Further, the pre-match filtering may also be performed on the channel matrix H to obtain the correlated channel matrix $\Phi=H^H\cdot H$. The pre-match filtering result z and the correlated channel matrix $\Phi$ are then used to perform the above iterations for signal detection, wherein $H^H$ is referred to as a match filter.

In the above more-to-fewer recursive procedure for the signal detection, the matrix $P^{(m)/2}$ corresponding to the m transmitted signals to be detected is obtained, while in the fewer-to-more recursive procedure for computing the initial value of $P^{1/2}$, the matrix $P^{(m)/2}$ corresponding to the m transmitted signals $t_m, \ldots, t_2, t_1$ to be detected is also obtained. However, the m transmitted signals to be detected corresponding to the two $P^{(m)/2}$ are normally not exactly the same, although the M transmitted signals to be detected are exactly the same when m=M. To make a distinction between the two $P^{(m)/2}$ the one obtained from the fewer-to-more recursive procedure for computing the initial value of $P^{1/2}$ is designated by $P_{(t_m)}^{(m)/2}$, which indicates that the m corresponding transmitted signals to be detected are $t_m, \ldots, t_2, t_1$. As discussed above, the ordering $t_M, t_{M-1}, \ldots, t_m, \ldots, t_2, t_1$ used in the recursive procedure for computing initial value of $P^{1/2}$ is predetermined. Accordingly, in the recursive procedure for computing the initial value of $P^{1/2}$, $H^{(m)}$, $P^{(m)}$, $R^{(m)}$, $\Phi^{(m)}$ corresponding to the m transmitted signals to be detected are designated by $H_{(t_m)}^{(m)}$, $P_{(t_m)}^{(m)}$, $R_{(t_m)}^{(m)}$, $\Phi_{(t_m)}^{(m)}$ respectively.

The First Embodiment

In the following, a first embodiment of the method for signal detection in a digital wireless communication system with multiple antennas according to an embodiment of the present invention will be described in detail with reference to FIGS. 3 and 4 as well as the specific equations.

In the system of FIG. 1, upon receiving the signals from the receiving antenna, according to the method of the present invention, the channel matrix H is first estimated. An ordering for detecting the M transmitted signals at the receiving end is subsequently set. After obtaining a full upper triangular matrix as the initial value of $P^{1/2}$ by using the fewer-to-more recursive procedure for computing the initial value of $P^{1/2}$, the optimal ordering is found by using $P^{1/2}$ and the more-to-fewer recursive procedure for signal detection. Then, each transmitted signals are detected in turn by using the interference cancellation method according to the optimal ordering, and the procedure of which is shown in FIGS. 3 and 4.

Figure 3:
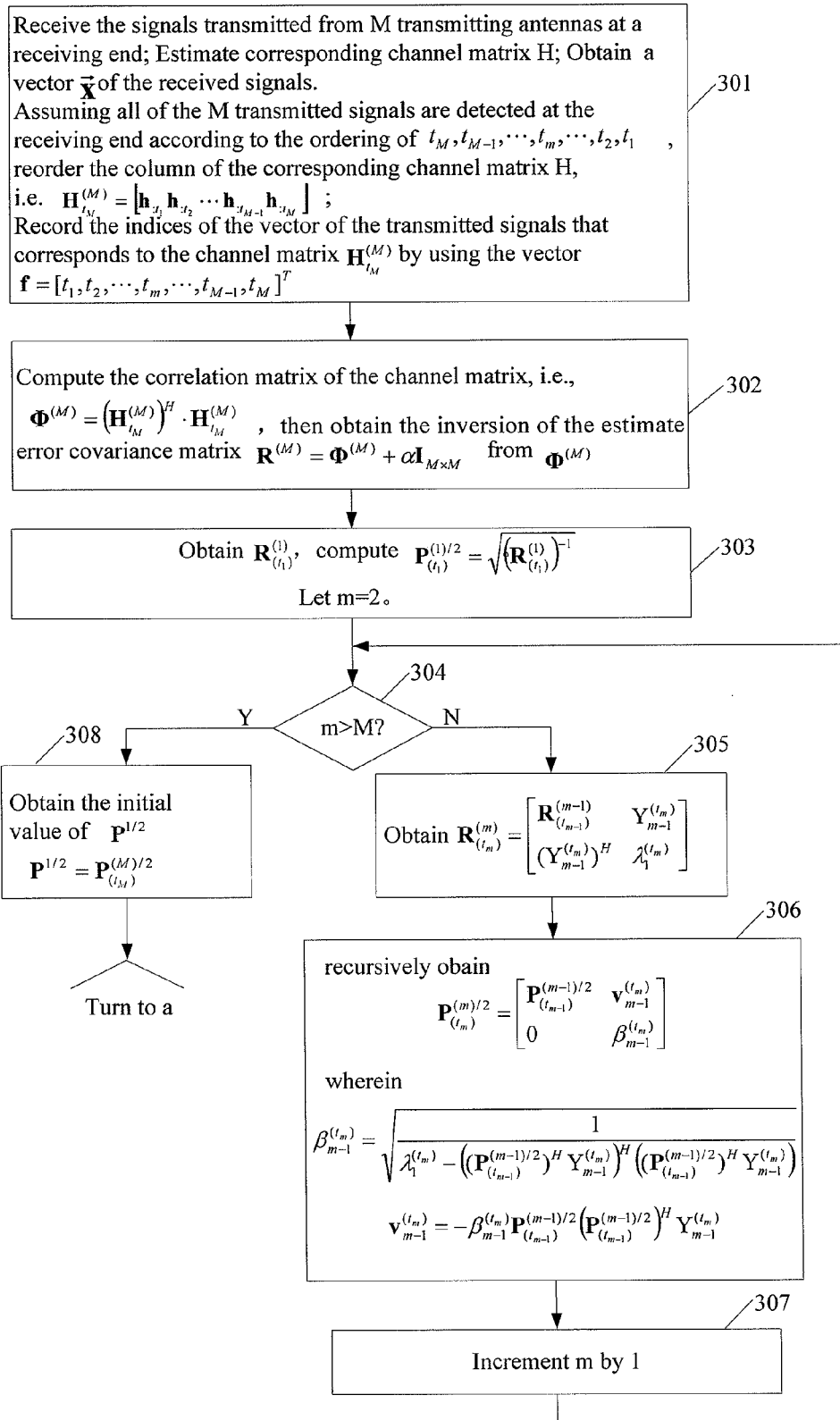
FIG. 3 is a flow chart for obtaining the initial value of $P^{1/2}$ according to a first embodiment of the present invention.

FIG. 3 shows a flow chart for computing the initial value of $P^{1/2}$ according to the first embodiment of the present invention, comprising the following steps:

At step 301, at the receiving end, M signals transmitted respectively from M transmitting antennas at the transmitting end are received, and the M received signals acquired. Channel matrix H composed of the channel coefficients between the transmitting and receiving antennas are acquired from performing channel estimate on the received signals. The received signals are designated with a vector $\vec{x}$. The ordering for detecting the M transmitted signals at the receiving end is predetermined and represented as $t_M, t_{M-1}, \ldots, t_m, \ldots, t_2, t_1$ by using the indices of the transmitted signals. The channel matrix H is reordered in column accordingly, becoming $H_{t_M}^{(M)}=[h_{:t_1} h_{:t_2} \ldots h_{:t_{M-1}} h_{:t_M}]$. Vector $f=[t_1, t_2, \ldots, t_m, \ldots, t_{M-1}, t_M]^T$ is used to record the indices of the transmitted signals corresponding to the channel matrix $H_{t_M}^{(M)}$.

At step 302, first, a correlated channel matrix $\Phi^{(M)}=(H_{t_M}^{(M)})^H \cdot H_{t_M}^{(M)}$ of $H_{t_M}^{(M)}$ is obtained by using $H_{t_M}^{(M)}$, then an inversion $R^{(M)}$ of the estimate error covariance matrix $P^{(m)}$ is derived by using $\Phi^{(M)}$, where $R^{(M)}=(H_{t_M}^{(M)})^H \cdot H_{t_M}^{(M)} + \alpha I_{M\times M}=\Phi^{(M)}+\alpha I_{M\times M}$.

Wherein, $$R^{(M)} = (H_{t_M}^{(M)})^H \cdot H_{t_M}^{(M)} + \alpha I_{M \times M}$$

$$= \begin{bmatrix} (h_{:t_1}^H \cdot h_{:t_1} + \alpha) & h_{:t_1}^H \cdot h_{:t_2} & \cdots & h_{:t_1}^H \cdot h_{:t_M} \\ h_{:t_2}^H \cdot h_{:t_1} & (h_{:t_2}^H \cdot h_{:t_2} + \alpha) & \cdots & h_{:t_2}^H \cdot h_{:t_M} \\ \vdots & \vdots & \ddots & \vdots \\ h_{:t_M}^H \cdot h_{:t_1} & h_{:t_M}^H \cdot h_{:t_2} & \cdots & (h_{:t_M}^H \cdot h_{:t_M} + \alpha) \end{bmatrix}$$

$$= \begin{bmatrix} r_{t_1 t_1} & r_{t_1 t_1} & \cdots & r_{t_1 t_M} \\ r_{t_1 t_2} & r_{t_2 t_2} & \cdots & r_{t_2 t_M} \\ \vdots & \vdots & \ddots & \vdots \\ r_{t_1 t_M} & r_{t_2 t_M} & \cdots & r_{t_M t_M} \end{bmatrix}$$

wherein, the symbol * denotes the conjugate of a complex number.

At step 303, a square root matrix $P_{(t_1)}^{(1)/2}$ of the estimate error covariance matrix for the transmitted signal $t_1$ that will be last detected is computed.

The channel matrix corresponding to the transmitted signal $t_1$ is $H_{(t_1)}^{(1)}=[h_{:t_1}]$. An inversion $R_{(t_1)}^{(1)}$ of the estimate error covariance matrix for the transmitted signal $t_1$ is obtained from $R^{(M)}$, which is computed at step 302, where $R_{(t_1)}^{(1)}=(h_{:t_1})^H \cdot h_{:t_1}+\alpha=r_{t_1 t_1}$. It can be seen that $r_{t_1 t_1}$ is the entry at the first column and first row of $R^{(M)}$.

Now, it is required to compute the square root matrix $P_{(t_1)}^{(1)/2}$ of the estimate error covariance matrix for the transmitted signal $t_1$ that is last detected.

Any $P_{(t_1)}^{(1)/2}$ that satisfies $P_{(t_1)}^{(1)/2}(P_{(t_1)}^{(1)/2})^H=(R_{(t_1)}^{(1)})^{-1}$ is obtained.

For example, from $P_{(t_1)}^{(1)/2}(P_{(t_1)}^{(1)/2})^H=(R_{(t_1)}^{(1)})^{-1}$, it can be obtained $P_{(t_1)}^{(1)/2}=\sqrt{(R_{(t_1)}^{(1)})^{-1}}=\sqrt{(r_{t_1 t_1})^{-1}}$.

Next, the square root matrix, designated as $P_{(t_m)}^{(m)/2}$, of the estimate error covariance matrix for the m transmitted signals $t_m, \ldots, t_2, t_1$ that are last detected may be recursively computed. First, let m equal to 2.

At step 304, it is determined whether the square root matrix of the estimate error covariance matrix for all the transmitted signals have been obtained, that is, it is determined if m is greater than M. If m is greater than M, it shows that the square root matrix of the estimate error covariance matrix for the M transmitted signals is obtained, then the procedure proceeds to step 308. Otherwise, the square root matrix $P_{(t_m)}^{(m)/2}$ of the estimate error covariance matrix for the m transmitted signals is recursively computed by executing steps 305, 306 and 307.

At step 305, the channel matrix corresponding to the m transmitted signals that are last detected is $H_{(t_m)}^{(m)} = [h_{:t_1} \ h_{:t_2} \ldots h_{:t_m}]$, thus, the inversion of the corresponding estimate error covariance matrix is:

$$R_{(t_m)}^{(m)} = (H_{(t_m)}^{(m)})^H \cdot H_{(t_m)}^{(m)} + \alpha I_{(m) \times (m)}.$$

There is the following recursive relationship between $R_{(t_m)}^{(m)}$ and $R_{(t_{m-1})}^{(m-1)}$:

$$R_{(t_m)}^{(m)} = \begin{bmatrix} R_{(t_{m-1})}^{(m-1)} & Y_{m-1}^{(t_m)} \\ (Y_{m-1}^{(t_m)})^H & \lambda_1^{(t_m)} \end{bmatrix},$$

wherein $R_{(t_{m-1})}^{(m-1)}$ is the result of the last recursion or the initial value $R_{(t_1)}^{(1)}$;

$$\lambda_1^{(t_m)} = h_{:t_m}^H \cdot h_{:t_m} + \alpha = r_{t_m t_m},$$

$$Y_{m-1}^{(t_m)} = \begin{bmatrix} h_{:t_1}^H \cdot h_{:t_m} \\ h_{:t_1}^H \cdot h_{:t_m} \\ \vdots \\ h_{:t_{m-1}}^H \cdot h_{:t_m} \end{bmatrix} = \begin{bmatrix} r_{t_1 t_m} \\ r_{t_2 t_m} \\ \vdots \\ r_{t_{m-1} t_m} \end{bmatrix}.$$

It can be seen that both $\lambda_1^{(t_m)}$ and $Y_{m-1}^{(t_m)}$ can be directly obtained from $R^{(M)}$ that is computed at step 302. Specifically, $\lambda_1^{(t_m)}$ is the element at the $m^{th}$ row and $m^{th}$ column of $R^{(M)}$, and $Y_{m-1}^{(t_m)}$ is composed of the first m−1 entries of the $m^{th}$ column of $R^{(M)}$. Thus, $R_{(t_m)}^{(m)}$ may be obtained without any further computation.

At step 306, the square root matrix $P_{(t_m)}^{(m)/2}$ of the estimate error covariance matrix for the m transmitted signals $t_m, \ldots, t_2, t_1$, which are last detected, is computed.

$P_{(t_m)}^{(m)/2}$ may be recursively obtained from $P_{(t_m)}^{(m)/2}$ $(P_{(t_m)}^{(m)/2})^H = (R_{(t_m)}^{(m)})^{-1}$, and the recursion may be specifically shown as follows:

For an arbitrary square matrix A, it can always be transformed into a full upper triangular matrix $B = A\Sigma$ by using an orthogonal transform $\Sigma$. If $A \cdot A^H = C$, then it always holds that $B \cdot B^H = (A\Sigma) \cdot (A\Sigma)^H = A\Sigma\Sigma^H A^H = A \cdot A^H = C$. Thus, there must exist a full upper triangular matrix $P_{(t_m)}^{(m)/2}$ that satisfies $P_{(t_m)}^{(m)/2}(P_{(t_m)}^{(m)/2})^H = (R_{(t_m)}^{(m)})^{-1}$.

$P_{(t_m)}^{(m)/2}$ is a full upper triangular matrix that satisfies $P_{(t_m)}^{(m)/2}(P_{(t_m)}^{(m)/2})^H = (R_{(t_m)}^{(m)})^{-1}$ and $$P_{(t_m)}^{(m)/2} = \begin{bmatrix} P_{(t_{m-1})}^{(m-1)/2} & v_{m-1}^{(t_m)} \\ 0 & \beta_{m-1}^{(t_m)} \end{bmatrix},$$

where, $P_{(t_{m-1})}^{(m-1)/2}$ is the result of the last recursion or the initial value of $P_{(t_1)}^{(1)/2}$, $\beta_{m-1}^{(t_m)}$ is an arbitrary $\beta_{m-1}^{(t_m)}$ that satisfies the requirement and is derived from $$\beta_{m-1}^{(t_m)}(\beta_{m-1}^{(t_m)})^* = \frac{1}{\lambda_1^{(t_m)} - ((P_{(t_{m-1})}^{(m-1)/2})^H Y_{m-1}^{(t_m)})^H ((P_{(t_{m-1})}^{(m-1)/2})^H Y_{m-1}^{(t_m)})},$$

for example, $$\beta_{m-1}^{(t_m)} = \sqrt{\frac{1}{\lambda_1^{(t_m)} - ((P_{(t_{m-1})}^{(m-1)/2})^H Y_{m-1}^{(t_m)})^H ((P_{(t_{m-1})}^{(m-1)/2})^H Y_{m-1}^{(t_m)})}},$$

$$v_{m-1}^{(t_m)} = -\beta_{m-1}^{(t_m)} P_{(t_{m-1})}^{(m-1)/2} (P_{(t_{m-1})}^{(m-1)/2})^H Y_{m-1}^{(t_m)}.$$

The result of the recursion for computing $P_{(t_m)}^{(m)/2}$ is therefore:

$$P_{(t_m)}^{(m)/2} = \begin{bmatrix} P_{(t_{m-1})}^{(m-1)/2} & v_{m-1}^{(t_m)} \\ 0 & \beta_{m-1}^{(t_m)} \end{bmatrix}.$$

At step 307, m is incremented by 1, i.e., m=m+1, then the procedure proceeds to step 304 to recursively compute the square root matrix $P_{(t_m)}^{(m)/2}$ of the estimate error covariance matrix for the m transmitted signals $t_m, \ldots, t_2, t_1$ that are last detected.

At step 308, the square root matrix $P_{(t_M)}^{(M)/2}$ of the estimate error covariance matrix for the M transmitted signals $t_M, t_{M-1}, \ldots, t_m, \ldots, t_2, t_1$ are obtained. $P_{(t_M)}^{(M)/2}$ is the optimal detection ordering determined during the signal detection. The initial value of the matrix $P^{1/2}$ is designated as $P^{1/2} = P_{(t_M)}^{(M)/2}$, which is used to detect each of the transmitted signals in turn according to that optimal detection ordering together with the interference cancellation method.

Figure 4:
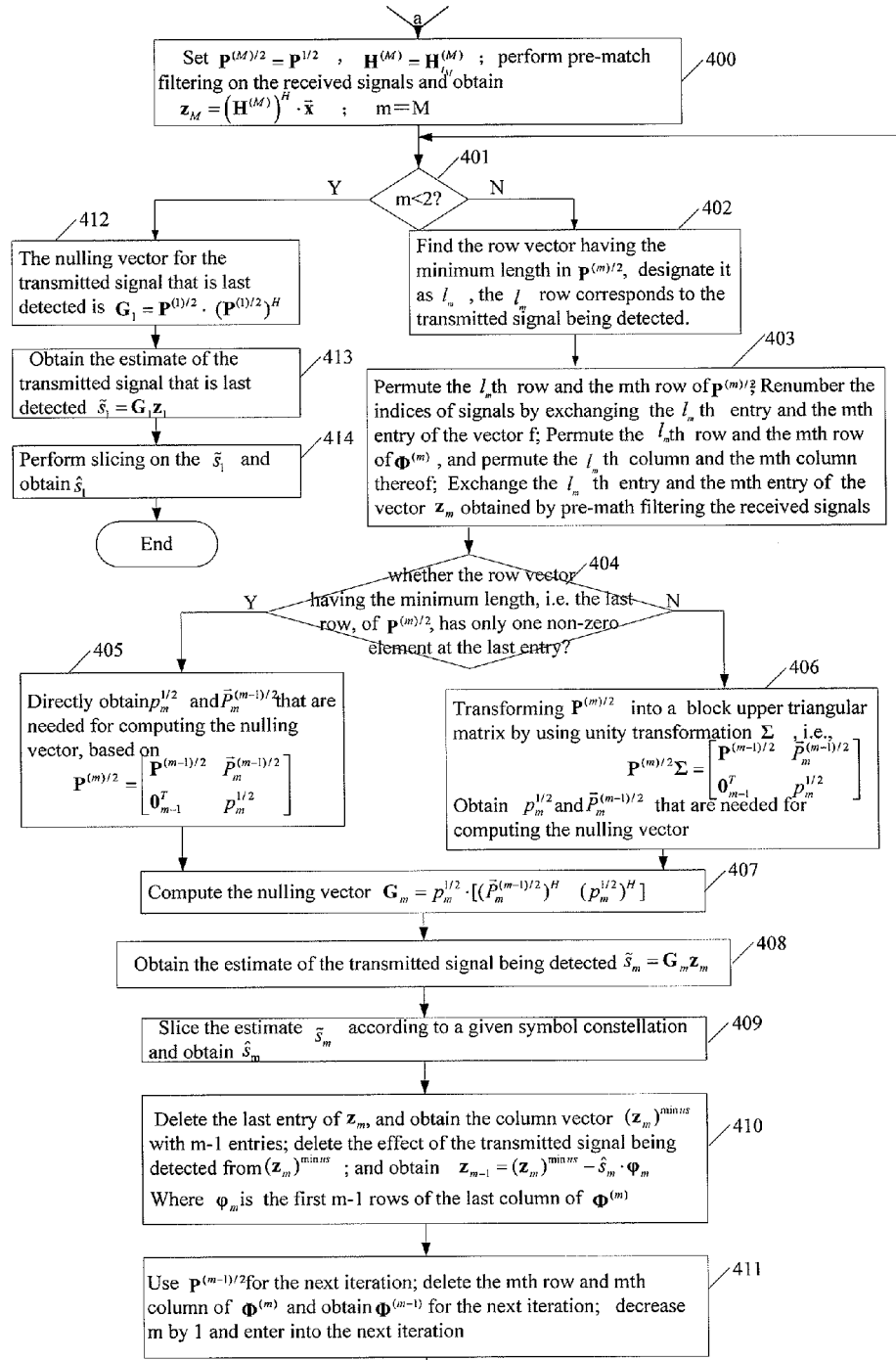
FIG. 4 is a flow chart for iteratively computing the nulling vectors and detecting signals according to the first embodiment of the present invention.

Upon acquiring the initial value of the square root matrix of the estimate error covariance matrix for all the transmitted signals to be detected, the procedure proceeds to the flow for computing the detected signals of FIG. 4, that is, proceeding to the flow beginning from "a" as shown in FIG. 4.

FIG. 4 is a flow chart for signal detection according to the first embodiment of the present invention. The signal detection as shown in FIG. 4 starts from "a". When detecting one of the m transmitted signals, the square root matrix of the estimate error covariance matrix for the m transmitted signals to be detected may be represented as $P^{(m)/2}$.

At step 400, the initial value of $P^{1/2}$ which is used in the recursive procedure for signal detection is designated with $P^{(M)/2}$, i.e., $P^{(M)/2} = P^{1/2}$. The channel matrix corresponding to $P^{(M)/2}$ is $H_{t_M}^{(M)}$, i.e., $H^{(M)} = H_{t_M}^{(M)}$. The indices of the corresponding transmitted signals are still expressed as $f = [t_1, t_2, \ldots, t_m, \ldots, t_{M-1}, t_M]^T$. The received signals $x_1, \ldots, x_N$ are pre-match filtered to obtain the pre-match filtered result $z_M(H^{(M)})^H \cdot \vec{x}$ for the vector $\vec{x}$ of the received signals, where, $(H^{(M)})^H$ is a match filter. Next, the variable of the detected signals is set to be equal to M and the procedure proceeds to step 401.

At step 401, it is determined whether the last transmitted signal is detected, that is, determining if m is less than 2. If m is less than 2, it shows the transmitted signal under detection is the last transmitted signal, and the procedure proceeds to step 412; otherwise, it shows the transmitted signal under detection is not the last transmitted signal, then the iteration for signal detection is executed and the procedure proceeds to step 402.

At step 402, one signal with the best receiving SNR are identified from the m transmitted signals. A row vector of $P^{(m)/2}$ that has the smallest length is computed and designated as the $l_m$ th row. The $l_m$ th row corresponds to the signal with the best receiving SNR among the m transmitted signals, i.e., the signal being detected.

At step 403, the $l_m$ th row and the last row (i.e., the mth row) of $P^{(m)/2}$ are permuted with each other, and the indices of the signals are renumbered by permuting the $l_m$ th and the mth entries of the vector f; the $l_m$ th row and the last row (i.e., the mth row) of $\Phi^{(m)}$ as well as the $l_m$ th column and the last column (i.e., the mth column) of $\Phi^{(m)}$ are permuted with each other; and the $l_m$ th and the last or mth entries of the vector $z_m$ are permuted, where, the vector $z_m$ represents the pre-match filtered result of the plurality of received signals.

At step 404, it is determined whether all the entries of the row vector with the minimum length of $P^{(m)/2}$, i.e., the last row of $P^{(m)/2}$, are all zeroes except for the last entry. If it is determined that all the entries of the row vector with the minimum length of $P^{(m)/2}$ are all zeroes except for the last entry, the procedure proceeds to step 405; otherwise, it proceeds to step 406.

At step 405, $P^{(m-1)/2}$ needed for the next iteration as well as $P_m^{1/2}$ and $\vec{P}_m^{(m-1)/2}$ that are needed to compute the nulling vector may be directly obtained from $$P^{m/2} = \begin{bmatrix} P^{(m-1)/2} & \vec{P}_m^{(m-1)/2} \\ 0_{m-1}^T & p_m^{1/2} \end{bmatrix}$$

and the procedure proceeds to step 407.

At step 406, the orthogonal transform $\Sigma$ is performed on and thereby $P^{(m)/2}$ is transformed into a block upper triangular matrix, that is:

$$P^{m/2}\Sigma = \begin{bmatrix} P^{(m-1)/2} & \vec{P}_m^{(m-1)/2} \\ 0_{m-1}^T & p_m^{1/2} \end{bmatrix}.$$

$P^{(m-1)/2}$ that is needed for the next iteration as well as $P_m^{1/2}$ and $\vec{P}_m^{(m-1)/2}$ that are needed to compute the nulling vector may be obtained from the transformed block upper triangular matrix and the procedure proceeds to step 407.

At step 407, the nulling vector may be computed by using $p_m^{1/2}$ and $\vec{P}_m^{(m-1)/2}$ obtained at step 405 or 406, that is, $G_m = p_m^{1/2} \cdot [(\vec{P}_m^{(m-1)/2})^H (p_m^{1/2})^H]$ At step 408, the estimate $\tilde{s}_m = G_m Z_m$ of the signal being detected may be obtained from the computed nulling vector and the result of the pre-match filtering on the received signals.

At step 409, slicing is performed on the estimate $\tilde{s}_m$ according to the predetermined symbol constellation and thereby $\hat{s}_m$ is obtained.

At step 410, the effect of the transmitted signal that is currently detected is canceled from the result of pre-matched filtering on the received signals. Thus, the problem of the next signal detection is reduced to a problem of detecting m−1 transmitted signals by using the interference cancellation. Specifically, the last entry of the column vector $z_m$ that has m entries is deleted to obtain a column vector $(z_m)^{minus}$ that has (m−1) entries; the interference from the transmitted signal that is currently detected is eliminated from $(z_m)^{minus}$ to thus obtain $z_{m-1} = (z_m)^{minus} - \hat{s}_m \cdot \phi_m$, where $\phi_m$ is the first m−1 rows of the last column of the matrix $\Phi^{(m)}$ i.e., the first m−1 rows of the mth column of the matrix $\Phi^{(m)}$.

At step 411, $P^{(m-1)/2}$ obtained at step 405 or 406 is used for the next iteration. The last row and last column of the matrix $\Phi^{(m)}$, or the mth row and mth column of $\Phi^{(m)}$ are deleted to obtain $\Phi^{(m-1)}$ for the next iteration.

Subsequently, m is decremented by 1, that is, m=m−1, and the procedure proceeds to step 401 to perform the next iteration.

At step 412, the nulling vector corresponding to the last detected signal is $G_1 = P^{(1)/2} \cdot (P^{(1)/2})^H$.

At step 413, the estimate $\tilde{s}_1 = G_1 z_1$ of the last detected signal is obtained.

At step 414, slicing is performed on the estimate $\tilde{s}_1$ according to the predetermined symbol constellation and $\hat{s}_1$ is obtained, then the procedure flow is ended.

According to the flow charts of FIGS. 3 and 4, in the end the result of detecting the transmitted signal is:

According to the ordering of detection, the estimates of the transmitted signals are represented as $[\hat{s}_M, \hat{s}_{M-1}, \ldots, \hat{s}_1]^T$, where the subscript of the estimate of a transmitted signal in the vector $[\hat{s}_M, \hat{s}_{M-1}, \ldots, \hat{s}_1]^T$ only denotes the ordering for detecting the transmitted signal. The original signal indices can be recovered from the signal indices permutation information recorded in the vector f, where the indices permutation is conducted during the signal detection. Specifically, the $m^{th}$ entry of the vector f is represented as $f_m$, m=M, M−1, …, 1, the subscript m of the estimate of the transmitted signal $\hat{s}_m$ in the vector $[\hat{s}_M, \hat{s}_{M-1}, \ldots, \hat{s}_1]^T$ is changed to $f_m$, m=M, M−1, …, 1, and thus in resulted vector $[\hat{s}_{f_M}, \hat{s}_{f_{M-1}}, \hat{s}_{f_1}]^T$, the subscripts of the estimates of the transmitted signals are the original signal indices.

In the procedure for computing the initial value of $P^{1/2}$ as shown in FIG. 3, step 302 can be omitted. It can be seen from the recursive procedure of obtaining $R_{(t_m)}^{(m)}$ from $R_{(t_{m-1})}^{(m-1)}$ that, $R_{(t_m)}^{(m)}$ can be recursively obtained by adding a row and a column composed of $Y_{m-1}^{(t_m)}$ and $\lambda_1^{(t_m)}$ to $R_{(t_{m-1})}^{(m-1)}$, where $Y_{m-1}^{(t_m)}$ and $\lambda_1^{(t_m)}$ can be directly derived from the channel matrix H. According to the relationship between the equations of $Y_{m-1}^{(t_m)}$ and $\lambda_1^{(T_m)}$ the correlated matrix $\Phi^{(M)} = (H_{t_M}^{(M)})^H \cdot H_{t_M}^{(M)}$ of the channel matrix given in the above embodiment, $\Phi^{(M)}$ can also be derived while recursively obtaining $R_{(t_m)}^{(m)}$. The derived $\Phi^{(M)}$ is then used for the interference cancellation during the signal detection as shown in FIG. 4. Specifically, in obtaining $R_{(t_1)}^{(1)} = (h_{:t_1})^H \cdot h_{:t_1} + \alpha$, entries $\Phi_{(t_1)}^{(1)} = (h_{:t_1})^H \cdot h_{:t_1}$ of the matrix $\Phi$ are first obtained, then entries of the matrix R are obtained by using $R_{(t_1)}^{(1)} = \Phi_{(t_1)}^{(1)} + \alpha$; in obtaining $\lambda_1^{(t_m)} = h_{:t_m}^H \cdot h_{:t_m} + \alpha$, entries $\Phi_{(t_m)}^{(1)} = h_{:t_m}^H \cdot h_{:t_m}$ of the matrix $\Phi$ are first obtained, then entries of the matrix R are obtained by using $\lambda_1^{(t_m)} = \Phi_{(t_m)}^{(1)} + \alpha$; and all the entries of the vector $Y_{m-1}^{(t_m)}$ are also the entries of the matrix $\Phi$.

In the iteration procedure for detecting the signals from respective transmitted antennas in turn as shown in FIG. 4, the most essential point is to make the row column corresponding to the signal having the best receiving SNR of $P^{(m)/2}$ take the form of $[0 \ldots 0 \; p_m^{1/2}]$. The method for transforming $P^{(m)/2}$ to a block upper triangular matrix using orthogonal transform, as described at step 406, can be implemented by using Givens Rotation or Householder orthogonal transform, a detailed description of which will be given in the following.

A. Orthogonal Transform Based on Givens Rotation

According to the prior art, an orthogonal transform based on Givens Rotation is expressed by Givens (i, j), which only changes the ith and jth columns of a row vector and turns the ith column of the vector to zero.

If the number of the M transmitting antennas in the system shown in FIG. 1 is 5, the initial value of $P^{1/2}$ which are obtained according to FIG. 3 may be expressed as $$P^{(M)/2} = \begin{bmatrix} \phi_{11} & \phi_{12} & \phi_{13} & \phi_{14} & \phi_{15} \\ 0 & \phi_{22} & \phi_{23} & \phi_{24} & \phi_{25} \\ 0 & 0 & \phi_{33} & \phi_{34} & \phi_{35} \\ 0 & 0 & 0 & \phi_{44} & \phi_{45} \\ 0 & 0 & 0 & 0 & \phi_{55} \end{bmatrix}.$$

Given that the row vector with minimum length as describe in step 402 is the third row of $P^{(M)/2}$, the third and fifth rows are permuted according to step 405, and thereby it is obtained:

$$P^{(M)/2} = \begin{bmatrix} \phi_{11} & \phi_{12} & \phi_{13} & \phi_{14} & \phi_{15} \\ 0 & \phi_{22} & \phi_{23} & \phi_{24} & \phi_{25} \\ 0 & 0 & 0 & 0 & \phi_{55} \\ 0 & 0 & 0 & \phi_{44} & \phi_{45} \\ 0 & 0 & \phi_{33} & \phi_{34} & \phi_{35} \end{bmatrix}.$$

The last row of $P^{(M)/2}$ is then transformed to $[0\ 0\ 0\ 0\ p_5^{1/2}]$ by performing orthogonal transform Givens (3, 4) and Givens (4, 5). First, the third and fourth rows of $P^{(M)/2}$ are transformed to obtain the following matrix:

$$\Pi_1 = P^{(M)/2}\ \text{Givens}(3,4) = \begin{bmatrix} \phi_{11} & \phi_{12} & \phi'_{13} & \phi'_{14} & \phi_{15} \\ 0 & \phi_{22} & \phi'_{23} & \phi'_{24} & \phi_{25} \\ 0 & 0 & 0 & 0 & \phi_{55} \\ 0 & 0 & \times & \phi'_{44} & \phi_{45} \\ 0 & 0 & 0 & \phi'_{34} & \phi_{35} \end{bmatrix}.$$

Next, the fourth and fifth rows of $\alpha_1$ are transformed so as to get the matrix as below:

$$\Pi_2 = \Pi_1\ \text{Givens}(4,5) = \begin{bmatrix} \phi_{11} & \phi_{12} & \phi'_{13} & \phi''_{14} & \phi'_{15} \\ 0 & \phi_{22} & \phi'_{23} & \phi''_{24} & \phi'_{25} \\ 0 & 0 & 0 & \times & \phi'_{55} \\ 0 & 0 & \times & \phi''_{44} & \phi'_{45} \\ 0 & 0 & 0 & 0 & p_5^{1/2} \end{bmatrix}.$$

A block upper triangular matrix is thus obtained after two orthogonal transforms.

In the obtained block upper triangular matrix $\pi_2$, the element at the fifth row and fifth column and the fifth column vector of $\pi_2$ are used to compute a nulling vector for the signal currently being detected, and the sub-matrix $P^{(4)/2}$ composed of the first four rows and columns of $\pi_2$ is obtained for the next iteration, where, $$P^{(4)/2} = \begin{bmatrix} \phi_{11} & \phi_{12} & \phi'_{13} & \phi''_{14} \\ 0 & \phi_{22} & \phi'_{23} & \phi''_{24} \\ 0 & 0 & 0 & \times \\ 0 & 0 & \times & \phi''_{44} \end{bmatrix}.$$

The matrix $P^{(4)/2}$ for the next iteration may be changed into a full upper triangular by permuting the third and fourth rows thereof.

Generally, if the matrix $P^{m/2}$ (m=M, M−1, . . . , 3) may be transformed into a full upper triangular by simple row permutation, the row vector with the minimum length of the matrix $P^{m/2}$ may be permuted to be the last row of $P^{m/2}$. After the permutation, if the elements in the last row but before the $i^{th}$ column are all zeroes, then the matrix may become a block upper triangular matrix by being performed orthogonal transforms Givens(i, i+1)Givens(i+1, i+2) . . . Givens(m−1, m). The block upper triangular matrix obtained through the Givens orthogonal transforms may be further transformed into a full upper triangular matrix by simple row permutation. Thus, $P^{(m-1)/2}$ for the next iteration may be obtained from the Givens orthogonal transformed block upper triangular matrix $$P^{m/2}\Sigma = \begin{bmatrix} P^{(m-1)/2} & \vec{P}_m^{(m-1)/2} \\ 0_{m-1}^T & p_m^{1/2} \end{bmatrix},$$

and $P^{(m-1)/2}$ may also be transformed into a full upper triangular matrix via simple row permutation.

The above description shows that if $P^{m/2}$ (m=M, M−1, . . . , 3) may be transformed into a full upper triangular matrix by simple row permutation, then $P^{(m-1)/2}$ for the next iteration, which is obtained by using the Givens orthogonal transforms, may also be transformed into a full upper triangular matrix via simple row permutation. Since the initial value of $P^{M/2}$ is full upper triangular, each $P^{m/2}$ (m=M, M−1, . . . , 3) may be made full upper triangular by simple row permutation through using the Givens orthogonal transforms, and thus nearly half of the elements of the matrix $P^{m/2}$ are zeroes.

The matrix $P^{m/2}$ in the prior art is not full upper triangular, therefore, m−1 orthogonal transforms based on the Givens Rotations Givens(1,2)Givens(2,3) . . . Givens(m−1,m) are needed to make $P^{m/2}$ full upper triangular. The matrix $P^{m/2}$ obtained in the present invention may be made full upper triangular by simple row permutation, which takes only m−i orthogonal transforms based on the Givens Rotations, i.e., Givens(i,i+1)Givens(i+1, i+2) . . . Givens(m−1, m) A statistical average of i may be deemed to be m/2, thus, in the step of making $P^{m/2}$ full upper triangular, the method of the present invention needs fewer number of Givens Rotations based orthogonal transforms. Meanwhile, roughly half of the elements of the matrix $P^{m/2}$ obtained in the present invention are zeroes, and thus the number of computations that are needed for performing Givens Rotations based orthogonal transforms Givens(i, j) is also very small.

It can be easily seen that, the closer to the optimal detection ordering the ordering for detecting the signals from the M transmitting antennas is as assumed at step 301 of FIG. 3, the fewer non-zero elements the row vector with minimum length of $P^{m/2}$ will have, and thus the statistical average of i will be larger and not equal to m/2 any longer. Thus, the number of Givens Rotations based orthogonal transforms m−i that are needed for transforming $P^{m/2}$ into a block upper triangular matrix will be further decreased.

B. Householder Based Orthogonal Transform

It also considers the situation where the number of the M transmitting antennas is 5, and further assumes that the third row is the row vector with minimum length of $P^{m/2}$. By permuting the third and fifth rows of $P^{m/2}$, it can be obtained:

$$P^{(M)/2} = \begin{bmatrix} \phi_{11} & \phi_{12} & \phi_{13} & \phi_{14} & \phi_{15} \\ 0 & \phi_{22} & \phi_{23} & \phi_{24} & \phi_{25} \\ 0 & 0 & 0 & 0 & \phi_{55} \\ 0 & 0 & 0 & \phi_{44} & \phi_{45} \\ 0 & 0 & \phi_{33} & \phi_{34} & \phi_{35} \end{bmatrix}.$$

According to the present available Householder orthogonal transform technology, if there is a 3*3 Householder orthogonal transform $\Theta 3*3$ that satisfies $[\phi_{33}\phi_{34}\phi_{35}])\Theta_{3*3} = [0\ 0 p_5^{1/2}]$, then the Householder orthogonal transform $$\Theta_{5*5} = \begin{bmatrix} I_{2*2} & 0_{2*3} \\ 0_{3*2} & \Theta_{3*3} \end{bmatrix}$$

satisfies $$[0\ 0\ \phi_{33}\ \phi_{34}\ \phi_{35}] \begin{bmatrix} I_{2*2} & 0_{2*3} \\ 0_{3*2} & \Theta_{3*3} \end{bmatrix} = [0\ 0\ 0\ 0\ p_5^{1/2}].$$

After decomposing $$P^{(M)/2} \text{ into } P^{(M)/2} = \begin{bmatrix} \phi_{11} & \phi_{12} & \phi_{13} & \phi_{14} & \phi_{15} \\ 0 & \phi_{22} & \phi_{23} & \phi_{24} & \phi_{25} \\ 0 & 0 & 0 & 0 & \phi_{55} \\ 0 & 0 & 0 & \phi_{44} & \phi_{45} \\ 0 & 0 & \phi_{33} & \phi_{34} & \phi_{35} \end{bmatrix} = \begin{bmatrix} A_{2*2} & B_{2*3} \\ 0_{3*2} & D_{3*3} \end{bmatrix},$$

by performing Householder orthogonal transform $\Theta_{5*5}$ on $P^{(M)/2}$, the following may be obtained:

$$P^{(M)/2}\Theta_{5*5} = \begin{bmatrix} A_{2*2} & B_{2*3} \\ 0_{3*2} & D_{3*3} \end{bmatrix} \begin{bmatrix} I_{2*2} & 0_{2*3} \\ 0_{3*2} & \Theta_{3*3} \end{bmatrix} = \begin{bmatrix} A_{2*2} & B_{2*3}\Theta_{3*3} \\ 0_{3*2} & D_{3*3}\Theta_{3*3} \end{bmatrix}.$$

For the full upper triangular matrix $P^{(M)/2}$, the last row may be made to take the form of $[0\ 0\ 0\ 0\ p_5^{1/2}]$ by applying a 3*3 Householder orthogonal transform on the last three rows of $P^{(M)/2}$. The Householder orthogonal transformed matrix is a block upper triangular, the sub-matrix of which is used for the next iteration. According to the above result, the matrix used for the next iteration still has many zero-entries, thus the required result may be obtained with a lower-order Householder orthogonal transform, which reduces the computational load significantly over prior art.

It can be easily seen that, as assumed at step 301 of FIG. 3, the closer to the optimal detection ordering the ordering for detecting the signals from the M transmitting antennas is, the fewer non-zero entries the row vector with minimum length of $P^{m/2}$ will have, and thus the lower the order of Householder orthogonal transform used to make the matrix $P^{m/2}$ block upper triangular is, which further reduces the computational load.

In summary, no matter the used orthogonal transform is based on Givens Rotation or Householder, at step 301 of FIG. 3, as long as the presumed ordering for detecting the M transmitting antennas at the receiving end is very close to the real optimal detection ordering, the computational load during the signal detection may be further decreased.

Thus, in a slow fading channel, the ordering for detecting the M transmitting antennas at the receiving end at FIG. 3, step 301 may be set to the optimal detection ordering for the last detection, which would further reduce the computational load. Furthermore, it also helps to reduce the computational load of the transformation procedure such as that at step 406, or to directly obtain the result required for computing the nulling vector according to step 405, in the signal detection as shown in FIG. 4. In a slow fading channel, the channel performance changes very slowly. The currently optimal detection ordering is almost the same as or only slightly different from the last optimal detection ordering. Thereby, it is possible to reduce the computational load by making good use of the property that the initial value of $P^{(M)/2}$ is full upper triangular.

As for a fast fading channel, there are also many known technologies for estimating a detection ordering by using channel matrix H, so as to make the estimate detection ordering get closer to the real optimal detection ordering.

In some certain applications, the ordering for detecting all the transmitted signals is fixed. The transmitted signals are detected in turn according to the fixed ordering, without finding the optimal detection ordering during the signal detection. In this case, the ordering for detecting the M transmitted signals at the receiving end preset at step 301 is the fixed detection ordering. For this reason, at step 402, there is no need to determine which one of the signals to be detected shall be selected as the one being detected by finding the row vector with minimum length in the matrix $P^{(m)/2}$. Rather, the one being detected is selected from the signals to be detected according to the fixed detection ordering. It can be easily seen that the signal to be detected corresponding to the last row of $P^{(m)/2}$ is each time selected as the one being detected. Thus, step 403 is no longer needed, since row permutation of $P^{(m)/2}$ is not performed any more. Step 404 is no longer needed either, since in the last row of $P^{(m)/2}$ only the last element is non-zero. Correspondingly, step 405 is executed every time, and thus step 406 is no longer needed since each time it is step 405 to be executed. The modifications to the above are obvious to those skilled in the art. Therefore, the technical solutions with these modifications are also within the scope of the present invention.

According to the first embodiment of the present invention, the initial value of $P^{1/2}$ is a full upper triangular matrix. More specifically, the initial value of $P^{1/2}$ in the first embodiment is a full upper right triangular matrix. Similarly, the initial value of $P^{1/2}$ may be a matrix in the form of a full triangular matrix, or a matrix that may become full triangular via simple row and column permutations. The former matrix that can become the initial value of $P^{1/2}$ may specifically include a full triangular matrix whose elements above or below its diagonal are all zeroes, such as full upper right triangular, full upper left triangular, full lower right triangular and full lower left triangular. The latter matrix that can become the initial value of $P^{1/2}$ may be a matrix that is able to be transformed into a full triangular matrix whose elements above or below the diagonal are all zeroes. Thus, the initial value of $P^{1/2}$ may take various forms. Accordingly, the ordering of the rows and columns of the intermediate matrices for computing the initial value of $P^{1/2}$ and signal detection has to be changed. A detailed description is given as follows.

For the square root matrix $P^{m/2}$ of the estimate error covariance matrix for m transmitted signals to be detected, each row of $P^{m/2}$ corresponds to each of the m transmitted signals to be detected. Thus, if the rows of $P^{m/2}$ are permuted, then the indices of the m transmitted signals to be detected have to be permuted as well. However, it can be proved from the definition $P^{m/2}(P^{m/2})^H=P^m$ of $P^{m/2}$ that the columns of $P^{m/2}$ may be permuted freely. For example, if $P1^{m/2}$ is obtained by a column permutation, it still satisfies that $P1^{m/2}(P1^{m/2})^H=P^m=P^{m/2}(P^{m/2})^H$.

In the first embodiment of the present invention, $R_{(t_m)}^{(m)}=(H^{(m)})^H \cdot H^{(m)} + \alpha I_{(m)\times(m)}$, where $R_{(t_m)}^{(m)}$ and $R_{(t_{m-1})}^{(m-1)}$ satisfy the recursive relationship $$R_{(t_m)}^{(m)} = \begin{bmatrix} R_{(t_{m-1})}^{(m-1)} & Y_{m-1}^{(t_m)} \\ (Y_{m-1}^{(t_m)})^H & \lambda_1^{(t_m)} \end{bmatrix}.$$

Based on the above matrix property, the row and column composed of $Y_{m-1}^{(t_m)}$, $(Y_{m-1}^{(t_m)})^H$, $\lambda_1^{(t_m)}$, which are added to $R_{(t_{m-1})}^{(m-1)}$, may be placed not only at the last row or the $m^{th}$ row as well as the last column or the $m^{th}$ column, but also at the $i^{th}$ row and the $i^{th}$ column ($i=1, 2, \ldots m$). Moreover, $R_{(t_m)}^{(m)}$ might not be in the form of a matrix. As long as the necessary entries of $R_{(t_m)}^{(m)}$ are acquired, these acquired entries may always be used to compute.

Practically, it is not necessary to determine $R_{(t_m)}^{(m)}$, thus the row of $P^{m/2}$ may be in any ordering, as long as it is recorded which row corresponds to which transmitted signal. It can be seen from the above descriptions that each column of $P^{m/2}$ can be permuted freely as well. Thus, in recursively computing $P_{(t_m)}^{(m)/2}$ from $P_{(t_{m-1})}^{(m-1)/2}$ by using $$P_{(t_m)}^{(m)/2} = \begin{bmatrix} P_{(t_{m-1})}^{(m-1)/2} & v_{m-1}^{(t_m)} \\ 0 & \beta_{m-1}^{(t_m)} \end{bmatrix}, [0 \ \beta_{m-1}^{(t_m)}] \text{ or } [\beta_{m-1}^{(t_m)} \ 0]$$

may be placed at any of $1^{th}, 2^{nd}, \ldots m^{th}$ rows, and $$\begin{bmatrix} v_{m-1}^{(t_m)} \\ \beta_{m-1}^{(t_m)} \end{bmatrix} \text{ or } \begin{bmatrix} \beta_{m-1}^{(t_m)} \\ v_{m-1}^{(t_m)} \end{bmatrix}$$

can be placed at any of $1^{th}, 2^{nd}, \ldots, m^{th}$ columns, while ensuring that the scalar $\beta_{m-1}^{(t_m)}$ locates at the intersection of the added row and column. For example, $P(t_{m-1})^{(m-1)/2}$ may be decomposed to be added a row and column. Given that $m=5$, it can be obtained that $[0 \ \beta_{m-1}^{(t_m)}]$ is $[0 \ 0 \ 0 \ 0\beta]$, and $$\begin{bmatrix} v_{m-1}^{(t_m)} \\ \beta_{m-1}^{(t_m)} \end{bmatrix} \text{ is } \begin{bmatrix} v_1 \\ v_2 \\ v_3 \\ v_4 \\ \beta \end{bmatrix}.$$

Thus, the way of adding a row and column by decomposing $P_{(t_{m-1})}^{(m-1)/2}$ may be expressed as $$\begin{bmatrix} * & v_2 & * & * & * \\ * & v_3 & * & * & * \\ 0 & \beta & 0 & 0 & 0 \\ * & v_4 & * & * & * \\ * & v_1 & * & * & * \end{bmatrix}.$$

Wherein, it is fixed which entries should locate at one row and which entries should locate at one column. Except for this, rows and columns may be permuted freely.

Accordingly, the finally obtained $P_{(t_M)}^{(M)/2}$ might not be full triangular. However, the number of zero elements in $P_{(t_M)}^{(M)/2}$ is fixed, and $P_{(t_M)}^{(M)/2}$ may always become a full triangular matrix by row and column permutation.

More specifically, in order to recursively obtain a full lower right triangular matrix $P_{(t_M)}^{(M)/2}$ other than the full upper right triangular matrix $P_{(t_M)}^{(M)/2}$ in the first embodiment of present invention, $R_{(t_m)}^{(m)}$ and $P_{(t_{m-1})}^{(m-1)/2}$ for the recursion are respectively $$\begin{bmatrix} Y_{m-1}^{(t_m)} & \lambda_1^{(t_m)} \\ R_{(t_{m-1})}^{(m-1)} & (Y_{m-1}^{(t_m)})^H \end{bmatrix} \text{ and } \begin{bmatrix} 0 & \beta_{m-1}^{(t_m)} \\ P_{(t_{m-1})}^{(m-1)/2} & v_{m-1}^{(t_m)} \end{bmatrix}.$$

Alternatively, in order to recursively obtain a full lower left triangular matrix $P_{(t_M)}^{(M)/2}$, $R_{(t_m)}^{(m)}$ and $P_{(t_{m-1})}^{(m-1)/2}$ for the recursion are respectively $$\begin{bmatrix} \lambda_1^{(t_m)} & Y_{m-1}^{(t_m)} \\ (Y_{m-1}^{(t_m)})^H & R_{(t_{m-1})}^{(m-1)} \end{bmatrix} \text{ and } \begin{bmatrix} \beta_{m-1}^{(t_m)} & 0 \\ v_{m-1}^{(t_m)} & P_{(t_{m-1})}^{(m-1)/2} \end{bmatrix}.$$

Accordingly, during signal detection, the matrix $P^{(m)/2}$ has the same property as above, i.e., each column of $P^{(m)/2}$ may be permuted freely, and each row of corresponds to a transmitted signal. Let's assume that $P^{(m)/2}$ is a 5×5 matrix, the signal being detected corresponds to the third row, and there are three non-zero elements in the third row, i.e., the elements at the $2^{nd}$, $3^{rd}$ and $5^{th}$ columns are not zeroes. Under this assumption, $$P^{(m)/2} \text{ is } \begin{bmatrix} * & * & * & * & * \\ * & * & * & * & * \\ 0 & * & * & 0 & * \\ * & * & * & * & * \\ * & * & * & * & * \end{bmatrix}.$$

Next, it only needs to find an orthogonal transform to make the third row have only one non-zero element, which may locate at any column of the third row. However, in order to perform as few Givens transforms as possible, it is preferable to use Givens (2, 3) Givens (3, 5) or Givens (5, 3) Givens (2, 3) and so on. As a result, the only non-zero element may only locate at one of the $2^{nd}$, $3^{rd}$ and $5^{th}$ columns. Given that the only non-zero entry is at the $2^{nd}$ column, then the orthogonal transformed $P^{(m)/2}$ may be expressed as:

$$\begin{bmatrix} * & v_4 & * & * & * \\ * & v_2 & * & * & * \\ 0 & a & 0 & 0 & 0 \\ * & v_3 & * & * & * \\ * & v_1 & * & * & * \end{bmatrix}.$$

Therefore, the nulling vector acquired during the signal detection is actually the third column of $P^{m/2}(P^{m/2})^H$, and $$(P^{m/2})^H = \begin{bmatrix} * & * & 0 & * & * \\ v_4^H & v_2^H & a^H & v_3^H & v_1^H \\ * & * & 0 & * & * \\ * & * & 0 & * & * \\ * & * & 0 & * & * \end{bmatrix}.$$

This is equivalent to multiplying the third row of $P^{(m)/2}$ by $(P^{m/2})^H$, that is, $$[0 \; a \; 0 \; 0 \; 0] \begin{bmatrix} * & * & 0 & * & * \\ v_4^H & v_2^H & a^H & v_3^H & v_1^H \\ * & * & 0 & * & * \\ * & * & 0 & * & * \\ * & * & 0 & * & * \end{bmatrix} = a[v_4^H \; v_2^H \; a^H \; v_3^H \; v_1^H].$$

It can be seen from the above derivation that the nulling vector used in the signal detection is, a product obtained by multiplying the only non-zero element of the row vector having minimum length in $P^{(m)/2}$ with the conjugate transposition of the column having the only non-zero element of the minimum length row vector as an element, where $P^{(m)/2}$ is a square root matrix of the estimate error covariance matrix for the m transmitted signals to be detected, and has only one non-zero element at the row vector having minimum length. $P^{m-1/2}$ used for the next signal detection is: a square root matrix of the estimate error covariance matrix for m−1 transmitted signals to be detected, where the estimate error covariance matrix for m−1 transmitted signals is a (m−1)×(m−1) sub-matrix of the estimate error covariance matrix for m transmitted signals to be detected, and the estimate error covariance matrix for m−1 transmitted signals is obtained by deleting from the estimate error covariance matrix for m transmitted signals to be detected, which has only one non-zero element at the row vector having minimum length, the row vector having the minimum length and the column having the only non-zero element of the row vector having minimum length as an element.

In the recursion procedure as shown in FIG. 3, when computing the first initial values for the recursion according to step 303, $P^{1/2}$ corresponding to the last two or more signals to be detected may be obtained, and the initial value of m which is set at step 303 has to be changed accordingly while other steps of FIG. 3 are kept unchanged. The above procedure is obvious to those skilled in the art, therefore the technical solutions based on the above procedure are also within the scope of the present invention.

In the recursion procedure of steps 305 to 307, the recursive variable m may be incremented by a step length equal to or greater than 2, so that $P^{1/2}$ of the m signals that are last detected may be recursively computed by using a $P^{1/2}$ of m−2 or less signals that are last detected. For example, if the recursive variable m is incremented by 2, the $P_{(t_m)}^{(m)/2}$ in step 306 becomes $$P_{(t_m)}^{(m)/2} = \begin{bmatrix} P_{(t_{m-2})}^{(m-2)/2} & v_{m-2}^{(t_{m-1})} & v_{m-1}^{(t_m)} \\ 0 & \beta_{m-2}^{(t_{m-1})} & \\ 0 & 0 & \beta_{m-1}^{(t_m)} \end{bmatrix},$$

where $\beta_{m-2}^{(t_{m-1})}$ and $v_{m-2}^{(t_{m-1})}$ are still derived from $P_{(t_{m-2})}^{(m-2)/2}$ by using the method of step 306, and designated as $\beta_{m-2}^{(t_{m-1})} = f_1(P_{(t_{m-2})}^{(m-2)/2})$ and $v_{m-2}^{(t_{m-1})} = f_2(P_{(t_{m-2})}^{(m-2)/2})$. $\beta_{m-1}^{(t_m)}$ and $v_{m-1}^{(t_m)}$ may be derived from $P_{(t_{m-2})}^{(m-2)/2}$, specifically, according to $$P_{(t_{m-1})}^{(m-1)/2} = \begin{bmatrix} P_{(t_{m-2})}^{(m-2)/2} & v_{m-2}^{(t_{m-1})} \\ 0 & \beta_{m-2}^{(t_{m-1})} \end{bmatrix} = \begin{bmatrix} P_{(t_{m-2})}^{(m-2)/2} & f_2(P_{(t_{m-2})}^{(m-2)/2}) \\ 0 & f_1(P_{(t_{m-2})}^{(m-2)/2}) \end{bmatrix},$$

$P_{(t_{m-1})}^{(m-1)/2}$ in $$\beta_{m-1}^{(t_m)}(\beta_{m-1}^{(t_m)})^* = \frac{1}{\lambda_1^{(t_m)} - ((P_{(t_{m-1})}^{(m-1)/2})^H Y_{m-1}^{(t_m)})^H ((P_{(t_{m-1})}^{(m-1)/2})^H Y_{m-1}^{(t_m)})}$$

and $$v_{m-1}^{(t_m)} = -\beta_{m-1}^{(t_m)} P_{(t_{m-1})}^{(m-1)/2} (P_{(t_{m-2})}^{(m-1)/2})^H Y_{m-1}^{(t_m)}$$

may be replaced with $$\begin{bmatrix} P_{(t_{m-2})}^{(m-2)/2} & f_2(P_{(t_{m-2})}^{(m-2)/2}) \\ 0 & f_1(P_{(t_{m-2})}^{(m-2)/2}) \end{bmatrix}.$$

Thus, with the modifications made to step 306 as the accordingly made modifications of steps 305 and 307, it is possible to derive $P_{(t_m)}^{(m)/2}$ from $P_{(t_{m-2})}^{(m-2)/2}$. The above modifications are obvious to those skilled in the art. Therefore the technical solutions with these modifications are also within the scope of the present invention.

The present invention proposes an efficient algorithm for deriving $P_{(t_1)}^{(1)/2}$ of step 303 and $\beta_{m-1}^{(t_m)}$ of step 306 in the procedure for calculating the initial value of $P^{1/2}$ as shown in FIG. 3, wherein, $P_{(t_1)}^{(1)/2}$ is any matrix that satisfies $P_{(t_1)}^{(1)/2} (P_{(t_1)}^{(1)/2})^H = (R_{(t_1)}^{(1)})^{-1}$, and $\beta_{m-1}^{(t_m)}$ is any one satisfying $$\beta_{m-1}^{(t_m)}(\beta_{m-1}^{(t_m)})^* = \frac{1}{\lambda_1^{(t_m)} - ((P_{(t_{m-1})}^{(m-1)/2})^H Y_{m-1}^{(t_m)})^H ((P_{(t_{m-1})}^{(m-1)/2})^H Y_{m-1}^{(t_m)})}.$$

The key point of the proposed algorithm is using Coordinate Rotation Digital Computer (CORDIC) iteration algorithm to efficiently compute $P_{(t_1)}^{(1)/2}$ and $\beta_{m-1}^{(t_m)}$, the detailed procedure of which will be described in the following.

The implementation of the CORDIC iteration algorithm is: complex numbers are rotated for a fixed angle on the complex plane for each iteration, and the angle rotated during the $L^{th}$ iteration is $atan(2^{(-L)})$, where L=0, 1, 2, ..., and 'atan' denotes an arc tangent function. Angles corresponding to L=0, 1, 2, 3, 4 and 5 are 45.00000, 26.56505, 14.03624, 7.12502, 3.57633 and 1.78991, respectively. It can be easily seen that the angle corresponding to L+1 is roughly equal to half of the angle corresponding to L. The angle of a complex number Z may be rotated 90 degrees or −90 degrees by multiplying Z with a complex number 0+1i or 0−1i. Thus, a complex number Z may be rotated to any angle within a range of [−180, 180] by using $$\pm 90 + \sum_{L=0}^{N} (\pm atan(2^{(-L)})),$$

that is, the complex number Z may be rotated to any angle on the complex plane, where N is the number of iterations, which is determined according to the accuracy required for the computation. In each iteration, whether the fixed angle of $atan(2^{(-L)})$ is increased or decreased is based on the practical requirement.

First, at step 302, when computing $$R^{(M)} = (H_{t_M}^{(M)})^H \cdot H_{t_M}^{(M)} + \alpha I_{M \times M}$$

$$= \begin{bmatrix} (h_{:t_1}^H \cdot h_{:t_1} + \alpha) & h_{:t_1}^H \cdot h_{:t_2} & \cdots & h_{:t_1}^H \cdot h_{:t_M} \\ h_{:t_2}^H \cdot h_{:t_1} & (h_{:t_2}^H \cdot h_{:t_2} + \alpha) & \cdots & h_{:t_2}^H \cdot h_{:t_M} \\ \vdots & \vdots & \ddots & \vdots \\ h_{:t_M}^H \cdot h_{:t_1} & h_{:t_M}^H \cdot h_{:t_2} & \cdots & (h_{:t_M}^H \cdot h_{:t_M} + \alpha) \end{bmatrix}$$

$$= \begin{bmatrix} r_{t_1 t_1} & r_{t_1 t_2} & \cdots & r_{t_1 t_M} \\ r_{t_1 t_2}^* & r_{t_2 t_2} & \cdots & r_{t_2 t_M} \\ \vdots & \vdots & \ddots & \vdots \\ r_{t_1 t_M}^* & r_{t_2 t_M}^* & \cdots & r_{t_M t_M} \end{bmatrix},$$

the value of an element on the diagonal is not directly computed, rather, a complex number satisfying $g_{t_j t_j}(g_{t_j t_j})^* = r_{t_j t_j}$ is obtained first.

$r_{t_j t_j} = (h_{:t_j}^H \cdot h_{:t_j} + \alpha)$, j=1, 2, . . . , M may be expressed as the square summation of the length of N+1 complex numbers, i.e., $$r_{t_j t_j} = \sum_{n=1}^{N} z_n z_n^* + \sqrt{\alpha} \cdot (\sqrt{\alpha})^*.$$

A complex number whose square summation of length is $z_1 z_1^* + z_2 z_2^*$ is first obtained by using CORDIC. $z_1$ and $z_2$ are then respectively mapped to the real axis or x axis of the complex plane by using CORDIC. After obtaining the lengths of $|z_1|$ and $|z_2|$, a complex number $|z_1|+i|z_2|$ is constructed, which is the required complex number. By recursively using the above method for computing a complex number, a complex number $g_{t_j t_j}$ whose square summation of length is the square summation of the length of N+1 complex numbers $$r_{t_j t_j} = \sum_{n=1}^{N} z_n z_n^* + \sqrt{\alpha} \cdot (\sqrt{\alpha})^*$$

is obtained, i.e., $g_{t_j t_j}(g_{t_j t_j})^* = r_{t_j t_j}$.

For the item $((P_{(t_{m-1})}^{(m-1)/2})^H Y_{m-1}^{(t_m)})^H ((P_{(t_{m-1})}^{(m-1)/2})^H Y_{m-1}^{(t_m)})$ of $$\beta_{m-1}^{(t_m)} = \sqrt{\frac{1}{\lambda_1^{(t_m)} - ((P_{(t_{m-1})}^{(m-1)/2})^H Y_{m-1}^{(t_m)})^H ((P_{(t_{m-1})}^{(m-1)/2})^H Y_{m-1}^{(t_m)})}},$$

if $\eta = (P_{t_{m-1}})^{(m-1)/2})^H Y_{m-1}^{(t_m)}$, then this item may be expressed as $\eta^H \eta$, where $\eta$ is a column vector. This item is therefore also a square summation of the length of a plurality of complex numbers. A complex number f satisfying $ff^* = \eta^H \eta$ can be obtained by using CORDIC according to the above method for obtaining the complex numbers.

$\lambda_1^{(t_m)} = r_{t_m t_m} = g_{t_m t_m}(g_{t_m t_m})^*$ is then substituted into the equation for computing $\beta_{m-1}^{(t_m)}$, that is, $$\beta_{m-1}^{(t_m)} = \sqrt{\frac{1}{g_{t_m t_m}(g_{t_m t_m})^* - ff^*}},$$

where the item $g_{t_m t_m}(g_{t_m t_m})^* - ff^*$ is the square difference of lengths of two complex numbers. A complex number whose length is $g_{t_m t_m}(g_{t_m t_m})^* - ff^*$ may be obtained by using CORDIC. Specifically, the complex number f is first mapped to the x axis by using CORDIC to obtain its length $|f|$; the angle of the complex number $g_{t_m t_m}$ is rotated by using CORDIC so that the real part of $g_{t_m t_m}$ is equal to $|f|$ under a certain accuracy, then the absolute value of the imaginary part of $g_{t_m t_m}$, designated as d, is the needed complex number. d is in fact a real number, and $d^2 = g_{t_m t_m}(g_{t_m t_m})^* - ff^*$, thus $$\beta_{m-1}^{(t_m)} = \frac{1}{d}.$$

Other complex numbers $\beta_{m-1}^{(t_m)}$ satisfying $$\beta_{m-1}^{(t_m)}(\beta_{m-1}^{(t_m)})^* = \frac{1}{\lambda_1^{(t_m)} - ((P_{(t_{m-1})}^{(m-1)/2})^H Y_{m-1}^{(t_m)})^H ((P_{(t_{m-1})}^{(m-1)/2})^H Y_{m-1}^{(t_m)})}$$

may also be acquired in a practical implementation. Comparing with computing a complex $\beta_{m-1}^{(t_m)}$, computing a real $\beta_{m-1}^{(t_m)}$ may reduce the computational load in the next step.

With the above-described method, $\beta_{m-1}^{(t_m)}$ that meets the requirement may be directly obtained without performing the square root operation $$\beta_{m-1}^{(t_m)} = \sqrt{\frac{1}{\lambda_1^{(t_m)} - ((P_{(t_{m-1})}^{(m-1)/2})^H Y_{m-1}^{(t_m)})^H ((P_{(t_{m-1})}^{(m-1)/2})^H Y_{m-1}^{(t_m)})}}.$$

In the above procedure for computing the initial value of $P^{1/2}$, operations for obtaining square root of a real number are realized with CORDIC iterative algorithm. However, CORDIC devices will be required at the receiving end if CORDIC iterative algorithm is to be used, while not all the receiving ends can meet this requirement. In recursively computing the initial value of $P^{1/2}$, there is a step for acquiring the square root of a real number in each iteration, such as steps 303 and 306 of FIG. 3. Such a step is in serial to the other steps, that is, the other steps can only be executed after this step has been completed. In order to avoid the above step for acquiring the square root of a real number, which is in serial to the other steps, the initial value of $P^{1/2}$ may be recursively computed by using another method.

In the procedure for recursively computing the initial value of $P^{1/2}$ as shown in FIG. 3, it can be obtained from $P_{(t_m)}^{(m)/2}$ and $v_{m-1}^{(t_m)}$ that, $$P_{(t_M)}^{(M)/2} = \begin{bmatrix} P_{(t_{M-1})}^{(M-1)/2} & v_{M-1}^{(t_M)} \\ 0_{M-1}^T & \beta_{M-1}^{(t_M)} \end{bmatrix}$$

$$= \begin{bmatrix} P_{(t_{M-1})}^{(M-1)/2} & -\beta_{M-1}^{(t_M)} P_{(t_{M-1})}^{(M-1)/2} \left(P_{(t_{M-1})}^{(M-1)/2}\right)^H Y_{M-1}^{(t_M)} \\ 0_{M-1}^T & \beta_{M-1}^{(t_M)} \end{bmatrix}$$

$$= \begin{bmatrix} P_{(t_1)}^{(1)/2} & -\beta_1^{(t_2)} P_{(t_1)}^{(1)/2}\left(P_{(t_1)}^{(1)/2}\right)^H Y_1^{(t_2)} & \cdots & -\beta_{M-1}^{(t_M)} P_{(t_{M-1})}^{(M-1)/2}\left(P_{(t_{M-1})}^{(M-1)/2}\right)^H Y_{M-1}^{(t_M)} \\ 0 & \beta_1^{(t_2)} & \cdots & \\ \vdots & \vdots & \ddots & \vdots \\ 0 & 0 & \cdots & \beta_{M-1}^{(t_M)} \end{bmatrix}$$

$$= \begin{bmatrix} 1 & -P_{(t_1)}^{(1)/2}\left(P_{(t_1)}^{(1)/2}\right)^H Y_1^{(t_2)} & \cdots & -P_{(t_{M-1})}^{(M-1)/2}\left(P_{(t_{M-1})}^{(M-1)/2}\right)^H Y_{M-1}^{(t_M)} \\ 0 & 1 & \cdots & \\ \vdots & \vdots & \ddots & \vdots \\ 0 & 0 & \cdots & 1 \end{bmatrix}$$

$$\begin{bmatrix} P_{(t_1)}^{(1)/2} & 0 & \cdots & 0 \\ 0 & \beta_1^{(t_2)} & \cdots & 0 \\ \vdots & \vdots & \ddots & \vdots \\ 0 & 0 & \cdots & \beta_{M-1}^{(t_M)} \end{bmatrix}$$

According to the above obtained $P_{(t_M)}^{(M)/2}$ and $P_{(t_M)}^{(M)/2}(P_{(t_M)}^{(M)/2})^H = P_{(t_M)}^{(M)}$, $P_{(t_M)}^{(M)}$ be decomposed into matrices L and D satisfying $P_{(t_M)}^{(M)} = L_{(t_M)}^{(M)} D_{(t_M)}^{(M)} (L_{(t_M)}^{(M)})^H$, where, $$L_{(t_M)}^{(M)} = \begin{bmatrix} 1 & -L_{(t_1)}^{(1)} D_{(t_1)}^{(1)}\left(L_{(t_1)}^{(1)}\right)^H Y_1^{(t_2)} & \cdots & -L_{(t_{M-1})}^{(M-1)} D_{(t_{M-1})}^{(M-1)}\left(L_{(t_{M-1})}^{(M-1)}\right)^H Y_{M-1}^{(t_M)} \\ 0 & 1 & \cdots & \\ \vdots & \vdots & \ddots & \vdots \\ 0 & 0 & \cdots & 1 \end{bmatrix}$$

Similarly, for each of m=1, 2, ..., M, $P_{(t_m)}^{(m)/2}$ can always be decomposed into $P_{(t_m)}^{(m)} = L_{(t_m)}^{(m)} D_{(t_m)}^{(m)} (L_{(t_m)}^{(m)})^H$, thus, $L_{(t_M)}^{(M)}$ can be reformulated as:

$$L_{(t_M)}^{(M)} = \begin{bmatrix} 1 & -P_{(t_1)}^{(1)/2}\left(P_{(t_1)}^{(1)/2}\right)^H Y_1^{(t_2)} & \cdots & -P_{(t_{M-1})}^{(M-1)/2}\left(P_{(t_{M-1})}^{(M-1)/2}\right)^H Y_{M-1}^{(t_M)} \\ 0 & 1 & \cdots & \\ \vdots & \vdots & \ddots & \vdots \\ 0 & 0 & \cdots & 1 \end{bmatrix},$$

$$D_{(t_M)}^{(M)} = \begin{bmatrix} |P_{(t_1)}^{(1)/2}|^2 & 0 & \cdots & 0 \\ 0 & |\beta_1^{(t_2)}|^2 & \cdots & 0 \\ \vdots & \vdots & \ddots & \vdots \\ 0 & 0 & \cdots & |\beta_{M-1}^{(t_M)}|^2 \end{bmatrix}.$$

Moreover, from the equations $P_{(t_1)}^{(1)/2}(P_{(t_1)}^{(1)/2})^H = (R_{(t_1)}^{(1)})^{-1} = (r_{t_1 t_1})^{-1}$ and $$\beta_{m-1}^{(t_m)}\left(\beta_{m-1}^{(t_m)}\right)^* = \frac{1}{\lambda_1^{(t_m)} - \left((P_{(t_{m-1})}^{(m-1)/2})^H Y_{m-1}^{(t_m)}\right)^H \left((P_{(t_{m-1})}^{(m-1)/2})^H Y_{m-1}^{(t_m)}\right)}$$

$$= \frac{1}{\lambda_1^{(t_m)} - \left(Y_{m-1}^{(t_m)}\right)^H P_{(t_{m-1})}^{(m-1)} Y_{m-1}^{(t_m)}},$$

it can be obtained that, $D_{(t_1)}^{(1)} = P_{(t_1)}^{(1)} = (r_{t_1 t_1})^{-1}$;

$$D_{(t_M)}^{(M)} = \begin{bmatrix} D_{(t_1)}^{(1)} & 0 & \cdots & 0 \\ 0 & \dfrac{1}{\lambda_1^{(t_2)} - (Y_1^{(t_2)})^H L_{(t_1)}^{(1)} D_{(t_1)}^{(1)} (L_{(t_1)}^{(1)})^H Y_1^{(t_2)}} & \cdots & 0 \\ \vdots & \vdots & \ddots & \vdots \\ 0 & 0 & \cdots & \dfrac{1}{\lambda_1^{(t_M)} - (Y_{M-1}^{(t_M)})^H L_{(t_{M-1})}^{(M-1)} D_{(t_{M-1})}^{(M-1)} (L_{(t_{M-1})}^{(M-1)})^H Y_{M-1}^{(t_M)}} \end{bmatrix}$$

Mathematically, the definition of $LDL^T$ factor matrices given in "Matrix Computation", Science Press, 2001 is: if the l matrix of a lower left triangular matrix and the d matrix of a diagonal matrix satisfy the relationship of $p = l \cdot d \cdot (l)^H$, then matrices l and d are referred to as the $LDL^T$ factor matrices of the matrix p. According to the property of row and column permutation of matrix, if matrix l becomes an upper right triangular matrix L through row and column permutation, matrix d becomes a diagonal matrix D through row and column permutation based on the column permutation of the matrix l, and matrix p is transformed into a matrix P through row and column permutation based on the row permutation of the matrix l, the matrices L, D and P still satisfy $P = L \cdot D \cdot (L)^H$. Thus, the $LDL^T$ factor matrices L and D of the matrix P of the present invention satisfy the relationship of $P = L \cdot D \cdot (L)^H$, and matrix D may be a diagonal matrix whose elements above or below the diagonal are all zeros, or a matrix that may become said diagonal matrix by means of row and column permutation; matrix L may be a full triangular matrix whose elements above or below the diagonal are all zeros, or a matrix that may become said full triangular matrix by means of row and column permutation. In an embodiment of the present invention, the flow of the inventive method will be described by taking the $LDL^T$ factor matrices L and D of the matrix P, where, the matrices L, D and P satisfy the relationship of $P = L \cdot D \cdot (L)^H$, L is an upper right triangular matrix and D is a diagonal matrix.

It is known from the above description that the square root matrix of the estimate error covariance matrix may be obtained by using the $LDL^T$ factor matrices L and D of a matrix P, which is the estimate error covariance matrix for the transmitted signals. Thus, the present invention proposes another method for computing the initial value of $P^{1/2}$, and the key point of which is to recursively compute the factor matrices L and D satisfying $LDL^T$ factorization of the estimate error covariance matrix for more transmitted signals to be detected, from the factor matrices L and D satisfying $LDL^T$ factorization of the estimate error covariance matrix for fewer transmitted signals to be detected. Then, the square root matrix of the estimate error covariance matrix for all the transmitted signals to be detected are computed from the resulted factor matrices L and D satisfying $LDL^T$ factorization of the estimate error covariance matrix for all of the transmitted signals to be detected.

The Second Embodiment

The second embodiment of the signal detection method for the digital wireless communication system with multiple antennas is described in the following.

Figure 5:
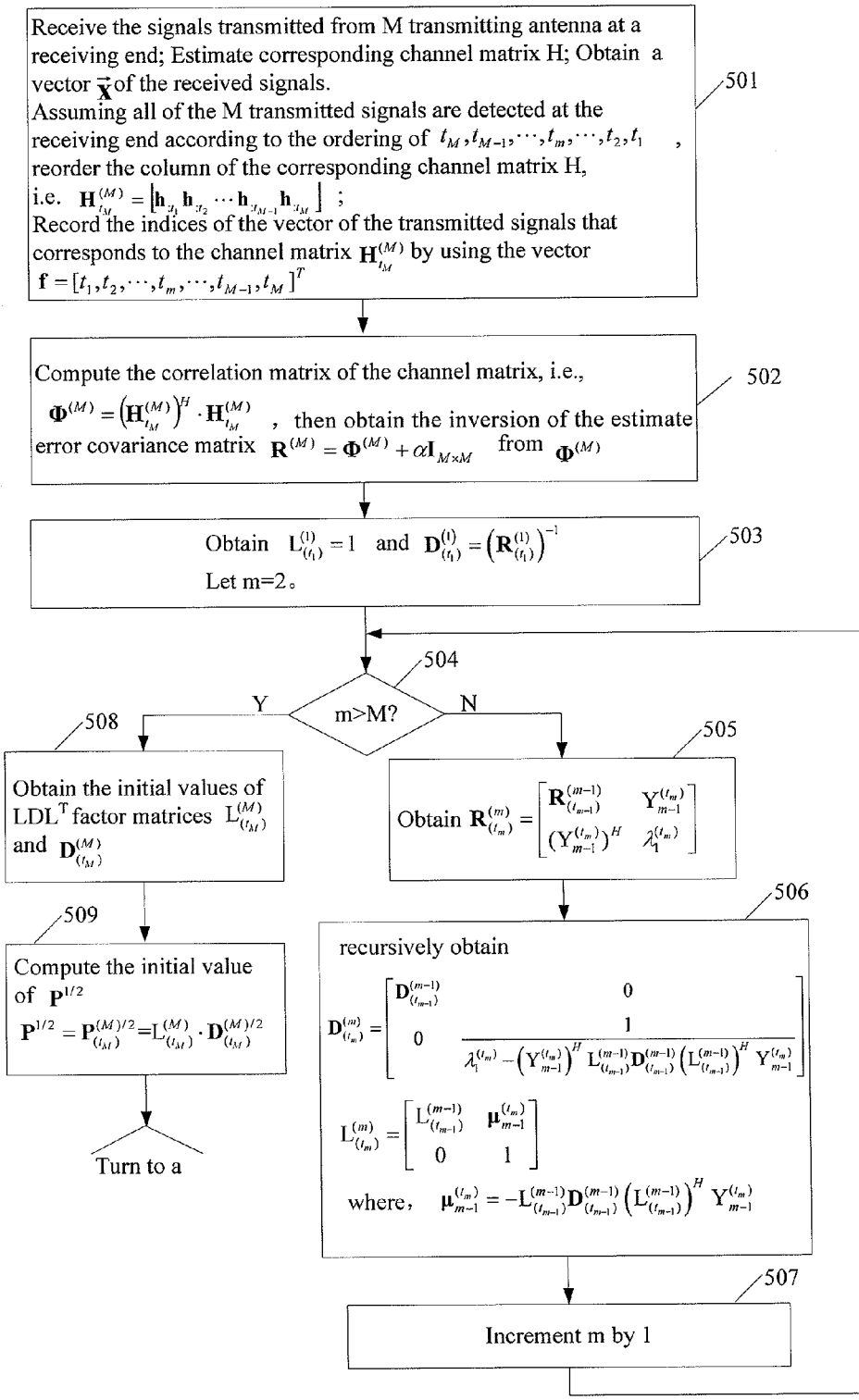
FIG. 5 is a flow chart for obtaining the initial value of $P^{1/2}$ according to a second embodiment of the present invention.

FIG. 5 is a flow chart showing the procedure of recursively computing the initial value of $P^{1/2}$ by using the matrices L and D, which comprises the following steps.

Step 501 is same as step 301.
Step 502 is same as step 302.

At step 503, the LDLT factor matrices L and D of the estimate error covariance matrix for transmitted signal $t_1$ that is last detected is computed, where the matrices L and D are designated with $L_{(t_1)}^{(1)}$ and $D_{(t_1)}^{(1)}$ respectively.

$$L_{(t_1)}^{(1)} = 1, \quad D_{(t_1)}^{(1)} = R_{(t_1)}^{(1)})^{-1}.$$

Next, the LDLT factor matrices L and D of the estimate error covariance matrix for the m transmitted signals $t_m, \ldots, t_2, t_1$ that are last detected, will be recursively computed, where the matrices L and D are designated with $L_{(t_m)}^{(m)}$ and $D_{(t_m)}^{(m)}$ respectively.

First, m is set to 2.

At step 504, it is determined whether the LDLT factor matrices of the estimate error covariance matrix for all the transmitted signals have been obtained, that is, it is determined if m is greater than M. If m is greater than M, it is determined that the LDLT factor matrices of the estimate error covariance matrix for the M transmitted signals are obtained, then the procedure proceeds to step 508; otherwise, the LDLT factor matrices $L_{(t_m)}^{(m)}$ and $D_{(t_m)}^{(m)}$ of the estimate error covariance matrix for the m transmitted signals are recursively computed by executing steps 505, 506 and 507.

Step 505 is same as step 305.

At step 506: the LDLT factor matrices L and D, i.e., $L_{(t_m)}^{(m)}$ and $D_{(t_m)}^{(m)}$, of the estimate error covariance matrix for the m transmitted signals $t_m, \ldots, t_2, t_1$ that are last detected are computed.

The LDLT factor matrices $L_{(t_{m-1})}^{(m-1)}$ and $D_{(t_{m-1})}^{(m-1)}$ of the estimate error covariance matrix for the m−1 transmitted signals $t_{m-1}, \ldots, t_2, t_1$ that are last detected have been obtained at step 503 or from the last recursion of step 506, and the obtained matrices satisfy the relationship of $(L_{(t_{m-1})}^{(m-1)})^{-H} (D_{(t_{m-1})}^{(m-1)})^{-1} (L_{(t_{m-1})}^{(m-1)})^{-1} = P_{(t_{m-1})}^{(m-1)} = (R_{(t_{m-1})}^{(m-1)})^{-1}$.

According to $L_{(t_{m-1})}^{(m-1)}$, $D_{(t_{m-1})}^{(m-1)}$ and $\lambda_1^{(t_m)}$, $Y_{m-1}^{(t_m)}$ obtained at step 505, the matrices $L_{(t_m)}^{(m)}$ and $D_{(t_m)}^{(m)}$ may be recursively computed as $$D_{(t_m)}^{(m)} = \begin{bmatrix} D_{(t_{m-1})}^{(m-1)} & 0 \\ 0 & \chi_{m-1}^{(t_m)} \end{bmatrix};$$

$$L_{(t_m)}^{(m)} = \begin{bmatrix} L_{(t_{m-1})}^{(m-1)} & \mu_{m-1}^{(t_m)} \\ 0 & 1 \end{bmatrix}$$

where, $$\chi_{m-1}^{(t_m)} = \frac{1}{\lambda_1^{(t_m)} - (Y_{m-1}^{(t_m)})^H L_{(t_{m-1})}^{(m-1)} D_{(t_{m-1})}^{(m-1)} (L_{(t_{m-1})}^{(m-1)})^H Y_{m-1}^{(t_m)}},$$

and $$\mu_{m-1}^{(t_m)} = -L_{(t_{m-1})}^{(m-1)} D_{(t_{m-1})}^{(m-1)} (L_{(t_{m-1})}^{(m-1)})^H Y_{m-1}^{(t_m)}.$$

At step 507, m is incremented by 1, i.e., m=m+1, then the procedure proceeds to step 504 to recursively compute the LDLT factor matrices $L_{(t_{m-1})}^{(m-1)}$ and $D_{(t_{m-1})}^{(m-1)}$ of the estimate error covariance matrix for the m transmitted signals $t_m, \ldots, t_2, t_1$ that are last detected.

At step 508, the LDLT factor matrices, i.e., $L_{(t_M)}^{(M)}$ and $D_{(t_M)}^{(M)}$, of the estimate error covariance matrix for the M transmitted signals $t_M, t_{M-1}, \ldots, t_m, \ldots, t_2, t_1$ are obtained.

At step 509, the initial value of $P^{1/2}$ is computed by using $L_{(t_M)}^{(M)}$ and $D_{(t_M)}^{(M)}$. First, a diagonal matrix $D_{(t_M)}^{(M)/2}$ satisfying $D_{(t_M)}^{(M)/2}(D_{(t_M)}^{(M)/2})^H = D_{(t_M)}^{(M)}$ is obtained according to $D_{(t_M)}^{(M)}$, then the initial value of $P^{1/2}$ is obtained as $P_{(t_M)}^{(M)/2} = L_{(t_M)}^{(M)} \cdot D_{(t_M)}^{(M)/2}$.

$P_{(t_M)}^{(M)/2}$ is the initial value of $P^{1/2}$, which is used to detect each transmitted signal in turn by using the interference cancellation method and according to an optimal detection ordering decided during signal detection, and is designated as $P^{1/2} = P_{(t_M)}^{(M)/2}$.

Upon acquiring the initial value of $P^{1/2}$ according to the above steps of FIG. 5, the procedure proceeds to the flow starting from "a" of FIG. 4 for computing the detected signals according to the steps of FIG. 4.

As described at step 405 of FIG. 4, during signal detection, if the real detection ordering is the same as the optimal detection ordering decided when computing the initial value of $P^{1/2}$, the nulling vector needed for the signal detection may be computed directly without performing any orthogonal transform on the square root matrix of the estimate error covariance matrix for the transmitted signals to be detected. When detecting signals according to the presumed optimal detection ordering, upon acquiring the LDLT factor matrices, $L_{(t_M)}^{(M)}$ and $D_{(t_M)}^{(M)}$, of the estimate error covariance matrix for all the transmitted signals, the nulling vector needed for the signal detection may be obtained directly by using $L_{(t_M)}^{(M)}$ and $D_{(t_M)}^{(M)}$, without computing the initial value of the square root matrix $P_{1/2}$ of the estimate error covariance matrix for all the transmitted signals. The detailed procedure is shown in the flow chart of FIG. 6. In the flow shown in FIG. 5, upon acquiring matrices L and D of the estimate error covariance matrix for all the transmitted signals at step 508, the procedure proceeds to the flow of FIG. 6, which is an iteration procedure for computing the nulling vector and a procedure for signal detection. In detecting one of the m transmitted signals to be detected, the LDLT factor matrices L and D of the estimate error covariance matrix for the m transmitted signals to be detected are designated as $L_{(t_m)}^{(m)}$ and $D_{(t_m)}^{(m)}$, respectively.

Figure 6:
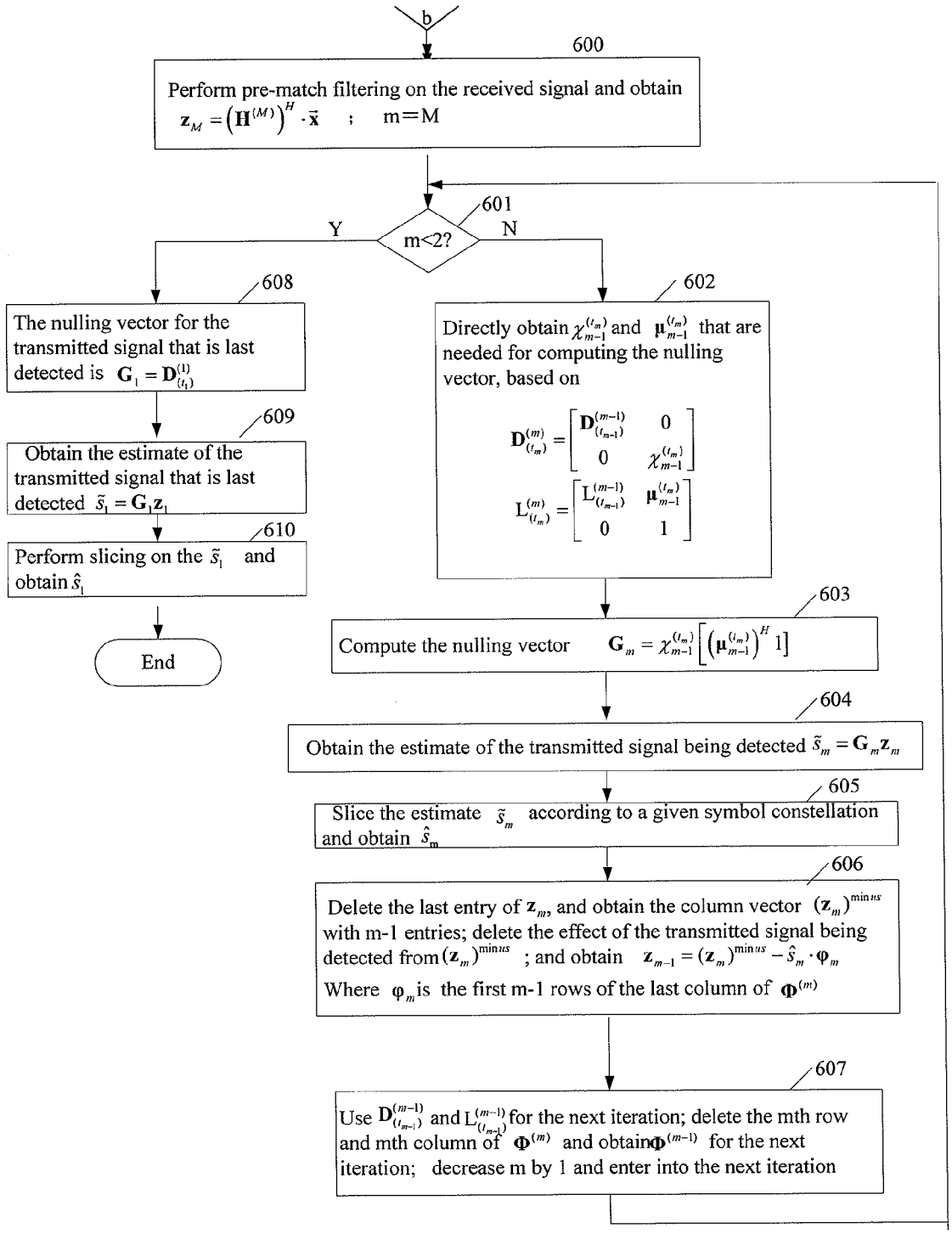
FIG. 6 is a flow chart for iteratively computing the nulling vectors and detecting signals according to the second embodiment of the present invention.

The flow of FIG. 6 starts from "b" and comprises the following steps:

At step 600, the received signals $x_1, \ldots, x_N$ are pre-match filtered to obtain the pre-match filtered result $\vec{z}_M = (H^{(M)})^H \cdot \vec{x}$ for the vector $\vec{x}$ of the received signals, where, $(H^{(M)})^H$ is a match filter; $H^{(M)}$ is the channel matrix corresponding to the predetermined detection ordering and $H^{(M)} = H_{t_M}^{(M)}$. After letting the variable m of the detected signals equal to M, the procedure proceeds to step 601.

At step 601, it is determined whether the last transmitted signal is detected, that is, determining if m is less than 2. If m is less than 2, it is determined that the transmitted signal being detected is the last transmitted signal, and the procedure proceeds to step 608; otherwise, it is determined that the transmitted signal being detected is not the last transmitted signal, then the iteration for signal detection is executed and the procedure proceeds to step 602.

At step 602, $D_{(t_{m-1})}^{(m-1)}$ and $L_{(t_{m-1})}^{(m-1)}$, which are needed for the next iteration, as well as $\chi_{m-1}^{(t_m)}$ and $\mu_{m-1}^{(t_m)}$, which are needed for computing the nulling vector, may be directly obtained from the equations $$D_{(t_m)}^{(m)} = \begin{bmatrix} D_{(t_{m-1})}^{(m-1)} & 0 \\ 0 & \chi_{m-1}^{(t_m)} \end{bmatrix}$$

and $$L_{(t_m)}^{(m)} = \begin{bmatrix} L_{(t_{m-1})}^{(m-1)} & \mu_{m-1}^{(t_m)} \\ 0 & 1 \end{bmatrix}$$

of step 506.

At step 603, the nulling vectors for the m transmitted signals to be detected is calculated by using $\chi_{m-1}^{(t_m)}$ and $\mu_{m-1}^{(t_m)}$ obtained at step 602, that is, $$G_m = \chi_{m-1}^{(t_m)} [(\mu_{m-1}^{(t_m)})^H \quad 1].$$

The detailed derivation is shown as follows. $G_m$ is the last row of $L_{(t_m)}^{(m)} D_{(t_m)}^{(m)} (L_{(t_m)}^{(m)})^H$, that is, the last row of $$\begin{bmatrix} L_{(t_{m-1})}^{(m-1)} & \mu_{m-1}^{(t_m)} \\ 0 & 1 \end{bmatrix} \begin{bmatrix} D_{(t_{m-1})}^{(m-1)} & 0 \\ 0 & \chi_{m-1}^{(t_m)} \end{bmatrix} \begin{bmatrix} L_{(t_{m-1})}^{(m-1)} & \mu_{m-1}^{(t_m)} \\ 0 & 1 \end{bmatrix}^H,$$

which is $$[0 \ldots 01] \begin{bmatrix} D_{(t_{m-1})}^{(m-1)} & 0 \\ 0 & \chi_{m-1}^{(t_m)} \end{bmatrix} \begin{bmatrix} (L_{(t_{m-1})}^{(m-1)})^H & 0^H \\ (\mu_{m-1}^{(t_m)})^H & 1 \end{bmatrix} = [0 \ldots 0 \chi_{m-1}^{(t_m)}] \begin{bmatrix} (L_{(t_{m-1})}^{(m-1)})^H & 0^H \\ (\mu_{m-1}^{(t_m)})^H & 1 \end{bmatrix}$$

$$= \chi_{m-1}^{(t_m)} [(\mu_{m-1}^{(t_m)})^H \quad 1].$$

At step 604, the estimate $\tilde{s}_m = G_m z_m$ of the signal being detected is obtained from the computed nulling vector and the pre-match filtered received signals.

At step 605, slicing is performed on the estimate $\tilde{s}_m$ according to the predetermined symbol constellation, thereby obtaining $\hat{s}_m$.

At step 606, the effect of transmitted signal that is being detected is canceled from the result of the pre-match filtering on the vector of the received signals. By using the interference cancellation, the problem of the next signal detection is reduced to a problem of detecting m−1 transmitted signals. Specifically, the last entry of the column vector $z_m$ that has m entries is deleted to obtain a column vector $(z_m)^{minus}$ that has (m−1) entries; the interference from the transmitted signal being detected is canceled from $(z_m)^{minus}$ so as to obtain $z_{m-1} = (z_m)^{minus} - \hat{s}_m \cdot \phi_m$, where $\phi_m$ is the last column of the matrix $\Phi^{(m)}$, or the first m−1 rows of the last column.

At step 607, $D_{(t_{m-1})}^{(m-1)}$ and $L_{(t_{m-1})}^{(m-1)}$ obtained at step 602 is used for the next iteration. The matrix $\Phi^{(m-1)}$ for the next iteration may be obtained by deleting the last row and last column of the matrix $\Phi^{(m)}$, or deleting the mth row and mth column of $\Phi^{(m)}$.

Subsequently, m is decreased by 1, that is, m=m−1, and the procedure proceeds to step 601 to execute the next iteration.

At step 608, the nulling vector corresponding to last detected signal is $G_1 = D_{(t_1)}^{(1)}$.

At step 609, the estimate $\tilde{s}_1 = G_1 z_1$ of last detected signal is obtained.

At step 610, slicing is performed on the estimate $\tilde{s}_1$ according to the predetermined symbol constellation and thereby $\hat{s}_1$ is obtained, then the flow ends.

When using the method of FIG. 6 to perform signal detection, there is no need to compute the initial value of $P^{1/2}$, since square root matrix $P^{1/2}$ of the estimate error covariance matrix is not needed for signal detection. As a result, it does not need to perform square root operation at all.

In the above two embodiments, the initial value of $P^{1/2}$ can be recursively obtained by using the square root matrix $P^{1/2}$ or matrices L and D of the estimate error covariance matrix P. The signals to be detected may be detected by using initial value of $P^{1/2}$ or matrices L and D as well. It can be seen from the $P = P^{1/2}(P^{1/2})^H$ that $P^{1/2}$ satisfies and $P = L \cdot D \cdot (L)^H$ that the matrices L and D satisfy, that matrix $P^{1/2}$ and matrices L and D are the factors matrices of the matrix P, and one type of factor matrices may be used to recursively compute the other type of factor matrices. Thus, in the present invention, when computing the initial value of $P^{1/2}$ or the initial values of the matrices L and D, one type of factor matrices may be used to recursively compute the other type of factor matrices. This procedure is obvious to those in the art, thus falling within the scope of protection of the present invention.

The signal detection of the present invention may also be applied to other decoding schemes, such as the decoding method described in "A low complexity near ML V-BLAST algorithm", IEEE Vehicular Technology Conference 2005. In this decoding method, it assumes that there are totally M transmitted signals transmitted from M respective transmitting antennas. For the first transmitted signal being detected, it is not assigned at the receiving end; rather, it is considered as any of all the possible values at the receiving end. For example, if the transmitted signal is modulated by 16QAM, 16 possible values will be discussed. For each possible value, interference cancellation is performed on the received signals. Then the method of the present invention is applied to the remaining M−1 transmitted signals. In this case, 16 sets of estimate vectors for the M transmitted signals that are detected are acquired, and each vector of the received signals corresponding to each of the estimate vectors is obtained by multiplying the channel matrix H with each set of estimate vectors. A vector of the received signals, which has the nearest Euclidean distance to a vector of actually received signals, is selected from the resultant 16 vectors of the received signals. The set of estimate vectors corresponding to the selected vector of the received signals is the estimate of the M transmitted signals that are detected.

The signal detection method of the present invention may be applied not only to the MIMO communication system as shown in FIG. 1, but also to the above-described MIMO communication system that employs virtual antenna technology. In the above-described embodiments, there is a one-to-one corresponding relationship between the transmitted signals and transmitting antennas, that is, each transmitted signal is transmitted from one transmitting antenna. In some communication schemes, the transmitting antennas and the transmitted signals do not have a one-to-one corresponding relationship, rather, the symbols included in one set of signals to be transmitted are transmitted by a plurality of transmitting antennas alternately. In this case, the transmitted signals in the above embodiments of the present invention refer to the signals transmitted by the transmitting antennas.

The signal detection method of the present invention may also be applied to a MIMO Orthogonal Frequency Division Multiplexing (OFDM) communication system. The basic principle of the MIMO+OFDM system is shown as follows.

There are M antennas at the transmitting end, and B sub-carriers are used. The frequency bands of the B sub-carriers are orthogonal to each other, and distinguished from each other by using an OFDM decoder. From each of the M transmitting antennas, B groups of data are transmitted by on B sub-carriers respectively. Thus, the M transmitting antenna totally transmit M*B distinct data.

There are N receiving antennas at the receiving end, which receive N received signals respectively. Each of the N received signals is wideband signal spreading over the B sub-carriers. For each of the N wideband received signals, the received signals on the B sub-carriers are first distinguished by using the OFDM decoder, resulting in B narrow band signal components. The each narrow band signal component of the N received signals may be processed by using the method of the present invention and the estimate of the M narrow band transmitted signals on each sub-carrier is then obtained.

If the OFDM modulation step at the transmitting end and the de-modulation step at the receiving end are ignored, the above MIMO+OFDM system is then equivalent to B narrow band MIMO communication systems with multiple antennas. Each of the narrow band MIMO communication systems with multiple antennas operates on the frequency band of the corresponding sub-carrier. Each of the B narrow bank MIMO communication systems is equivalent to the MIMO communication system with multiple-antenna working under the Rayleigh scattering environment as described in the present invention. Thus, the signal detection method of the present invention may also be applied to the MIMO+OFDM system.

The Third Embodiment

Figure 7:
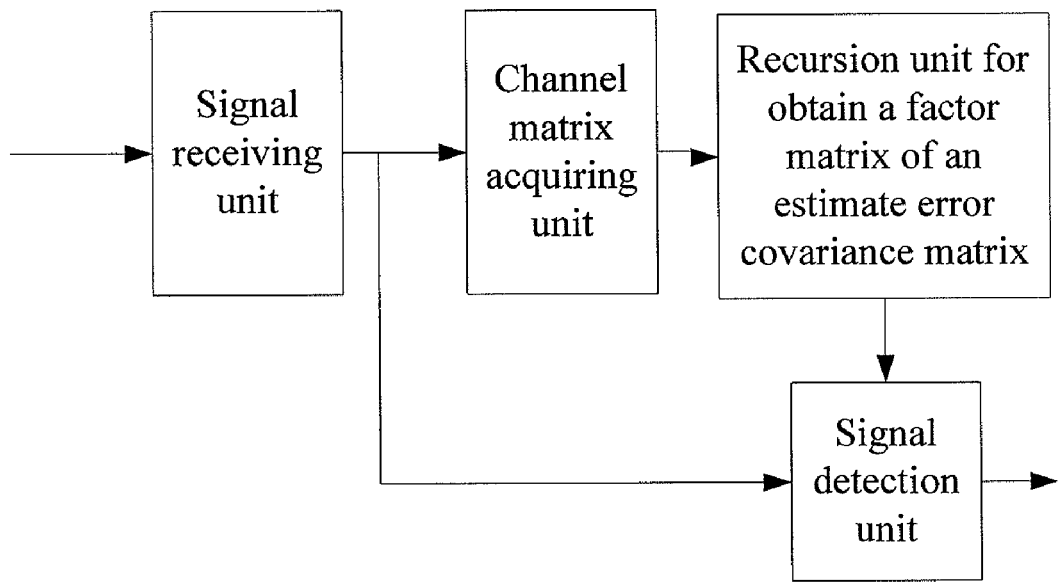
FIG. 7 is a block diagram of the signal detection device according to a third embodiment of the present invention.

The third embodiment describes an apparatus for implementing signal detection in a MIMO system. FIG. 7 is a diagram of the signal detection apparatus according to the third embodiment of the present invention. As shown in FIG. 7, the signal detection apparatus comprises: a signal receiving unit, a channel matrix acquiring unit, a recursion unit for obtaining a factor matrix of an estimate error covariance matrix and a signal detection unit.

The signal receiving unit is configured to receive transmitted signals transmitted from the transmitting end, and send the transmitted signals to the channel matrix acquiring unit and the signal detection unit; the channel matrix acquiring unit is configured to acquire a channel matrix and send it to the recursion unit for obtaining a factor matrix of an estimate error covariance matrix; the recursion unit for obtaining a factor matrix of an estimate error covariance matrix is configured to compute a factor matrix of an estimate error covariance matrix for a part of all the transmitted signals by using the channel matrix, and recursively obtain a factor matrix of an estimate error covariance matrix for a number of transmitted signals by using the channel matrix and the factor matrix of the estimate error covariance matrix for the part of transmitted signals, wherein the number of transmitted signals include the part of transmitted signals and are of a greater number than the part of transmitted signals, and send the obtained factor matrix to the signal detection unit; the signal detection unit is configure to detect the number of transmitted signals including the part of transmitted signals and being of a greater number than the part of transmitted signals, by using the obtained factor matrix.

If a matrix satisfies $P=P^H$, then there is a Cholesky decomposition $P=A \cdot A^H$ for the matrix, where A is a lower left triangular matrix. The LDLT factor matrices of the matrix P, i.e., the lower left triangular matrix L and the diagonal matrix D satisfying $P=L \cdot D \cdot L^H$, are normally referred to as another type of Cholesky factor matrices of the matrix P.

In the various signal detection technologies, there is a need for a method and apparatus for computing Cholesky decomposition of an inversion of a matrix in many situations. If the matrix is R, there are two prior art methods for calculating its Cholesky decomposition. The first one finds the inversion $P=R^{-1}$ of the matrix R first and then calculates its Cholesky decomposition. The other method finds the Cholesky decomposition $R=B \cdot B^H$ of the matrix R first, then it calculates the inversion of B, which is the Cholesky decomposition of the inversion P of the matrix R. Similar to the above methods, there are also two methods for calculating another form of the Cholesky decomposition of an inversion of a matrix. One method calculates the inversion $P=R^{-1}$ of the matrix R first, and then calculates another form of the Cholesky decomposition of the matrix P. The other method finds another form of Cholesky decomposition $R=L \cdot D \cdot L^H$ of the matrix R first, and then finds the inversions of the matrices L and D, which are another form of the Cholesky decomposition of the inversion P of the matrix R.

In the above described steps 301 to 308 of the flow chart shown in FIG. 3, in which the initial value of $P^{1/2}$ according to the first embodiment of the present invention is computed, $P^{1/2}$ that satisfies $P^{1/2} \cdot (P^{1/2})^H = P = R^{-1}$ is directly obtained from the matrix R. $P^{1/2}$ is a upper right triangular matrix. As discussed above, the new matrix $P^{1/2}$ obtained by permuting any two columns of $P^{1/2}$ satisfies $P^{1/2} \cdot (P^{1/2})^H = P$ as well. After permuting any two rows of $P^{1/2}$, the new matrix $P^{1/2}$ obtained by correspondingly permuting the two rows and columns of P still satisfies $P^{1/2} \cdot (P^{1/2})^H = P$. Thus, the upper right triangular matrix $P^{1/2}$ may be transformed into a lower left triangular matrix $P^{1/2}$ by permuting the rows and columns of $P^{1/2}$. Meanwhile, the corresponding rows and columns of P are permuted accordingly to obtain a new matrix P, and thereby the new lower left triangular matrix $P^{1/2}$ and the new matrix P still satisfy $P^{1/2} \cdot (P^{1/2})^H = P$. This shows that the matrix $P^{1/2}$ obtained from steps 301 to 308 is equivalent to the Cholesky decomposition of the matrix P. In fact, steps 301 to 308 perform the method for obtaining the Cholesky decomposition of the inversion $P=R^{-1}$ of matrix R directly from the matrix R. Compared with the above two method for computing the Cholesky decomposition of a matrix, this method requires less number of computations. Moreover, since $P^{1/2}$ is obtained from R directly, there is no need for intermediate results, which avoids the slicing errors caused by the limited slicing accuracy of the intermediate results when realizing the method with fixed point number.

In the above described steps 501 to 508 of the flow chart shown in FIG. 5, in which the initial value of $P^{1/2}$ is computed by using matrices L and D, factor matrices L and D of the matrix P that satisfy $L \cdot D \cdot L^H = P$ are directly obtained from the matrix R, where L is a upper right triangular matrix, and D is a diagonal matrix. It can be easily verified that a new lower left triangular matrix L can be obtained by permuting the rows and columns of L. By permuting the rows and columns of D and P accordingly, the newly obtained D and the new lower left triangular matrix L as well as the newly obtained P would still satisfy $L \cdot D \cdot L^H = P$. This shows that the matrices L and D obtained from steps 501 to 508 are equivalent to another form of Cholesky decomposition of the matrix P. In fact, steps 501 to 508 are the other method for obtaining the Cholesky decomposition of the inversion $P=R^{-1}$ of R directly from R. Compared with the above two method for computing the another Cholesky decomposition of an inversion of a matrix, this method requires less computational load. Moreover, since $P^{1/2}$ is obtained from R directly, there is no need for intermediate results, which avoids the slicing error caused by the limited slicing accuracy of the intermediate results when realizing the method with fixed point number.

A method for computing the factor matrix of an inversion of a matrix will be described in the following. The method will be described in the fourth or the fifth embodiment. The fourth embodiment is in fact a kind of rephrasing of steps 301 to 308 of the flow chart shown in FIG. 3, in which the initial value of $P^{1/2}$ is computed according to the first embodiment, and the fifth embodiment is in fact a kind of rephrasing of steps 501 to 508 of the flow chart shown in FIG. 5, in which the initial value of $P^{1/2}$ is obtained by using matrices L and D. The two methods are rephrased such that the reader can fully understand the solutions.

The Fourth Embodiment

In the fourth embodiment, the method for computing a square root matrix of an inversion of an M×M matrix will be described. The M×M matrix is represented as $$R = \begin{bmatrix} r_{11} & r_{12} & \cdots & r_{1M} \\ r_{21} & r_{22} & \cdots & r_{2M} \\ \vdots & \vdots & \ddots & \vdots \\ r_{M1} & r_{M1} & \cdots & r_{MM} \end{bmatrix}.$$

The matrix R meets the requirement that the matrix itself is equal to its conjugate transposition $R^H$.

Figure 8:
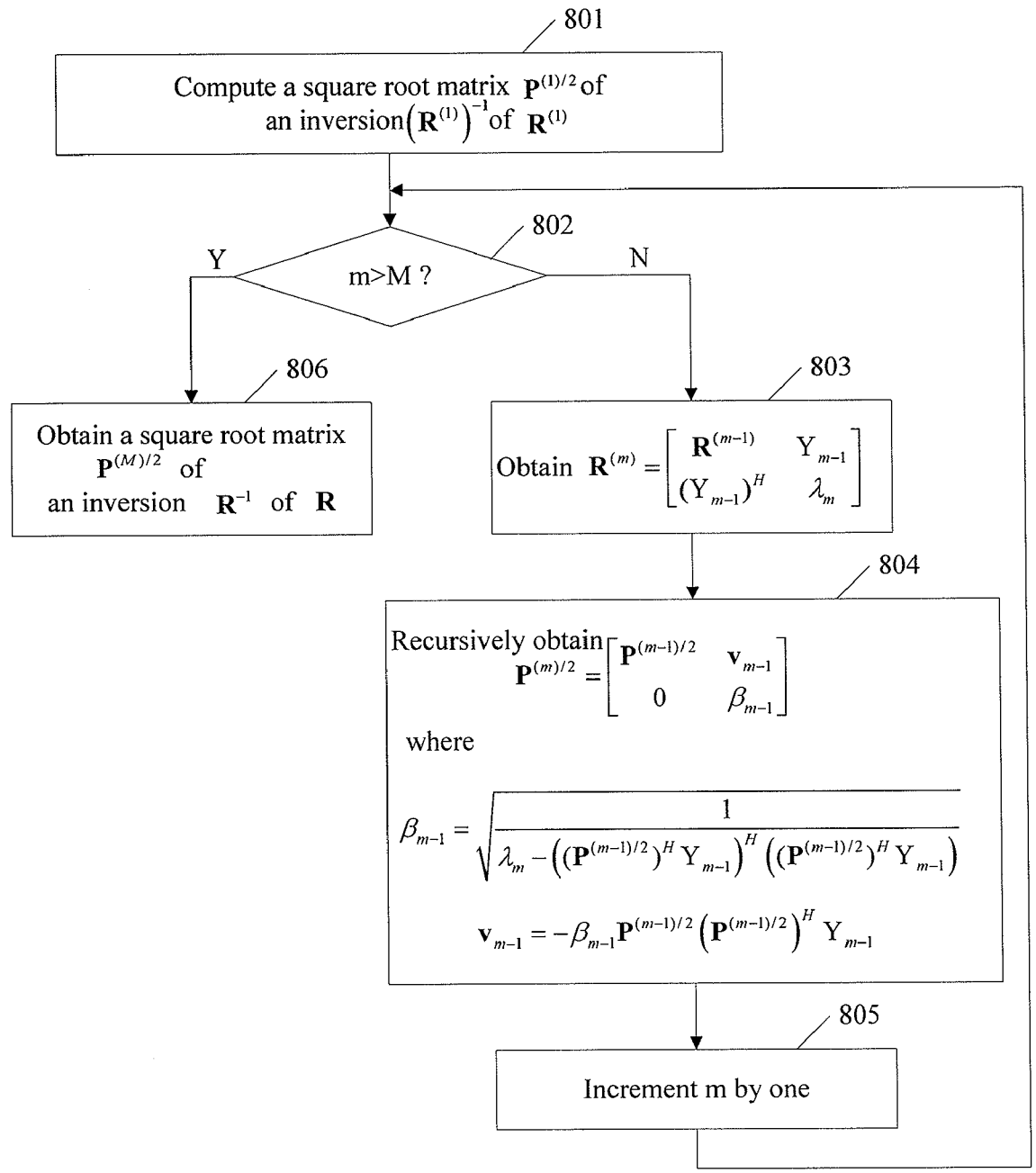
FIG. 8 is a flow chart for computing square root matrix of an inversion of a matrix according to a fourth embodiment of the present invention.

In the following, steps for computing the square root matrix of the inversion of the matrix R will be described with reference to the flow shown in FIG. 8. Specifically, the method comprises the follow steps:

At step 801, the square root matrix $P^{(1)/2}$ of the inversion $(R^{(1)})^{-1}$ of $R^{(1)} = [r_{11}]$ is computed.

$R^{(1)}$ is a sub-matrix composed of the first row and first column of the matrix R. In this embodiment, the initial sub-matrix for recursion is a sub-matrix with one row and one column. In a practical application, it is obvious that a sub-matrix having two rows and columns up to k rows and columns (k<M) may be used as the initial sub-matrix for recursion.

Any $P^{(1)/2}$ satisfying $P^{(1)/2}(P^{(1)/2})^H = (R^{(1)})^{-1}$ may be obtained from $P^{(1)/2}(P^{(1)/2})^H = (R^{(1)})^{-1}$, for example, $P^{(1)/2} = \sqrt{(R^{(1)})^{-1}} = \sqrt{(r_{11})^{-1}}$ may be obtained.

The recursion variable m is set, i.e., m=2.

At step 802, it is determined whether the factor matrix of the inversion of the matrix R is obtained, that is, whether m is greater than M. If m is greater than M, the procedure proceeds to step 806; otherwise, it proceeds to step 803.

At step 803, a matrix $R^{(m)}$ for the current recursion is obtained. $R^{(m)}$ is obtained by adding one row and one column to the matrix $R^{(m-1)}$ used in the last recursion, specifically, $$R^{(m)} = \begin{bmatrix} R^{(m-1)} & Y_{m-1} \\ (Y_{m-1})^H & \lambda_m \end{bmatrix}.$$

Where, $R^{(m)}$ is a sub-matrix composed of the first m rows and columns of the matrix R, specifically, $$R^{(m)} = \begin{bmatrix} r_{11} & r_{12} & \cdots & r_{1m} \\ r_{21} & r_{22} & \cdots & r_{2m} \\ \vdots & \vdots & \ddots & \vdots \\ r_{m1} & r_{m1} & \cdots & r_{mm} \end{bmatrix}; \text{ and}$$

$R^{(m-1)}$ is a sub-matrix composed of the first m−1 rows and columns of the matrix R, specifically, $$R^{(m-1)} = \begin{bmatrix} r_{11} & r_{12} & \cdots & r_{1(m-1)} \\ r_{21} & r_{22} & \cdots & r_{2(m-1)} \\ \vdots & \vdots & \ddots & \vdots \\ r_{(m-1)1} & r_{(m-1)1} & \cdots & r_{(m-1)(m-1)} \end{bmatrix};$$

$Y_{m-1}$ is a vector composed of the first m−1 entries of the $m^{th}$ column of the matrix R, specifically, $$Y_{m-1} = \begin{bmatrix} r_{1m} \\ r_{2m} \\ \vdots \\ r_{(m-1)m} \end{bmatrix}; \text{ and}$$

$\lambda_m$ is the element at the $m^{th}$ row and $m^{th}$ column of the matrix R, specifically it is $r_{mm}$.

The sub-matrix $R^{(m)}$ for the recursion is extracted from the diagonal of the matrix R, that is, the sub-matrix $R^{(m)}$ satisfies the requirement that the sub-matrix $R^{(m)}$ is equal to its conjugate transposition $(R^{(m)})^H$.

In a real decomposing procedure, there is no need to get the whole structure of $R^{(m)}$; rather, it only needs to get $Y_{m-1}$ and $\lambda_m$, which can both be extracted from the matrix R directly.

At step 804, the square root matrix $P^{(m)/2}$ of the inversion $(R^{(m)})^{-1}$ of $R^{(m)}$ is computed.

$P^{(m)/2}$ is recursively computed from $P^{(m)/2}$ $(P^{(m)/2})^H = (R^{(m)})^{-1}$.

$$P^{(m)/2} = \begin{bmatrix} P^{(m-1)/2} & v_{m-1} \\ 0 & \beta_{m-1} \end{bmatrix}$$

is a full upper triangular matrix $P^{(m)/2}$ which satisfies $P^{(m)/2}(P^{(m)/2})^H = (R^{(m)})^{-1}$, where, $P^{(m-1)/2}$ is the result of the last recursion or is $P^{(1)/2}$ obtained at step 801, $\beta_{m-1}$ is an arbitrary $\beta_{m-1}$ that satisfies and is derived from $$\beta_{m-1}(\beta_{m-1})^* = \frac{1}{\lambda_m - ((P^{(m-1)/2})^H Y_{m-1})^H ((P^{(m-1)/2})^H Y_{m-1})},$$

such as $$\beta_{m-1} = \sqrt{\frac{1}{\lambda_m - ((P^{(m-1)/2})^H Y_{m-1})^H ((P^{(m-1)/2})^H Y_{m-1})}},$$

and $$v_{m-1} = -\beta_{m-1} P^{(m-1)/2} (P^{(m-1)/2})^H Y_{m-1}.$$

Thus, the result of recursively computing $$P^{(m)/2} \text{ is: } P^{(m)/2} = \begin{bmatrix} P^{(m-1)/2} & v_{m-1} \\ 0 & \beta_{m-1} \end{bmatrix}.$$

At step 805: m is incremented by one, i.e., m=m+1, then the procedure proceeds to step 802.

During the recursion, m may be incremented by an integer greater than 1, for example, m=m+2, or m=m+3. This means that if a square root matrix of an inversion of a 2×2 sub-matrix is computed in the current recursion, then in the next recursion, a square root matrix of an inversion of a 4×4 sub-matrix may be directly computed, or a square root matrix of an inversion of a 5×5 sub-matrix may directly computed.

At step 806, the square root matrix $P^{(M)/2}$ of the inversion $R^{-1}$ of the matrix R is obtained, where the obtained $P^{(M)/2}$ satisfies the relationship of $P^{(M)/2}(P^{(M)/2})^H = R^{-1}$.

The Fifth Embodiment

In the fifth embodiment, the method for computing $LDL^T$ factor matrices L and D of an inversion of an M×M matrix will be described. The M×M matrix is represented as $$R = \begin{bmatrix} r_{11} & r_{12} & \cdots & r_{1M} \\ r_{21} & r_{22} & \cdots & r_{2M} \\ \vdots & \vdots & \ddots & \vdots \\ r_{M1} & r_{M1} & \cdots & r_{MM} \end{bmatrix}.$$

The matrix R meets the requirement that the matrix itself is equal to its conjugate transposition $R^H$.

Figure 9:
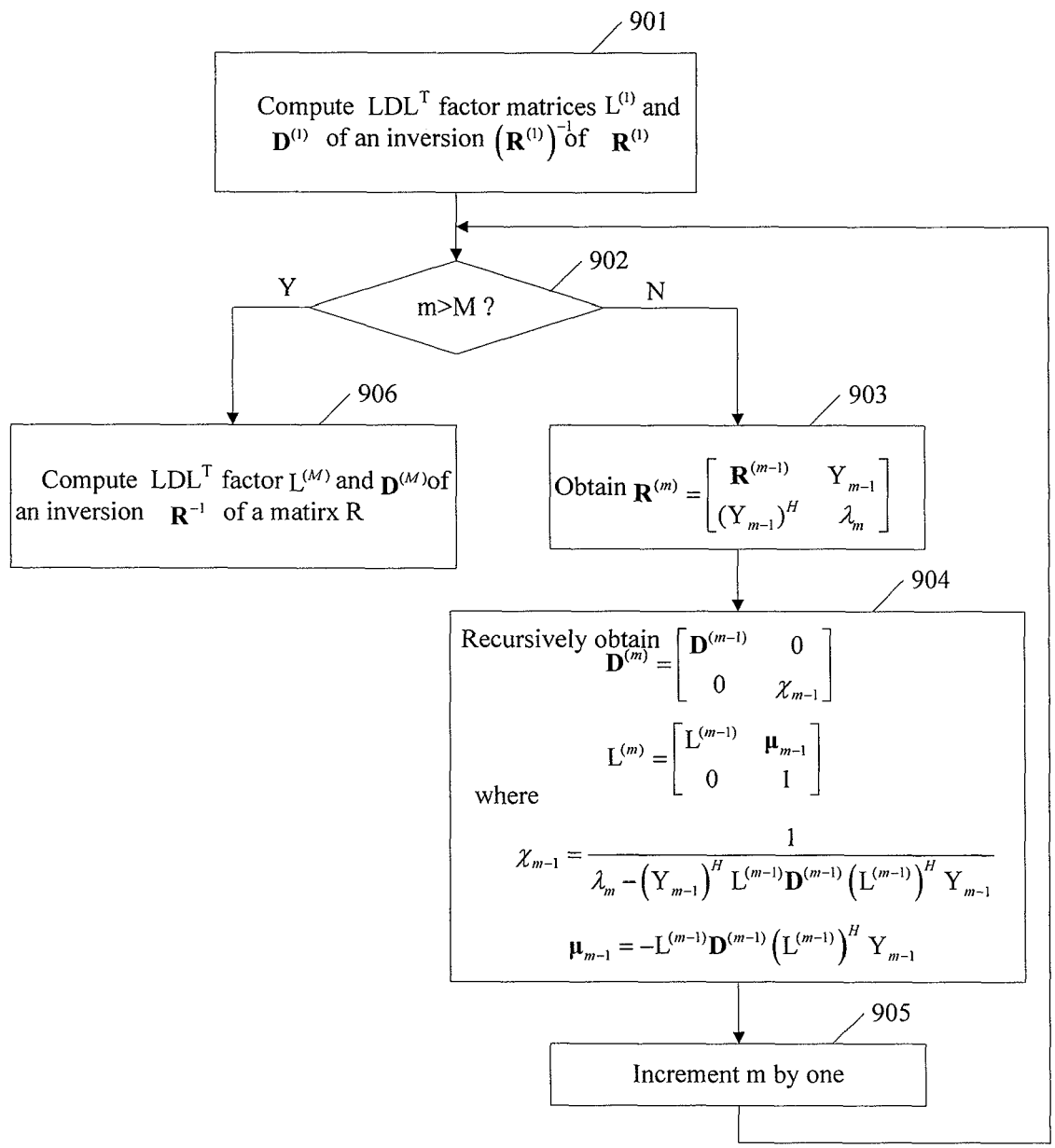
FIG. 9 is a flow chart for computing $LDL^T$ factor matrices of an inversion of a matrix according to a fifth embodiment of the present invention.

In the following, steps for computing the matrices L and D of the inversion of the matrix R will be described with reference to the flow shown in FIG. 9. Specifically, the method comprises the follow steps:

At step 901: the factor matrices L and D of the inversion $(R^{(1)})^{-1}$ of $R^{(1)}=[r_{1,1}]$ are computed and designated with $L^{(1)}$ and $D^{(1)}$ respectively.

$$L^{(1)}=1, D^{(1)}=(R^{(1)})^{-1}.$$

Where, $R^{(1)}$ is a sub-matrix composed of the first row and first column of the matrix R. In this embodiment, the initial sub-matrix for recursion is a sub-matrix with one row and one column. In a practical application, it is obvious that a sub-matrix having two rows and columns up to k rows and columns (k<M) may be used as the initial sub-matrix for recursion.

The recursion variable m is set to 2, i.e., m=2.

At step 902: it is determined whether the $LDL^T$ factor matrices of the inversion of the matrix R are obtained, that is, whether m is greater than M. If m is greater than M, the procedure proceeds to step 906; otherwise, it proceeds to step 903.

At step 903: matrix $R^{(m)}$ for the current recursion is obtained. $R^{(m)}$ is obtained by adding one row and one column to the matrix $R^{(m-1)}$ used in the last recursion, specifically, $$R^{(m)} = \begin{bmatrix} R^{(m-1)} & Y_{m-1} \\ (Y_{m-1})^H & \lambda_m \end{bmatrix}.$$

Where, $R^{(m)}$ is a sub-matrix composed of the first m rows and columns of the matrix R, specifically, $$R^{(m)} = \begin{bmatrix} r_{11} & r_{12} & \cdots & r_{1m} \\ r_{21} & r_{22} & \cdots & r_{2m} \\ \vdots & \vdots & \ddots & \vdots \\ r_{m1} & r_{m1} & \cdots & r_{mm} \end{bmatrix}; \text{ and}$$

$R^{(m-1)}$ is a sub-matrix composed of the first m−1 rows and columns of the matrix R, i.e., $$R^{(m-1)} = \begin{bmatrix} r_{11} & r_{12} & \cdots & r_{1(m-1)} \\ r_{21} & r_{22} & \cdots & r_{2(m-1)} \\ \vdots & \vdots & \ddots & \vdots \\ r_{(m-1)1} & r_{(m-1)1} & \cdots & r_{(m-1)(m-1)} \end{bmatrix};$$

$Y_{m-1}$ is a vector composed of the first m−1 entries of the $m^{th}$ column of the matrix R, specifically, $$Y_{m-1} = \begin{bmatrix} r_{1m} \\ r_{2m} \\ \vdots \\ r_{(m-1)m} \end{bmatrix}; \text{ and}$$

$\lambda_m$ is the element at the $m^{th}$ row and $m^{th}$ column of the matrix R, specifically it is $r_{mm}$.

The sub-matrix $R^{(m)}$ for the recursion is extracted from the diagonal matrix of the matrix R, that is, the sub-matrix $R^{(m)}$ satisfies the requirement that the sub-matrix $R^{(m)}$ is equal to its conjugate transposition $(R^{(m)})^H$.

In a real decomposing procedure, there is no need to get the whole structure of $R^{(m)}$; rather, it only needs to get $Y_{m-1}$ and $\lambda_m$, which can both be extracted from the matrix R directly.

At step 904, the LDLT factor matrices $L^{(m)}$ and $D^{(m)}$ of the inversion $(R^{(m)})^{-1}$ of $R^{(m)}$ is computed.

The LDLT factor matrices $L^{(m-1)}$ and $D^{(m-1)}$, which satisfy the relationship of $L^{(m-1)}D^{(m-1)}(L^{(m-1)})^H=(R^{(m-1)})^{-1}$, of $(R^{(m)})^{-1}$ are obtained at step 901 or from the last recursion of step 904.

$L^{(m)}$ and $D^{(m)}$ may be recursively computed according to $L^{(m-1)}$ and $D^{(m-1)}$ as well as $\lambda_m, Y_{m-1}$ obtained at step 903, the result is:

$$D^{(m)} = \begin{bmatrix} D^{(m-1)} & 0 \\ 0 & \chi_{m-1} \end{bmatrix},$$

-continued $$L^{(m)} = \begin{bmatrix} L^{(m-1)} & \mu_{m-1} \\ 0 & 1 \end{bmatrix},$$

where, $$\chi_{m-1} = \frac{1}{\lambda_m - (Y_{m-1})^H L^{(m-1)} D^{(m-1)} (L^{(m-1)})^H Y_{m-1}}, \text{ and}$$

$$\mu_{m-1} = -L^{(m-1)} D^{(m-1)} (L^{(m-1)})^H Y_{m-1}.$$

At step 905, m is incremented by one, i.e., m=m+1, then the procedure proceeds to step 902.

At step 906: the LDLT factor matrices $L^{(M)}$ and $D^{(M)}$ of the inversion $R^{-1}$ of the matrix R is obtained, and the obtained $L^{(M)}$ and $D^{(M)}$ satisfy the relationship of $L^{(M)}D^{(M)}(L^{(M)})^H = R^{-1}$.

According to the fifth embodiment, a square root matrix of an inversion of an M×M matrix may also be computed. For example, in the fifth embodiment, after obtaining the matrices L and D, i.e., $L^{(M)}$ and $D^{(M)}$ of the inversion of the matrix R, it is possible to compute the square root matrix $P^{(M)/2}$ of the inversion $R^{-1}$ of the matrix R by using $L^{(M)}$ and $D^{(M)}$. Specifically, a diagonal matrix $D^{(M)/2}$ satisfying $D^{(M)/2}(D^{(M)/2})^H = D^{(M)}$ may be first obtained from $D^{(M)}$, then $P^{(M)/2}$ is computed as $P^{(M)/2} = L^{(M)} \cdot D^{(M)/2}$ the resulted $P^{(M)/2}$ satisfies the relationship of $P^{(M)/2}(P^{(M)/2})^H = R^{-1}$.

A concept may be made clear based on the fourth and fifth embodiments.

By substituting $$P^{(M)/2} = \begin{bmatrix} P^{(M-1)/2} & v \\ 0^T & \beta \end{bmatrix}$$

into $P^{(M)} = P^{(M)/2}(P^{(M)/2})^H$, it can be obtained:

$$\begin{bmatrix} P^{(M-1)/2} & v \\ 0^T & \beta \end{bmatrix} \begin{bmatrix} P^{(M-1)/2} & v \\ 0^T & \beta \end{bmatrix}^H = \begin{bmatrix} P^{(M-1)/2} & v \\ 0^T & \beta \end{bmatrix} \begin{bmatrix} (P^{(M-1)/2})^H & 0 \\ v^H & \beta^* \end{bmatrix}$$

$$= \begin{bmatrix} P^{(M-1)/2}(P^{(M-1)/2})^H + vv^H & \beta^* v \\ \beta v^H & \beta \beta^* \end{bmatrix}$$

$$= P^{(M)}.$$

It can be seen from the above equation that $P^{(M-1)/2}$ is not the factor matrix of the sub-matrix of $P^{(M)}$. Only $P^{(M-1)/2}(P^{(M-1)/2})^H + vv^H$ is equal to the sub-matrix of $P^{(M)}$.

That is to say, in the previous embodiments of signal detection in a MIMO system, $P^{(m)} = P^{(m)/2}(P^{(m)/2})^H$ (m=1, 2, ..., M) are not sub-matrices of $P^{(M)}$, rather, each $P^{(m)}$ is the estimate error covariance matrix of the corresponding m (m=1, 2, ..., M) transmitted signals to be detected. It should be noted that up till then, the other M-m transmitted signals are already detected and their interference on the m transmitted signals to be detected is already cancelled. Therefore, the channel model at that time is equivalent to the model having only m transmitted signals to be detected transmitted at the transmitting end, and the other M-m transmitted signals that are already detected are equivalent to not existing anymore.

$P^{(m)/2} (P^{(m)/2})^H = (R^{(m)})^{-1}$ holds true for any m=1, 2, ..., M, that is, $P^{(m)/2}$ is the factor matrix of the inversion of $R^{(m)}$, and $R^{(m)}$ is the sub-matrix of the largest $R^{(M)}$. That is to say, the obtained intermediate results $P^{(m)/2}$ (m=1, 2, ..., M) are the factor matrix of the inversion of the sub-matrix of $R^{(M)}$.

It can be easily seen that the method for computing a factor matrix of an inversion of a matrix can also be used to compute an inversion of a matrix efficiently. After acquiring the square root matrix $P^{(M)/2}$ of the inversion $R^{-1}$ of R at step 806, the matrix product $P^{(M)/2} (P^{(M)/2})^H$ is further computed, which is the inversion $R^{-1}$ of the matrix R. On the other hand, after acquiring the $LDL^T$ matrices, i.e., $L^{(M)}$ and $D^{(M)}$, of the inversion $R^{-1}$ of the matrix R at step 906, the matrix product $L^{(M)}D^{(M)}(L^{(M)})^H$ is further computed, which is the inversion $R^{-1}$ of the matrix R.

Moreover, in each embodiment, an element of the matrix R may be expressed in a form other than the value of the element, such form is then used to compute the factor matrix of the inversion of the matrix R. As explain on page 36 of the specification, in order to make it easier to implement with CORDIC, the element $r_{t_j t_j}$ on the diagonal of the matrix R is not expressed by the value of the element, instead, it is expressed as a complex number $g_{t_j t_j}$ satisfying $g_{t_j t_j}(g_{t_j t_j})^* = r_{t_j t_j}$. $g_{t_j t_j}$ is then used to compute the factor matrix of the inversion of the matrix R.

The Sixth Embodiment

Figure 10:
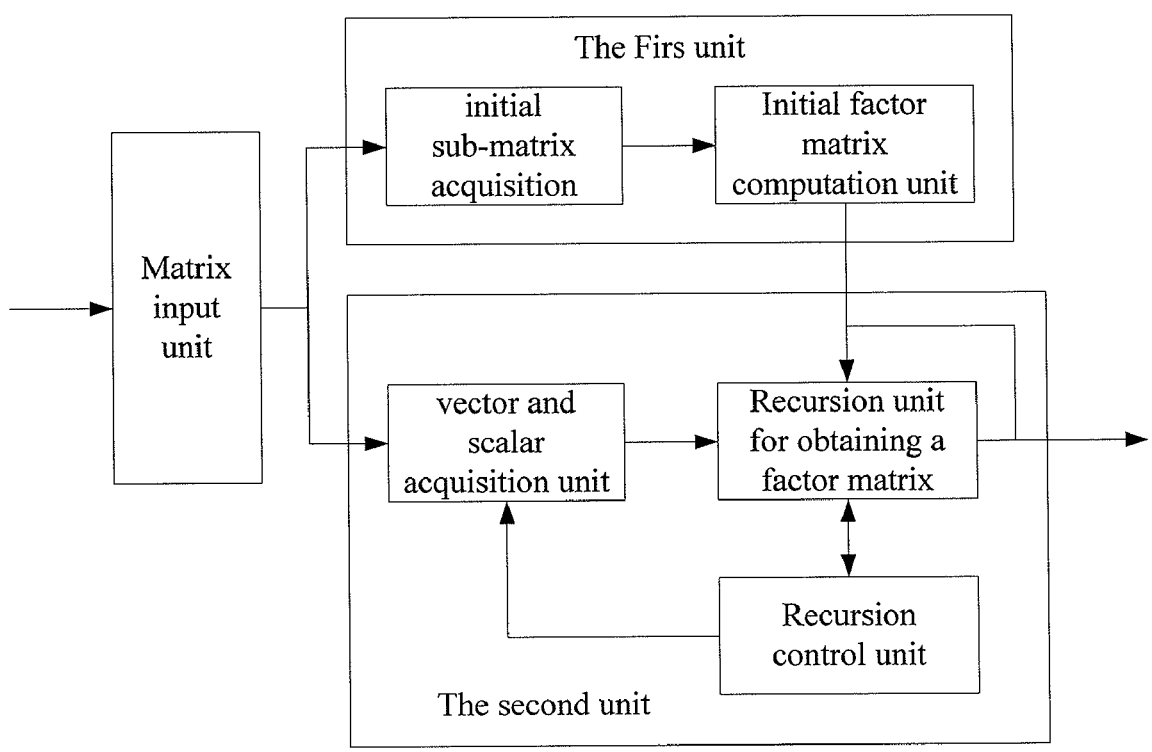
FIG. 10 is a flow chart for computing factor matrices of an inversion of a matrix according to a sixth embodiment of the present invention.

A matrix decomposing apparatus is provided according to the sixth embodiment. FIG. 10 shows a diagram of an apparatus for computing a factor matrix of an inversion of a matrix. As shown in FIG. 10, the apparatus comprises: a matrix input unit, a first unit and a second unit; the matrix input unit is configured to receive and record the matrix; the first unit is configured to compute factor matrix of an inversion of a sub-matrix of the matrix; the second unit is configured to recursively obtain the factor matrix of the inversion of the matrix by using the matrix and the computed factor matrix of the inversion of the sub-matrix of the matrix and output the factor matrix.

The first unit comprises: an initial sub-matrix acquisition unit and an initial factor matrix computation unit; the second unit comprises: a vector and scalar acquisition unit and a recursion unit for obtaining a factor matrix. The initial sub-matrix acquisition unit is configured to acquire initial sub-matrix from the matrix recorded in the matrix input unit and send the initial sub-matrix to the initial factor matrix computation unit; the initial factor matrix computation unit is configured to compute and send factor matrix of an inversion of the initial sub-matrix to the recursion unit for obtaining a factor matrix; the vector and scalar acquisition unit is configured to acquire scalars and vectors required for the recursion from the matrix input unit and send the acquired scalars and vectors to the recursion unit for obtaining a factor matrix; the recursion unit for obtaining a factor matrix is configured to recursively obtaining the factor matrix of the inversion of the matrix, by using the scalars and vectors received from the vector and scalar acquisition unit and factor matrix received from the initial factor matrix computation unit or that obtained from the last recursion, so as to use the obtained factor matrix for the next recursion or have the obtained factor matrix output. The second unit further comprises a recursion control unit. The recursion control unit is configured to set a recursion variable, use the recursion variable to control the recursion, and send the recursion variable to the vector and scalar acquisition unit and the recursion unit for obtaining a factor matrix; the vector and scalar acquisition unit is configured to acquire the scalars and vectors for the present recursion according to the recursion variable received from the recursion control unit; the recursion unit for obtaining a factor matrix is configured to recursively obtain the factor matrix of the inversion of the sub-matrix comprising the vector and scalar according to the recursion variable received from the recursion control unit.

In the following, operations performed by each unit will be described in more detail.

The initial sub-matrix acquisition unit is configured to acquire a sub-matrix composed of a first number of rows and columns of the matrix; the initial factor matrix computation unit is configured to compute a factor matrix of the sub-matrix composed of a first number of rows and columns of the matrix; the vector and scalar acquisition unit is configured to acquire entries of the sub-matrix, which is composed of the second number of rows and columns and including the sub-matrix composed of the first number of rows and columns, but not included in the sub-matrix composed of the first number of rows and columns, and send the acquired entries to the recursion unit for obtaining a factor matrix; the recursion unit for obtaining a factor matrix is configured to recursively obtain the factor matrix of the sub-matrix composed of the second number of rows and columns of the matrix, by taking the last recursively obtained factor matrix of the inversion of the sub-matrix composed of the first number of rows and columns of the matrix as a sub-matrix, and using the acquired entries; the recursion control unit is configured to set the second number greater than the first number; determine whether the factor matrix of the inversion of the matrix are obtained; control the recursion unit for obtaining a factor matrix to output the result if the factor matrix of the inversion of the matrix is obtained; otherwise, assign the second number to the first number, increment the second number by 1 or an integer lager than 1 and send the first and second numbers to the vector and scalar acquisition unit and the recursion unit for obtaining a factor matrix.

More specifically, the initial sub-matrix acquisition unit is configured to acquire a sub-matrix composed of one row and one column of the matrix; the initial factor matrix computation unit is configured to compute a factor matrix of the sub-matrix composed of the one row and one column of the matrix; the vector and scalar acquisition unit is configured to acquire entries of the sub-matrix, which is composed of m rows and m columns and includes the sub-matrix composed of m−1 rows and m−1 columns, but not included in the sub-matrix composed of m−1 rows and m−1 columns, and send the acquired entries to the recursion unit for obtaining a factor matrix; the recursion unit for obtaining a factor matrix is configured to recursively obtain a factor matrix of the sub-matrix composed of m rows and m columns of the matrix, by taking the last recursively obtained factor matrix of the inversion of the sub-matrix composed of m−1 rows and m−1 columns of the matrix as a sub-matrix and using the acquired entries; the recursion control unit is configured to set a recursion variable having an initial value of 2, determine whether the factor matrix of the inversion of the matrix are obtained, control the recursion unit for obtaining a factor matrix to output the result if the factor matrix of the inversion of the matrix is obtained, otherwise, increment m by 1 and send the number m to the vector and scalar acquisition unit and the recursion unit for obtaining a factor matrix.

The vector and scalar acquisition unit is configured to extract vector Y and scalar λ from the matrix recorded in the matrix input unit.

When computing the square root matrix of an inversion of a matrix, the initial factor matrix computation unit is configured to compute a square root matrix of the sub-matrix composed of the one row and one column of the matrix; the recursion unit for obtaining a factor matrix is configured to obtain a square root matrix of the sub-matrix composed of m rows and m columns of the matrix by adding a row and a column composed of a vector v comprising m−1 entries, a zero vector comprising m−1 entries and a scalar β to the square root matrix of the inversion of the sub-matrix composed of m−1 rows and m−1 columns of the matrix, wherein, an entry at the intersection of the row and the column is the scalar β, and remaining entries of the column are composed of the vector v, and remaining entries of the row are composed of the zero vector; wherein, the scalar β is computed from the vector Y, the scalar X and the square root matrix of the inversion of the sub-matrix composed of m−1 rows and m−1 columns of the matrix; the vector v is computed from the scalar β, the vector Y and the square root matrix of the inversion of the sub-matrix composed of m−1 rows and m−1 columns of the matrix.

When computing the LDLT factor matrices of an inversion of a matrix, the initial factor matrix computation unit is configured to compute LDLT factor matrices L and D of the sub-matrix composed of the one row and one column of the matrix; the recursion unit for obtaining a factor matrix is configured to obtain the matrix L of the sub-matrix composed of m rows and m columns of the matrix by adding a row and a column composed of a vector μ comprising m−1 entries, a zero vector comprising m−1 entries and a scalar 1 to the matrix L of the inversion of the sub-matrix composed of m−1 rows and m−1 columns of the matrix, wherein, an entry at the intersection of the row and the column is the scalar 1, remaining entries of the row are composed of the vector μ, and remaining entries of the column are composed of the zero vector; obtain the matrix D of the sub-matrix composed of m rows and m columns of the matrix by adding a scalar χ to a diagonal of the matrix D of the inversion of the sub-matrix composed of m−1 rows and m−1 columns of the matrix, remaining entries of the row and column having the scalar χ as an entry are all zeroes, wherein, the vector μ is computed from the vector Y and the matrices L and D of the inversion of the sub-matrix composed of m−1 rows and m−1 columns of the matrix; the scalar χ is computed from the vector Y, the scalar λ, and the matrices L and D of the inversion of the sub-matrix composed of m−1 rows and m−1 columns of the matrix.

The computation results from each unit of the apparatus according to the sixth embodiment are already expressed with detailed equations in the fourth and fifth embodiments, which will not be repeated here.

The above is only preferred embodiments of the disclosure, and is not intended to limit the scope of the disclosure. Any modification, equivalent substitution and improvement within the spirit and scope of the disclosure are intended to be included in the scope of the disclosure.

What is claimed is:

1. A method for signal detection in a digital wireless communication system with multiple antennas, wherein at least two transmitted signals are detected in a Multiple Input Multiple Output system, the transmitted signals are transmitted from distinct transmitting antennas at a transmitting end and arrive at a receiving end after passing through a channel, wherein, the method comprises the steps of:
receiving the transmitted signals from at least two receiving antennas at the receiving end, and acquiring a channel matrix H composed of channel coefficients between the transmitting and receiving antennas;
computing a factor matrix of an estimate error covariance matrix for a part of all the transmitted signals by using the channel matrix H, and recursively obtaining a factor matrix of an estimate error covariance matrix for a number of transmitted signals by using the channel matrix H and the computed factor matrix of the estimate error covariance matrix for the part of transmitted signals, wherein the number of transmitted signals include the part of transmitted signals and are of a greater number than the part of transmitted signals;
detecting the number of transmitted signals, which include the part of transmitted signals and are of a greater number than the part of transmitted signals, by using the obtained factor matrix.

2. The method of claim 1, wherein,
the number of transmitted signals, which include the part of transmitted signals and are of a greater number than the part of transmitted signals, are all of the transmitted signals.

3. The method of claim 2, wherein, the step of recursively obtaining the factor matrix of the estimate error covariance matrix for all the transmitted signals by using the factor matrix of the estimate error covariance matrix for the part of transmitted signals, comprises the step of recursively obtaining the factor matrix of the estimate error covariance matrix for all the transmitted signals by using the factor matrix of the estimate error covariance matrix for the part of transmitted signals as a sub-matrix.

4. The method of claim 2, comprising:
setting a detection ordering for detecting the at least two transmitted signals at the receiving end;
wherein, the step of computing the factor matrix of the estimate error covariance matrix for the part of all the transmitted signals by using the channel matrix is a step of:
computing a factor matrix of an estimate error covariance matrix for a first number of transmitted signals that are last detected according to the detection ordering, by using a channel matrix corresponding to the first number of transmitted signals that are last detected;
setting a second number for recursively obtaining the factor matrix of the estimate error covariance matrix for the transmitted signals to be detected, wherein the second number is larger than the first number;
the step of recursively obtaining the factor matrix comprises the step of:
recursively obtaining the factor matrix of the estimate error covariance matrix for the second number of transmitted signals that are last detected according to the detection ordering, by using the channel matrix corresponding to the second number of transmitted signals that are last detected and using the factor matrix of the estimate error covariance matrix for the first number of transmitted signals that are last detected as a sub-matrix;
ending this step if the factor matrix of the estimate error covariance matrix for all the transmitted signals that are detected are obtained, otherwise, returning back and executing the recursively obtaining step after assigning the second number to the first number and incrementing the second number by 1 or an integer lager than 1.

5. The method of claim 2, comprising,
setting a detection ordering for detecting the at least two transmitted signals at the receiving end; wherein,
the step of computing the factor matrix of the estimate error covariance matrix for the part of all the transmitted signals by using the channel matrix is a step of computing the factor matrix of the estimate error covariance matrix for one of the transmitted signals that is last detected according to the detection ordering, by using the channel matrix corresponding to the one of the transmitted signals that are last detected;

the step of recursively obtaining the factor matrix comprises the steps of:

recursively obtaining the factor matrix of the estimate error covariance matrix for m transmitted signals that are last detected according to the detection ordering, by using the channel matrix corresponding to the m transmitted signals that are last detected and using factor matrix of an estimate error covariance matrix for m−1 transmitted signals that are last detected, as a sub-matrix;

ending this step if the factor matrix of the estimate error covariance matrix for all the transmitted signals that are detected are obtained, otherwise, returning back and executing the recursively obtaining step after incrementing m by 1, wherein the initial value of m is set to 2.

6. The method of claim 5, wherein, the number of the transmitting antennas is M and that of the receiving antennas is N, M transmitted signals are transmitted from the M distinct transmitting antennas respectively;

the step of setting the detection ordering for detecting the at least two transmitted signals comprises: renumbering the M transmitted signals transmitted from the respective transmitting antennas to obtain the detection ordering, which is represented by a sequence of the transmitted signals as $t_M, t_{M-1}, \ldots, t_m, \ldots, t_2, t_1$;

the step of computing the factor matrix of the estimate error covariance matrix for the one of the transmitted signals that is last detected comprises steps of:

obtaining an inversion $R_{(t_1)}^{(1)}$ of the estimate error covariance matrix for one transmitted signal $t_1$ by using the channel matrix $[h_{:t_1}]$ corresponding to the transmitted signal $t_1$, and obtaining the factor matrix of the estimate error covariance matrix for the transmitted signal $t_1$ according to a relationship between the factor matrix of the estimate error covariance matrix for the transmitted signal $t_1$ and the inversion $R_{(t_1)}^{(1)}$;

the recursively obtaining step comprises steps of:

obtaining a part of entries, which are not included in $R_{(t_{m-1})}^{(m-1)}$, of an inversion $R_{(t_m)}^{(m)}$ of an estimate error covariance matrix for m transmitted signals $t_1 \ldots t_m$ by using a channel matrix $[h_{:t_1} h_{:t_2} \ldots h_{:t_m}]$ corresponding to the m transmitted signals, and recursively obtaining the factor matrix of the estimate error covariance matrix for the m transmitted signals, according to a relationship between the factor matrix of the estimate error covariance matrix for the m transmitted signals and $R_{(t_m)}^{(m)}$, by using the obtained factor matrix of an estimate error covariance matrix for m−1 transmitted signals $t_1 \ldots t_{m-1}$;

ending this step if the factor matrix of the estimate error covariance matrix for the M transmitted signals that are detected are obtained, otherwise, returning back and executing the recursively obtaining step after incrementing m by 1;

wherein, $h_{:t_i}$ denotes a column vector of the channel matrix H that corresponds to the transmitted signal $t_i$, i=1 … M.

7. The method of claim 6, wherein, $R_{(t_1)}^{(1)} = (h_{:t_1}^H \cdot h_{:t_1} + \alpha)$, where $\alpha$ is a constant related to a signal to noise ratio of the transmitted signals;

the part of entries of $R_{(t_m)}^{(m)}$ that are not included in $R_{(t_{m-1})}^{(m-1)}$ are: a scalar $\lambda^{(t_m)}$ and a vector $Y_{m-1}^{(t_m)}$, wherein, $$\lambda_1^{(t_m)} = h_{:t_m}^H \cdot h_{:t_m} + \alpha, \text{ and } Y_{m-1}^{(t_m)} = \begin{bmatrix} h_{:t_1}^H \cdot h_{:t_m} \\ h_{:t_2}^H \cdot h_{:t_m} \\ \vdots \\ h_{:t_{m-1}}^H \cdot h_{:t_m} \end{bmatrix};$$

the recursively obtained factor matrix of the estimate error covariance matrix for the m transmitted signals is a matrix obtained by adding a row and a column to the factor matrix of the estimate error covariance matrix for the m−1 transmitted signals.

8. The method of claim 7, wherein, the factor matrix is a square root matrix and the product of the square root matrix and its conjugate transposition is the estimate error covariance matrix;

the matrix obtained by adding a row and a column to the factor matrix of the estimate error covariance matrix for the m−1 transmitted signals is obtained by a step of:

adding a row and a column, which are composed of vectors $v_{m-1}^{(t_m)}$, $(\vec{0}_{m-1})^H$ and a scalar $\beta_{m-1}^{(t_m)}$ respectively, to a square root matrix $P_{(t_{m-1})}^{(m-1)/2}$ of the estimate error covariance matrix for the m−1 transmitted signals, so as to obtain a square root matrix $P_{(t_m)}^{(m)/2}$ of the estimate error covariance matrix for the m transmitted signals, wherein, an entry at the intersection of the row and the column is the scalar $\beta_{m-1}^{(t_m)}$ and the remaining entries of the column are composed of the vector $v_{m-1}^{(t_m)}$, and the remaining entries of the row are composed of the vector $(\vec{0}_{m-1})^H$;

wherein, $P_{(t_{m-1})}^{(m-1)/2}$ is a result of the last recursion or is equal to $P_{(t_1)}^{(1)/2}$, any $\beta_{m-1}^{(t_m)}$ that satisfies an equation of $$\beta_{m-1}^{(t_m)}(\beta_{m-1}^{(t_m)})^* = \frac{1}{\lambda_1^{(t_m)} - ((P_{(t_{m-1})}^{(m-1)/2})^H Y_{m-1}^{(t_m)})^H ((P_{(t_{m-1})}^{(m-1)/2})^H Y_{m-1}^{(t_m)})}$$

is derived from this equation, $v_{m-1}^{(t_m)} = -\beta_{m-1}^{(t_m)} P_{(t_{m-1})}^{(m-1)/2} (P_{(t_{m-1})}^{(m-1)/2})^H Y_{m-1}^{(t_m)}$, and $(\vec{0}_{m-1})^H$ is a row vector whose m−1 entries are all zeroes;

or, the factor matrices are $LDL^T$ factor matrices L and D, a product of the matrix L with the matrix D as well as the conjugate transposition of L is the estimate error covariance matrix;

the matrix obtained by adding a row and a column to the factor matrix of the estimate error covariance matrix for the m−1 transmitted signals are obtained by a step of:

adding a row and a column, which are composed of vectors $\mu_{m-1}^{(t_m)}$, $(\vec{0}_{m-1})^H$ and a scalar 1 respectively, to the factor matrix $L_{(t_{m-1})}^{(m-1)}$ of the estimate error covariance matrix for the m−1 transmitted signals, so as to obtain the factor matrix $L_{(t_m)}^{(m)}$ of the estimate error covariance matrix for the m transmitted signals, wherein, an entry at the intersection of the row and the column is the scalar 1, the remaining entries of the row are composed of the vector $(\vec{0}_{m-1})^H$ and the remaining entries of the column are composed of the vector $\mu_{m-1}^{(t_m)}$;

adding an entry $$\frac{1}{\lambda_1^{(t_m)} - (Y_{m-1}^{(t_m)})^H L_{(t_{m-1})}^{(m-1)} D_{(t_{m-1})}^{(m-1)} (L_{(t_{m-1})}^{(m-1)})^H Y_{m-1}^{(t_m)}}$$

to a diagonal of the factor matrix $D_{(t_{m-1})}^{(m-1)}$ of the estimate error covariance matrix for the m−1 transmitted signals, the remaining elements of the row and column having $$\frac{1}{\lambda_1^{(t_m)} - (Y_{m-1}^{(t_m)})^H L_{(t_{m-1})}^{(m-1)} D_{(t_{m-1})}^{(m-1)} (L_{(t_{m-1})}^{(m-1)})^H Y_{m-1}^{(t_m)}}$$

as an entry are all zeroes, so as to obtain the factor matrix $D_{(t_m)}^{(m)}$ of the estimate error covariance matrix for the m transmitted signals;

wherein, $L_{(m_{m-1})}^{(m-1)}$ and $D_{(t_{m-1})}^{(m-1)}$ are results of the last recursion or equal to $L_{(t_1)}^{(1)}$ and $D_{(t_1)}^{(1)}$ obtained at step c21, $\mu_{m-1}^{(t_m)} = L_{(m_{m-1})}^{(m-1)} D_{(m_{m-1})}^{(m-1)} (L_{(m_{m-1})}^{(m-1)})^H \vec{Y}_{m-1}^{(t_m)}$, and $(\vec{0}_{m-1})^H$ is a row vector whose m−1 entries are all zeroes.

9. The method of claim 7, wherein,
the factor matrix is a square root matrix and the product of the square root matrix and its conjugate transposition is the estimate error covariance matrix; the square root matrix is a full triangular matrix whose elements above or below its diagonal are all zeroes, or a matrix that is able to be transformed into a full triangular matrix whose elements above or below its diagonal are all zeroes by permuting the rows and columns thereof;

or, the factor matrices are $LDL^T$ factor matrices L and D, a product of the matrix L with the matrix D as well as the conjugate transposition of L is the estimate error covariance matrix; the matrix L is a full triangular matrix whose elements above or below its diagonal are all zeroes, or a matrix that is able to be transformed into a full triangular matrix whose elements above or below its diagonal are all zeroes by permuting the rows and columns thereof, the matrix D is a diagonal matrix whose elements above or below its diagonal are all zeroes, or a matrix that is able to be transformed into a diagonal matrix whose elements above or below its diagonal are all zeroes by permuting the rows and columns thereof.

10. The method of claim 2, wherein, the step of detecting the transmitted signals comprises steps of:
selecting one transmitted signal being detected from the transmitted signals to be detected, and obtaining an estimate of the transmitted signal being detected by using the obtained factor matrix of the estimate error covariance matrix for all of the transmitted signals, the channel matrix H and the received signals;
computing and canceling the interference, caused by the transmitted signal being detected, on the subsequent transmitted signals to be detected, by using the obtained estimate of the transmitted signal being detected; and
repeating the above detecting step until all the transmitted signals to be detected are detected.

11. The method of claim 10, wherein,
prior to the step of detecting the transmitted signals, the method further comprises a step of performing pre-match filtering on the received signals by using the channel matrix H, and computing correlated channel matrix $\Phi$ of the channel matrix H, $\Phi = H^H \cdot H$;
the step of obtaining the estimate of the transmitted signal being detected comprises a step of obtaining the estimate of the transmitted signal being detected by using the factor matrix of the estimate error covariance matrix for the transmitted signals to be detected and the result of the pre-match filtering on the received signals;
the step of computing and canceling the interference comprises: computing the interference, which is caused by the transmitted signal that has been detected, on the subsequent transmitted signals to be detected by using the estimate of the transmitted signal being detected and the correlated channel matrix $\Phi$ of the channel matrix H, and canceling the interference, which is caused by the transmitted signal that has been detected, from the result of the pre-match filtering on the received signals, thereby obtaining a modified result of the pre-match filtering on the received signals.

12. The method of claim 11, wherein,
the step of computing the correlated channel matrix $\Phi$ of the channel matrix H comprises: computing an inversion R of the estimate error covariance matrix for the transmitted signals by using the channel matrix H, and deriving $\Phi$ by using $\Phi = H^H \cdot H$ and $R = H^H \cdot H + \alpha I_{M \times M}$.

13. The method of claim 11, wherein,
the step of performing pre-match filtering on the received signals by using the channel matrix H comprises: using the conjugate transposition of the channel matrix H as a pre-match filter for the received signals and obtaining the result of the pre-match filtering by performing pre-match filtering on the vector of the received signals;
the step of obtaining the estimate of the transmitted signal being detected by using the factor matrix of the estimate error covariance matrix for the transmitted signals to be detected and the result of the pre-match filtering on the received signals comprises: computing a nulling vector by using the factor matrix of the estimate error covariance matrix for the transmitted signals to be detected, and multiplying the nulling vector with the result of the pre-match filtering to obtain the estimate of the transmitted signal being detected;
the step of computing and canceling the interference comprises: obtaining the interference, which is caused by the transmitted signal that has been detected, on the subsequent transmitted signals to be detected, according to a product of the estimate of the transmitted signal being detected by a vector composed of the elements of the correlated matrix $\Phi$ of the channel matrix that correspond to the transmitted signal being detected; deleting an item corresponding to the transmitted signal that has been detected from the result of the pre-match filtering on the received signals; and obtaining the modified result of the pre-match filtering on the received signals by canceling the interference from the result of the pre-match filtering on the received signals having the item deleted.

14. The method of claim 13, wherein,
the factor matrix is a square root matrix and the product of the square root matrix and its conjugate transposition is the estimate error covariance matrix;
the step of selecting one transmitted signal being detected from the transmitted signals to be detected comprises a step of locating the transmitted signal being detected by using the square root matrix of the estimate error covariance matrix for the transmitted signals to be detected;

the step of computing the nulling vector comprises a step of computing the nulling vector by using the square root matrix of the estimate error covariance matrix for the transmitted signals to be detected.

15. The method of claim 13, wherein,
the factor matrices are $LDL^T$ factor matrices L and D, a product of the matrix L with the matrix D as well as the conjugate transposition of matrix L is the estimate error covariance matrix;
prior to the step of detecting the transmitted signals, the method further comprises a step of computing the square root matrix of the estimate error covariance matrix by using the matrices L and D of the obtained estimate error covariance matrix;
the step of selecting one transmitted signal being detected from the transmitted signals to be detected comprises: locating the one transmitted signal being detected by using the square root matrix of the estimate error covariance matrix for the transmitted signals to be detected;
the step of computing the nulling vector comprises: computing the nulling vector by using the square root matrix of the estimate error covariance matrix for the transmitted signals to be detected.

16. The method of claim 14 or 15, wherein,
in the step of locating the transmitted signal being detected by using the square root matrix of the estimate error covariance matrix for the transmitted signals to be detected, the transmitted signal being detected is the transmitted signal corresponding to a row vector having the minimum length in the square root matrix of the estimate error covariance matrix of the transmitted signals to be detected;
the step of computing the nulling vector comprises steps of:
 determining whether the row vector having the minimum length has only one non-zero entry;
 computing the nulling vector by using the only non-zero entry of the row vector having the minimum length and a column vector having the non-zero entry as an entry in the square root matrix of the estimate error covariance matrix for the transmitted signals to be detected, if the row vector having the minimum length has only one non-zero entry;
otherwise, performing orthogonal transformation on the square root matrix of the estimate error covariance matrix for the transmitted signals to be detected, so that the row vector having the minimum length has only one non-zero entry and the remaining entries of the row vector are all zeroes; and computing the nulling vector by using the only non-zero entry of the row vector having the minimum length and the column vector having the non-zero entry as an entry in the orthogonal transformed square root matrix of the estimate error covariance matrix for the transmitted signals to be detected;
after the step of computing and canceling the interference, the method further comprises steps of:
 obtaining a sub-matrix by deleting the row vector having the minimum length and a corresponding column vector from the square root matrix of the estimate error covariance matrix for the transmitted signals to be detected, in which the row vector having the minimum length has only one non-zero entry, wherein the corresponding column has the only non-zero entry as an entry; and
 taking the sub-matrix as the square root matrix of the estimate error covariance matrix for the transmitted signals to be detected for the next repeated detecting step.

17. The method of claim 16, wherein,
the step of computing the nulling vector by using the only non-zero entry of the row vector having the minimum length and the column vector having the non-zero entry as an entry in the square root matrix of the estimate error covariance matrix for the transmitted signals to be detected comprises: computing a product of the only non-zero entry of the row vector having the minimum length by the conjugate transposition of the column vector having the non-zero entry as an entry in the square root matrix of the estimate error covariance matrix for the transmitted signals to be detected.

18. The method of claim 13, wherein,
the factor matrices are $LDL^T$ factor matrices L and D, a product of the matrix L with the matrix D as well as the conjugate transposition of matrix L is the estimate error covariance matrix;
in the step of selecting the transmitted signal being detected from the transmitted signals to be detected, the transmitted signal being detected is the transmitted signal corresponding to the only row vector having only one non-zero entry in the matrix L of the estimate error covariance matrix for the transmitted signals to be detected;
the step of computing the nulling vector comprises a step of computing the nulling vector by using the matrices L and D of the estimate error covariance matrix for the transmitted signals to be detected.

19. The method of claim 18, wherein,
the step of computing the nulling vector by using the matrices L and D comprises: computing a product of a diagonal element of the matrix D that corresponds to the transmitted signal to be detected by a conjugate transposition of a column vector that corresponds to the transmitted signals in the matrix L.

20. The method of claim 1, wherein,
the step in which the transmitted signals are transmitted from distinct transmitting antennas at the transmitting end and arrive at the receiving end after passing through the channel, comprises a step of multiplying a vector composed of the transmitted signals by one or more matrices to obtain a resultant vector, wherein each entry of the resultant vector is transmitted from the distinct transmitting antennas at the transmitting end and arrives at the receiving end after passing through the channel.

21. An apparatus for signal detection in a digital wireless communication system with multiple antennas, wherein, the apparatus comprises: a signal receiving unit, a channel matrix acquiring unit, a recursion unit for obtaining a factor matrix of an estimate error covariance matrix and a signal detection unit; wherein
 the signal receiving unit is configured to receive transmitted signals transmitted from a transmitting end, and send the transmitted signals to the channel matrix acquiring unit and the signal detection unit;
 the channel matrix acquiring unit is configured to acquire a channel matrix and send the channel matrix to the recursion unit for obtaining a factor matrix of an estimate error covariance matrix;
 the recursion unit for obtaining a factor matrix of an estimate error covariance matrix is configured to compute a factor matrix of an estimate error covariance matrix for a part of all the transmitted signals by using the channel matrix; and recursively obtain a factor matrix of an estimate error covariance matrix for a number of transmitted signals by using the channel matrix and the computed factor matrix of the estimate error covariance matrix for the part of transmitted signals, wherein the number of transmitted signals include the part of transmitted signals and are of a greater number than the part of transmitted signals; and send the obtained factor matrix to the signal detection unit; and the signal detection unit is configured to detect the number of transmitted signals that include the part of transmitted signals and are of a greater number than the part of transmitted signals, by using the obtained factor matrix.

22. An apparatus for computing factor matrix of an inversion of a matrix, wherein the apparatus comprises: a matrix input unit, a first unit and a second unit;

the matrix input unit is configured to receive and record the matrix;

the first unit is configured to compute factor matrix of an inversion of a sub-matrix of the matrix;

the second unit is configured to recursively obtain and output the factor matrix of the inversion of the matrix by using the matrix and the computed factor matrix of the inversion of the sub-matrix of the matrix.

23. The apparatus of claim 22, wherein, the first unit further comprises: an initial sub-matrix acquisition unit and an initial factor matrix computation unit;

the second unit further comprises: a vector and scalar acquisition unit and a recursion unit for obtaining factor matrix;

the initial sub-matrix acquisition unit is configured to acquire initial sub-matrix from the matrix recorded in the matrix input unit and send the initial sub-matrix to the initial factor matrix computation unit;

the initial factor matrix computation unit is configured to compute and send factor matrix of an inversion of the initial sub-matrix to the recursion unit for obtaining factor matrix;

the vector and scalar acquisition unit is configured to acquire scalars and vectors required for the recursion from the matrix input unit and send the acquired scalars and vectors to the recursion unit for obtaining factor matrix;

the recursion unit for obtaining a factor matrix is configured to recursively obtaining the factor matrix of the inversion of the matrix, by using the scalars and vectors received from the vector and scalar acquisition unit, and factor matrix received from the initial factor matrix computation unit or obtained from the last recursion, so as to use the obtained factor matrix for the next recursion or have the obtained factor matrix output.

24. The apparatus of claim 23, wherein, the second unit further comprises a recursion control unit;

the recursion control unit is configured to set a recursion variable, use the recursion variable to control the recursion, and send the recursion variable to the vector and scalar acquisition unit and the recursion unit for obtaining a factor matrix;

the vector and scalar acquisition unit is configured to acquire the scalars and vectors for the current recursion according to the recursion variable received from the recursion control unit;

the recursion unit for obtaining a factor matrix is configured to recursively obtain the factor matrix of the inversion of the sub-matrix including the vector and scalar according to the recursion variable received from the recursion control unit.

25. The apparatus of claim 24, wherein, the initial sub-matrix acquisition unit is configured to acquire a sub-matrix composed of a first number of rows and columns of the matrix;

the initial factor matrix computation unit is configured to compute a factor matrix of the sub-matrix composed of a first number of rows and columns of the matrix;

the vector and scalar acquisition unit is configured to acquire entries, which are not included in the sub-matrix composed of the first number of rows and columns, of a sub-matrix, which is composed of the second number of rows and columns and includes the sub-matrix composed of the first number of rows and columns, and send the acquired entries to the recursion unit for obtaining a factor matrix;

the recursion unit for obtaining a factor matrix is configured to recursively obtain the factor matrix of the sub-matrix composed of the second number of rows and columns of the matrix, by using the acquired entries and taking the last recursively obtained factor matrix of the inversion of the sub-matrix composed of the first number of rows and columns of the matrix as a sub-matrix;

the recursion control unit is configured to set the second number greater than the first number; determine whether the factor matrix of the inversion of the matrix is obtained; control the recursion unit for obtaining a factor matrix to output the result if the factor matrix of the inversion of the matrix is obtained; otherwise, assign the second number to the first number, increment the second number by 1 or an integer lager than 1, and send the first and second numbers to the vector and scalar acquisition unit and the recursion unit for obtaining a factor matrix.

26. The apparatus of claim 24, wherein, the initial sub-matrix acquisition unit is configured to acquire a sub-matrix composed of one row and one column of the matrix;

the initial factor matrix computation unit is configured to compute a factor matrix of the sub-matrix composed of the one row and one column of the matrix;

the vector and scalar acquisition unit is configured to acquire entries, which are not included in the sub-matrix composed of $m-1$ rows and $m-1$ columns, of a sub-matrix, which is composed of m rows and m columns and includes the sub-matrix composed of $m-1$ rows and $m-1$ columns, and send the acquired entries to the recursion unit for obtaining a factor matrix;

the recursion unit for obtaining a factor matrix is configured to recursively obtain a factor matrix of the sub-matrix composed of m rows and m columns of the matrix, by using the acquired entries and taking the last recursively obtained factor matrix of the inversion of the sub-matrix composed of $m-1$ rows and $m-1$ columns of the matrix as a sub-matrix;

the recursion control unit is configured to set a recursion variable having an initial value of 2, determine whether the factor matrix of the inversion of the matrix is obtained, control the recursion unit for obtaining a factor matrix to output the result if the factor matrix of the inversion of the matrix is obtained, otherwise, increment m by 1 and send the number m to the vector and scalar acquisition unit and the recursion unit for obtaining a factor matrix.

27. The apparatus of claim 26, wherein, the vector and scalar acquisition unit is configured to extract vector Y and scalar λ from the matrix recorded in the matrix input unit.

28. The apparatus of claim 27, wherein, the initial factor matrix computation unit is configured to compute a square root matrix of the sub-matrix composed of the one row and one column of the matrix;

the recursion unit for obtaining a factor matrix is configured to obtain a square root matrix of the sub-matrix composed of m rows and m columns of the matrix by adding a row and a column, which are composed of a vector ν comprising m−1 entries, a zero vector comprising m−1 entries and a scalar β respectively, to the square root matrix of the inversion of the sub-matrix composed of m−1 rows and m−1 columns of the matrix, wherein, an entry at the intersection of the row and the column is the scalar β, and remaining entries of the column are composed of the vector ν, and remaining entries of the row are composed of the zero vector; wherein, the scalar β is computed from the vector Y, the scalar λ and the square root matrix of the inversion of the sub-matrix composed of m−1 rows and m−1 columns of the matrix; the vector ν is computed from the scalar β, the vector Y and the square root matrix of the inversion of the sub-matrix composed of m−1 rows and m−1 columns of the matrix.

29. The apparatus of claim 27, wherein, the initial factor matrix computation unit is configured to compute $LDL^T$ factor matrices L and D of the sub-matrix composed of the one row and one column of the matrix;

the recursion unit for obtaining a factor matrix is configured to obtain the matrix L of the sub-matrix composed of m rows and m columns of the matrix by adding a row and a column, which are composed of a vector μ comprising m−1 entries, a zero vector comprising m−1 entries and a scalar 1 respectively, to the matrix L of the inversion of the sub-matrix composed of m−1 rows and m−1 columns of the matrix, wherein, an entry at the intersection of the row and the column is the scalar 1, remaining entries of the row are composed of the vector μ, and remaining entries of the column are composed of the zero vector; and obtain the matrix D of the sub-matrix composed of m rows and m columns of the matrix by adding a scalar χ to a diagonal of the matrix D of the inversion of the sub-matrix composed of m−1 rows and m−1 columns of the matrix, remaining entries of the row and column having the scalar χ as an entry are all zeroes, wherein, the vector μ is computed from the vector Y and the matrices L and D of the inversion of the sub-matrix composed of m−1 rows and m−1 columns of the matrix; the scalar χ is computed from the vector Y, the scalar λ, and the matrices L and D of the inversion of the sub-matrix composed of m−1 rows and m−1 columns of the matrix.

* * * * *

UNITED STATES PATENT AND TRADEMARK OFFICE
CERTIFICATE OF CORRECTION

PATENT NO.      : 7,787,556 B2
APPLICATION NO. : 12/140089
DATED           : August 31, 2010
INVENTOR(S)     : Yi Zhang et al.

It is certified that error appears in the above-identified patent and that said Letters Patent is hereby corrected as shown below:

Column 49, line 45, " $R_{(t_m)}(m)$ " should read -- $R_{(t_m)}^{(m)}$ --.

Column 50, line 2, " $\lambda^{(t_m)}_m$ " should read -- $\lambda_1^{(t_m)}$ --.

Column 48, line 60, "lager" should read --larger--.

Column 56, line 26, "lager" should read --larger--.

Signed and Sealed this

Thirtieth Day of November, 2010

David J. Kappos
*Director of the United States Patent and Trademark Office*